United States Patent
Hosseini et al.

(10) Patent No.: US 11,888,666 B2
(45) Date of Patent: *Jan. 30, 2024

(54) SOUNDING REFERENCE SIGNAL TRANSMISSION IN LOW LATENCY WIRELESS TRANSMISSIONS

(71) Applicant: QUALCOMM Incorporated, San Diego, CA (US)

(72) Inventors: Seyedkianoush Hosseini, San Diego, CA (US); Wanshi Chen, San Diego, CA (US); Jing Sun, San Diego, CA (US); Alberto Rico Alvarino, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,552

(22) Filed: Jul. 12, 2021

(65) Prior Publication Data

US 2021/0376980 A1 Dec. 2, 2021

Related U.S. Application Data

(63) Continuation of application No. 16/561,795, filed on Sep. 5, 2019, now Pat. No. 11,063,720, which is a (Continued)

(51) Int. Cl.
*H04L 5/00* (2006.01)
*H04L 27/26* (2006.01)
(Continued)

(52) U.S. Cl.
CPC ........ *H04L 27/2613* (2013.01); *H04L 5/0048* (2013.01); *H04L 5/0051* (2013.01);
(Continued)

(58) Field of Classification Search
CPC ... H04L 5/0048; H04L 5/0092; H04L 5/0082; H04L 27/2613; H04L 5/0051;
(Continued)

(56) References Cited

U.S. PATENT DOCUMENTS 8,964,621 B2  2/2015  Bachu et al.
9,413,503 B2  8/2016  Ahn et al.
(Continued)

FOREIGN PATENT DOCUMENTS

CN  102883368 A  1/2013
CN  104937860 A  9/2015
(Continued)

OTHER PUBLICATIONS

International Search Report and Written Opinion—PCT/US2017/065823—ISA/EPO—dated Mar. 29, 2018 (171290WO).
(Continued)

*Primary Examiner* — Dady Chery
(74) *Attorney, Agent, or Firm* — Holland & Hart LLP

(57) ABSTRACT

Methods, systems, and devices for wireless communication are described that support sounding reference signal (SRS) transmission in low latency wireless transmissions. A set of shortened transmission time intervals (sTTIs) for uplink transmissions of a first wireless service may be identified; the set of sTTIs located within subframe time boundaries of a subframe of a second wireless service with a longer TTI than the sTTIs. Two or more sTTIs within the set of sTTIs may be used for SRS transmissions within the subframe time boundaries.

18 Claims, 36 Drawing Sheets

Related U.S. Application Data continuation of application No. 15/663,368, filed on Jul. 28, 2017, now Pat. No. 10,425,205.

(60) Provisional application No. 62/438,160, filed on Dec. 22, 2016.

(51) Int. Cl.
*H04W 72/0446* (2023.01)
*H04W 88/08* (2009.01)

(52) U.S. Cl.
CPC .......... *H04L 5/0082* (2013.01); *H04L 5/0092* (2013.01); *H04L 5/0007* (2013.01); *H04L 5/0053* (2013.01); *H04W 72/0446* (2013.01); *H04W 88/08* (2013.01)

(58) Field of Classification Search
CPC .... H04L 5/0053; H04L 5/0007; H04W 72/00; H04W 72/0446; H04W 88/08
See application file for complete search history.

(56) References Cited

U.S. PATENT DOCUMENTS

| | | | |
|---|---|---|---|
| 10,425,205 | B2 | 9/2019 | Hosseini et al. |
| 11,063,720 | B2 | 7/2021 | Hosseini et al. |
| 2012/0170510 | A1 | 7/2012 | Kim et al. |
| 2013/0242895 | A1 | 9/2013 | Chen et al. |
| 2013/0265977 | A1 | 10/2013 | Noh et al. |
| 2015/0092699 | A1 | 4/2015 | Chen et al. |
| 2016/0095104 | A1 | 3/2016 | Chen et al. |
| 2016/0095137 | A1 | 3/2016 | Chen et al. |
| 2016/0353436 | A1 | 12/2016 | Au et al. |
| 2017/0111894 | A1 | 4/2017 | Chen et al. |
| 2018/0049228 | A1 | 2/2018 | Lee et al. |
| 2018/0359068 | A1 | 12/2018 | Kim et al. |

FOREIGN PATENT DOCUMENTS

| | | |
|---|---|---|
| CN | 105264995 A | 1/2016 |
| EP | 2538738 A1 | 12/2012 |
| WO | WO-2010129885 A1 | 11/2010 |
| WO | WO-2010137870 A2 | 12/2010 |
| WO | WO-2013100680 A1 | 7/2013 |
| WO | WO-2014069884 A1 | 5/2014 |
| WO | WO-2016159730 A1 | 10/2016 |
| WO | WO-2016199989 A1 | 12/2016 |
| WO | WO-2017008840 A1 | 1/2017 |
| WO | WO-2017056020 A1 | 4/2017 |

OTHER PUBLICATIONS

LG Electronics: "Discussion on UL Design for Shortened TTI", 3GPP Draft, 3GPP TSG RAN WG1 Meeting #86, R1-166862, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016 (Aug. 21, 2016 ), XP051125605, Retrieved from the Internet: URL:http://www.3gpp.org/ftp/Meetings_3GPP_SYNC/RAN1/Docs/ (retrieved on Aug. 21, 2016], 4 pages.
Mitsubishi Electric: "SRS Enhancements for Latency Reduction", 3GPP Draft; R1-162581-SRS, 3rd Generation Partnership Project (3GPP), Mobile Competence Centre; 650, Route Des Lucioles; F-06921 Sophia-Antipolis Cedex; France, vol. RAN WG1, No. Busan; Apr. 11, 2016-Apr. 15, 2016 Apr. 2, 2016, XP051080270, Retrieved from the Internet: URL:http://www.3gpp.org/ftp/tsg_ran/WG1_RL1/TSGR1_84b/Docs/ [retrieved on Apr. 2, 2016], 3 pages.
Taiwan Search Report—TW106142898—TIPO—dated Jan. 13, 2021 (171290TW).
European Search Report—EP22158009—Search Authority—The Hague—dated Jun. 27, 2022 (171290EPD1).
Taiwan Search Report—TW111129823—TIPO—dated Sep. 13, 2022 (171290TWD1D1).
Intel Corporation: "Protocol Impacts of TTI Shortening," 3GPP Draft; R2-167769 Protocol Impact of TTI Reduction, 3rd Generation Partnership Project (3GPP), Mobile Competence Centre; 650, Route Des Lucioles; F-06921 Sophia-Antipolis Cedex; France, vol. RAN WG, No. Reno, Nevada, USA; Nov. 14, 2016-Nov. 18, 2016, Nov. 13, 2016, XP051177551, 4 pages, Retrieved from the Internet: URL: http://www.3gpp.org/ftp/Meetings_3GPP_SYNC/RAN2/Docs/ [retrieved on Nov. 13, 2016].
Taiwan Search Report—TW112124852—TIPO—dated Aug. 11, 2023.

SRS

SOUNDING REFERENCE SIGNAL TRANSMISSION IN LOW LATENCY WIRELESS TRANSMISSIONS

CROSS REFERENCES

The present Application for Patent is a Continuation of U.S. patent application Ser. No. 16/561,795 by Hosseini, et al., entitled, "Sounding Reference Signal Transmission In Low Latency Wireless Transmissions" filed Sep. 5, 2019, which is a Continuation of U.S. Pat. No. 10,425,205 by Hosseini, et al., entitled, "Sounding Reference Signal Transmission In Low Latency Wireless Transmissions" issued Sep. 24, 2019, which claims priority to U.S. Provisional Patent Application No. 62/438,160, entitled "Sounding Reference Signal Transmission In Low Latency Wireless Transmissions," filed Dec. 22, 2016; each of which assigned to the assignee hereof and each of which is incorporated by reference herein.

BACKGROUND

The following relates generally to wireless communication, and more specifically to sounding reference signal transmission in low latency wireless transmissions.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using different length transmission time intervals (TTI) that may be reduced in length relative to legacy LTE TTIs. Such a reduced length TTI may be referred to as a shortened TTI (sTTI) and users communicating using sTTIs may be referred to as low latency users. An sTTI may be a subset of one or more subframes that correspond to legacy TTI subframes. A base station may allocate transmission resources for sTTIs to a UE that may include time resources, frequency resources, and one or more component carriers (CCs) to be used for sTTI transmissions. Efficient allocation of such resources for data, control information, and reference signal transmissions may help to increase the efficiency of a wireless communications system.

SUMMARY

The described techniques relate to improved methods, systems, devices, or apparatuses that support sounding reference signal (SRS) transmission in low latency wireless transmissions. Generally, the described techniques provide for identifying a set of shortened transmission time intervals (sTTIs) for uplink transmissions of a first wireless service (e.g., an ultra-reliable low-latency communication (URLLC) service); the set of sTTIs located within subframe time boundaries of a subframe of a second wireless service (e.g., an enhanced Mobile Broadband (eMBB) service). Two or more sTTIs within the set of sTTIs may be used for SRS transmissions within the subframe time boundaries. In some examples, the subframe time boundaries may include two slot boundaries (e.g., 0.5 ms slot boundaries within a 1 ms subframe), and the sTTIs may be slot-aligned sTTIs such that the sTTIs do not span slot boundaries. An sTTI may have a length corresponding to a slot length in some examples. In other examples, multiple sTTIs may be located within each slot, with each sTTI having a length of two or three orthogonal frequency division multiplexing (OFDM) symbols.

In some cases, one OFDM symbol from each slot may be identified for SRS transmissions. In some examples, each slot may include two 2-symbol sTTIs and one 3-symbol sTTI, and an OFDM symbol from each 3-symbol sTTI may be selected for SRS transmissions. In some examples, two or more symbols from two or more 2-symbol sTTIs may be selected for SRS transmissions. SRS transmissions may be configured, in some examples, as aperiodic SRS transmissions or periodic SRS transmissions. In some cases, a bandwidth used for SRS transmissions may be selected to provide frequency diversity for channel estimation. Furthermore, in some cases, SRS transmissions may be multiplexed with other transmissions, such as demodulation reference signal (DMRS) transmissions or SRS transmissions from other transmitters.

A method of wireless communication is described. The method may include identifying a set of sTTIs for uplink transmissions of a first wireless service, the set of sTTIs located within subframe time boundaries of a subframe of a second wireless service, identifying two or more sTTIs within the set of sTTIs for transmission of SRS transmissions within the subframe time boundaries, and transmitting one or more SRS transmissions in at least one of the two or more sTTIs.

An apparatus for wireless communication is described. The apparatus may include means for identifying a set of sTTIs for uplink transmissions of a first wireless service, the set of sTTIs located within subframe time boundaries of a subframe of a second wireless service, means for identifying two or more sTTIs within the set of sTTIs for transmission of SRS transmissions within the subframe time boundaries, and means for transmitting one or more SRS transmissions in at least one of the two or more sTTIs.

Another apparatus for wireless communication is described. The apparatus may include a processor, memory in electronic communication with the processor, and instructions stored in the memory. The instructions may be operable, when executed by the processor, to cause the apparatus to identify a set of sTTIs for uplink transmissions of a first wireless service, the set of sTTIs located within subframe time boundaries of a subframe of a second wireless service, identify two or more sTTIs within the set of sTTIs for transmission of SRS transmissions within the subframe time boundaries, and transmit one or more SRS transmissions in at least one of the two or more sTTIs.

A non-transitory computer readable medium for wireless communication is described. The non-transitory computer-readable medium may include instructions operable to cause a processor to identify a set of sTTIs for uplink transmissions of a first wireless service, the set of sTTIs located within subframe time boundaries of a subframe of a second wireless service, identify two or more sTTIs within the set of sTTIs for transmission of SRS transmissions within the subframe time boundaries, and transmit one or more SRS transmissions in at least one of the two or more sTTIs.

In some examples of the method, apparatus, and non-transitory computer-readable medium described above, a number of SRS transmissions within the subframe time boundaries may be configurable by a base station.

Some examples of the method, apparatus, and non-transitory computer-readable medium described above may further include processes, features, means, or instructions for identifying a first subset of the set of sTTIs that each span two OFDM symbols and a second subset of the set of sTTIs that each span three OFDM symbols. Some examples of the method, apparatus, and non-transitory computer-readable medium described above may further include processes, features, means, or instructions for configuring the two or more sTTIs of the second subset for SRS transmissions.

In some examples of the method, apparatus, and non-transitory computer-readable medium described above, the identifying the second subset comprises identifying a first three-symbol sTTI as an initial sTTI of a first slot within the subframe time boundaries, identifying a second three-symbol sTTI as a final sTTI of a second slot within the subframe time boundaries, and identifying a first SRS symbol within the first three-symbol sTTI for a first SRS transmission and a second SRS symbol within the second three-symbol sTTI for a second SRS transmission, wherein the second SRS symbol of a first subframe may be adjacent to the first SRS symbol of a subsequent subframe. Some examples of the method, apparatus, and non-transitory computer-readable medium described above may further include processes, features, means, or instructions for selecting a first frequency band for the first SRS transmission. Some examples of the method, apparatus, and non-transitory computer-readable medium described above may further include processes, features, means, or instructions for selecting a second frequency band for the second SRS transmission that may be different than the first frequency band, wherein the first frequency band and the second frequency band may be selected to provide frequency diversity between the first SRS transmission and the second SRS transmission. In some examples of the method, apparatus, and non-transitory computer-readable medium described above, the locations of the first SRS symbol and the second SRS symbol may be selected to provide reduced transient time for a change in one or more of an uplink transmit power or a resource block allocation associated with the first SRS transmission and the second SRS transmission.

In some examples of the method, apparatus, and non-transitory computer-readable medium described above, the identifying the second subset comprises identifying a final sTTI within each of a first slot and a second slot within the subframe time boundaries as three-symbol sTTIs. In some examples of the method, apparatus, and non-transitory computer-readable medium described above, an SRS symbol location within each sTTI of the second subset may be selected to provide time diversity between subsequent SRS transmissions and wherein frequency bands for the subsequent SRS transmissions may be selected to provide frequency diversity between the subsequent SRS transmissions.

Some examples of the method, apparatus, and non-transitory computer-readable medium described above may further include processes, features, means, or instructions for selecting the SRS symbol location within the first slot to be either an initial symbol or a last symbol of the associated three-symbol sTTI. Some examples of the method, apparatus, and non-transitory computer-readable medium described above may further include processes, features, means, or instructions for selecting the SRS symbol location within the second slot to be a last symbol of the associated three-symbol sTTI.

Some examples of the method, apparatus, and non-transitory computer-readable medium described above may further include processes, features, means, or instructions for identifying a subset of the set of sTTIs that each span two OFDM symbols. Some examples of the method, apparatus, and non-transitory computer-readable medium described above may further include processes, features, means, or instructions for configuring two or more sTTIs of the subset for SRS transmissions. In some examples of the method, apparatus, and non-transitory computer-readable medium described above, the two or more two-symbol sTTIs within each of a first slot and a second slot within the subframe time boundaries may be configured for SRS transmissions. In some examples of the method, apparatus, and non-transitory computer-readable medium described above, one or both of the OFDM symbols within the two or more sTTIs may be configured for SRS transmissions.

Some examples of the method, apparatus, and non-transitory computer-readable medium described above may further include processes, features, means, or instructions for receiving an aperiodic configuration in an uplink grant that indicates resources for the one or more SRS transmissions in at least one of the two or more sTTIs. Some examples of the method, apparatus, and non-transitory computer-readable medium described above may further include processes, features, means, or instructions for receiving a downlink grant that indicates an uplink control channel transmission is to be transmitted. Some examples of the method, apparatus, and non-transitory computer-readable medium described above may further include processes, features, means, or instructions for determining, based at least in part on the downlink grant, that the one or more SRS transmissions may be to be transmitted. In some examples of the method, apparatus, and non-transitory computer-readable medium described above, the determining may be based at least in part on an indication that data and a DMRS are to be transmitted in two symbols of a three symbol sTTI.

In some examples of the method, apparatus, and non-transitory computer-readable medium described above, the one or more SRS transmissions may be used as filler in one or more sTTIs that otherwise contain no uplink transmissions.

Some examples of the method, apparatus, and non-transitory computer-readable medium described above may further include processes, features, means, or instructions for receiving configuration information that indicates resources for periodic SRS transmissions. In some examples of the method, apparatus, and non-transitory computer-readable medium described above, the configuration information comprises an indication of cell-specific sTTIs and UE-specific sTTIs that are to be used for SRS transmissions, and wherein the method, apparatus, and non-transitory computer-readable medium described above may further include processes, features, means, or instructions for identifying a first sTTI for SRS transmission when the first sTTI corresponds to both a cell-specific sTTI and a UE-specific sTTI.

Some examples of the method, apparatus, and non-transitory computer-readable medium described above may further include processes, features, means, or instructions for identifying a first bandwidth for the one or more SRS transmissions based at least in part on one or more of a channel bandwidth or an sTTI length for uplink transmissions. In some examples of the method, apparatus, and non-transitory computer-readable medium described above, the first bandwidth for a first SRS transmission may be increased relative to a second bandwidth for one or more other SRS transmissions associated with the second wireless service.

Some examples of the method, apparatus, and non-transitory computer-readable medium described above may further include processes, features, means, or instructions for multiplexing a DMRS with a first SRS in a first symbol that may be configured for both DMRS and SRS transmission. In some examples of the method, apparatus, and non-transitory computer-readable medium described above, the multiplexing comprises transmitting the DMRS in a first interlace of the first symbol, and transmitting the first SRS in a second interlace of the first symbol. In some examples of the method, apparatus, and non-transitory computer-readable medium described above, the multiplexing comprises transmitting the DMRS in a first interlace of the first symbol using a first cyclic shift, and transmitting the first SRS in the first interlace of the first symbol using a second cyclic shift. In some examples of the method, apparatus, and non-transitory computer-readable medium described above, the multiplexing comprises transmitting the DMRS using a first cyclic shift, and transmitting the first SRS using a second cyclic shift. In some examples of the method, apparatus, and non-transitory computer-readable medium described above, the multiplexing comprises transmitting the DMRS using a first set of antenna ports, and transmitting the first SRS using a second set of antenna ports that may be different than the first set of antenna ports.

A method of wireless communication is described. The method may include identifying a set of sTTIs for uplink transmissions of a first wireless service, the set of sTTIs located within subframe time boundaries of a subframe of a second wireless service, identifying two or more sTTIs within the set of sTTIs for transmission of SRS transmissions within the subframe time boundaries, and configuring a UE to transmit one or more SRS transmissions in at least one of the two or more sTTIs.

An apparatus for wireless communication is described. The apparatus may include means for identifying a set of sTTIs for uplink transmissions of a first wireless service, the set of sTTIs located within subframe time boundaries of a subframe of a second wireless service, means for identifying two or more sTTIs within the set of sTTIs for transmission of SRS transmissions within the subframe time boundaries, and means for configuring a UE to transmit one or more SRS transmissions in at least one of the two or more sTTIs.

Another apparatus for wireless communication is described. The apparatus may include a processor, memory in electronic communication with the processor, and instructions stored in the memory. The instructions may be operable, when executed by the processor, to cause the apparatus to identify a set of sTTIs for uplink transmissions of a first wireless service, the set of sTTIs located within subframe time boundaries of a subframe of a second wireless service, identify two or more sTTIs within the set of sTTIs for transmission of SRS transmissions within the subframe time boundaries, and configure a UE to transmit one or more SRS transmissions in at least one of the two or more sTTIs.

A non-transitory computer readable medium for wireless communication is described. The non-transitory computer-readable medium may include instructions operable to cause a processor to identify a set of sTTIs for uplink transmissions of a first wireless service, the set of sTTIs located within subframe time boundaries of a subframe of a second wireless service, identify two or more sTTIs within the set of sTTIs for transmission of SRS transmissions within the subframe time boundaries, and configure a UE to transmit one or more SRS transmissions in at least one of the two or more sTTIs.

Some examples of the method, apparatus, and non-transitory computer-readable medium described above may further include processes, features, means, or instructions for configuring a first subset of the set of sTTIs that each span two OFDM symbols and a second subset of the set of sTTIs that each span three OFDM symbols. Some examples of the method, apparatus, and non-transitory computer-readable medium described above may further include processes, features, means, or instructions for configuring two or more sTTIs of the second subset for the one or more SRS transmissions.

In some examples of the method, apparatus, and non-transitory computer-readable medium described above, the configuring the second subset comprises configuring a first three-symbol sTTI as an initial sTTI of a first slot within the subframe time boundaries, configuring a second three-symbol sTTI as a final sTTI of a second slot within the subframe time boundaries, and configuring a first SRS symbol within the first three-symbol sTTI for a first SRS transmission and a second SRS symbol within the second three-symbol sTTI for a second SRS transmission, wherein the second symbol of a first subframe may be adjacent to the first symbol of a subsequent subframe. In some examples of the method, apparatus, and non-transitory computer-readable medium described above, the locations of the first SRS symbol and the second SRS symbol may be selected to provide reduced transient time for a change in one or more of an uplink transmit power or a resource block allocation associated with the first SRS transmission and the second SRS transmission.

In some examples of the method, apparatus, and non-transitory computer-readable medium described above, the configuring the second subset comprises configuring a final sTTI within each of a first slot and a second slot within the subframe time boundaries as three-symbol sTTIs.

Some examples of the method, apparatus, and non-transitory computer-readable medium described above may further include processes, features, means, or instructions for identifying a subset of the set of sTTIs that each span two OFDM symbols. Some examples of the method, apparatus, and non-transitory computer-readable medium described above may further include processes, features, means, or instructions for configuring two or more sTTIs of the subset for the one or more SRS transmissions. In some examples of the method, apparatus, and non-transitory computer-readable medium described above, one or both of the OFDM symbols within the two or more sTTIs may be configured for SRS transmissions.

Some examples of the method, apparatus, and non-transitory computer-readable medium described above may further include processes, features, means, or instructions for transmitting an aperiodic configuration in an uplink grant to the UE that indicates resources for the one or more SRS transmissions. Some examples of the method, apparatus, and non-transitory computer-readable medium described above may further include processes, features, means, or instructions for transmitting a downlink grant to the UE that indicates an uplink control channel transmission is to be transmitted and that the one or more SRS transmissions are to be transmitted. In some examples of the method, apparatus, and non-transitory computer-readable medium described above, a determination that the one or more SRS transmissions may be to be transmitted may be based at least in part on an indication in the downlink grant that data and a DMRS are to be transmitted in two symbols of a three symbol sTTI.

Some examples of the method, apparatus, and non-transitory computer-readable medium described above may further include processes, features, means, or instructions for transmitting configuration information that indicates resources for periodic SRS transmissions. In some examples of the method, apparatus, and non-transitory computer-readable medium described above, the configuration information comprises an indication of cell-specific sTTIs and UE-specific sTTIs that may be to be used for SRS transmissions, and a first sTTI for SRS transmission may be identified when the first sTTI corresponds to both a cell-specific sTTI and a UE-specific sTTI.

Some examples of the method, apparatus, and non-transitory computer-readable medium described above may further include processes, features, means, or instructions for identifying a first bandwidth for a first SRS transmission of the one or more SRS transmissions based at least in part on one or more of a channel bandwidth or an sTTI length for uplink transmissions.

Some examples of the method, apparatus, and non-transitory computer-readable medium described above may further include processes, features, means, or instructions for configuring the UE to multiplex a DMRS with a first SRS transmission in a first symbol. Some examples of the method, apparatus, and non-transitory computer-readable medium described above may further include processes, features, means, or instructions for receiving the DMRS in a first interlace of the first symbol, and receiving the first SRS transmission in a second interlace of the first symbol. Some examples of the method, apparatus, and non-transitory computer-readable medium described above may further include processes, features, means, or instructions for receiving the DMRS in a first interlace of the first symbol using a first cyclic shift, and receiving the first SRS transmission in the first interlace of the first symbol using a second cyclic shift. Some examples of the method, apparatus, and non-transitory computer-readable medium described above may further include processes, features, means, or instructions for receiving the DMRS using a first cyclic shift, and receiving the first SRS using a second cyclic shift. Some examples of the method, apparatus, and non-transitory computer-readable medium described above may further include processes, features, means, or instructions for receiving the DMRS using a first set of antenna ports, and receiving the first SRS transmission using a second set of antenna ports that may be different than the first set of antenna ports.

DETAILED DESCRIPTION

Figure 1:
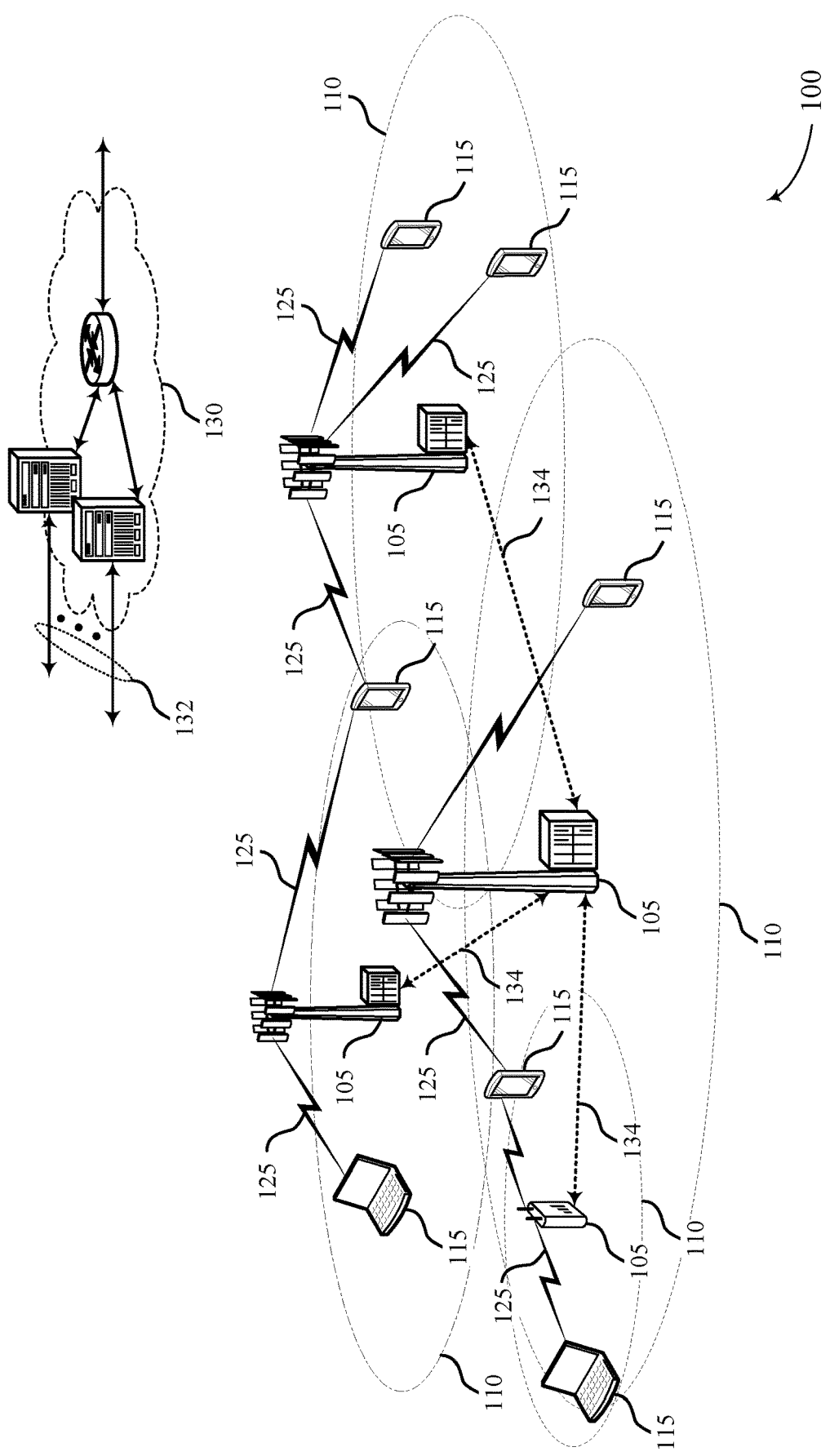
FIG. 1 illustrates an example of a system for wireless communication that supports SRS transmission in low latency wireless transmissions in accordance with aspects of the present disclosure.

Improved methods, systems, devices, or apparatuses of various examples may be used to support sounding reference signal (SRS) transmission for shortened transmission time interval (sTTI) communications in low latency wireless communications systems. Resources allocated for low latency communication may be used for uplink and downlink communication using sTTIs that have a reduced length relative to TTIs of communications that may be relatively latency insensitive, such as enhanced mobile broadband (eMBB) transmissions that may use a 1 ms TTI duration. Communications using sTTIs may use, in some cases, an sTTI duration that corresponds to one slot of a wireless subframe, or an sTTI duration that corresponds to two or three orthogonal frequency division multiplexing (OFDM) symbols. In some cases, sTTIs may be configured to have boundaries within or aligned with boundaries of a slot of a 1 ms TTI. In some examples, the sTTIs may span two or three OFDM symbols, and each slot may have three sTTIs. In such a manner, all seven symbols of a slot using a normal cyclic prefix may be utilized and system resources may be more efficiently utilized relative to a case where three two-symbol sTTIs would be included in a seven-symbol slot.

Various techniques as disclosed herein may provide for identifying uplink resources for sTTI transmissions. A portion of the uplink resources may be used for reference signal transmissions, such as SRS transmissions. In some examples, resources for a number of sTTIs may be aligned within slots in a subframe boundary that include a number of sTTIs, and two or more sTTIs may be configured for SRS transmissions. An sTTI may have a length corresponding to a slot length in some examples. In other examples, multiple sTTIs may be located within each slot, with each sTTI having a length of two or three OFDM symbols.

In some cases, one OFDM symbol from each slot may be identified for SRS transmissions. In some examples, each slot may include two 2-symbol sTTIs and one 3-symbol sTTI, and an OFDM symbol from each 3-symbol sTTI may be selected for SRS transmissions. In some examples, two or more symbols from two or more 2-symbol sTTIs may be selected for SRS transmissions. SRS transmissions may be configured, in some examples, as aperiodic SRS transmissions or periodic SRS transmissions. In some cases, a bandwidth used for SRS transmissions may be selected to provide frequency diversity for channel estimation. Furthermore, in some cases, SRS transmissions may be multiplexed with other transmissions, such as demodulation reference signal (DMRS) transmissions or SRS transmissions from other transmitters.

Low latency communications using sTTIs may be used in systems, for example, that may support multiple different services for data communications. Different services may be selected depending upon the nature of the communications. For example, communications that require low latency and high reliability, sometimes referred to as mission critical (MiCr) communications, may be served through a lower-latency service (e.g., a URLLC service) that uses sTTIs. Correspondingly, communications that are more delay-tolerant may be served through a service that provides relatively higher throughput with somewhat higher latency, such as a mobile broadband service (e.g., an eMBB service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different cyclic prefixes.

The present disclosure describes various techniques with reference to next generation networks (e.g., 5G or NR networks) that are being designed to support features such as high bandwidth operations, more dynamic subframe/slot types, and self-contained subframe/slot types (in which hybrid automatic repeat request (HARQ) feedback for a subframe/slot may be transmitted before the end of the subframe/slot). However, such techniques may be used for any system in which TTIs of different lengths may be transmitted in a wireless communications system.

Aspects of the disclosure are initially described in the context of a wireless communications system. Various examples of SRS configurations for different sTTI resources are then discussed. Aspects of the disclosure are further illustrated by and described with reference to apparatus diagrams, system diagrams, and flowcharts that relate to reference signal pattern and pilot sharing for shortened transmission time interval wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. SRS transmissions associated with low latency communications may be transmitted from UEs 115 of wireless communications system 100 according to techniques as discussed herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a drone, or the like.

In some cases, a UE 115 may also be able to communicate directly with other UEs (e.g., using a peer-to-peer (P2P) or device-to-device (D2D) protocol). Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable and low latency communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an access node controller (ANC).

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-b may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Time intervals in LTE or NR may be expressed in multiples of a basic time unit (which may be a sampling period of $T_s=1/30,720,000$ seconds). Time resources in LTE/LTE-A may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in sTTI bursts or in selected component carriers using sTTIs). Various examples discussed herein provide techniques for shortened TTIs, which may provide SRS resources that may be present within two or more sTTIs in a subframe and that may be used by a base station 105 to estimate the uplink channel quality associated with a UE 115 over a bandwidth that may be wider than a bandwidth used for uplink data transmission from the UE 115. In some cases, one or more OFDM symbols within sTTIs of each slot may be configured for SRS transmissions.

Figure 2:
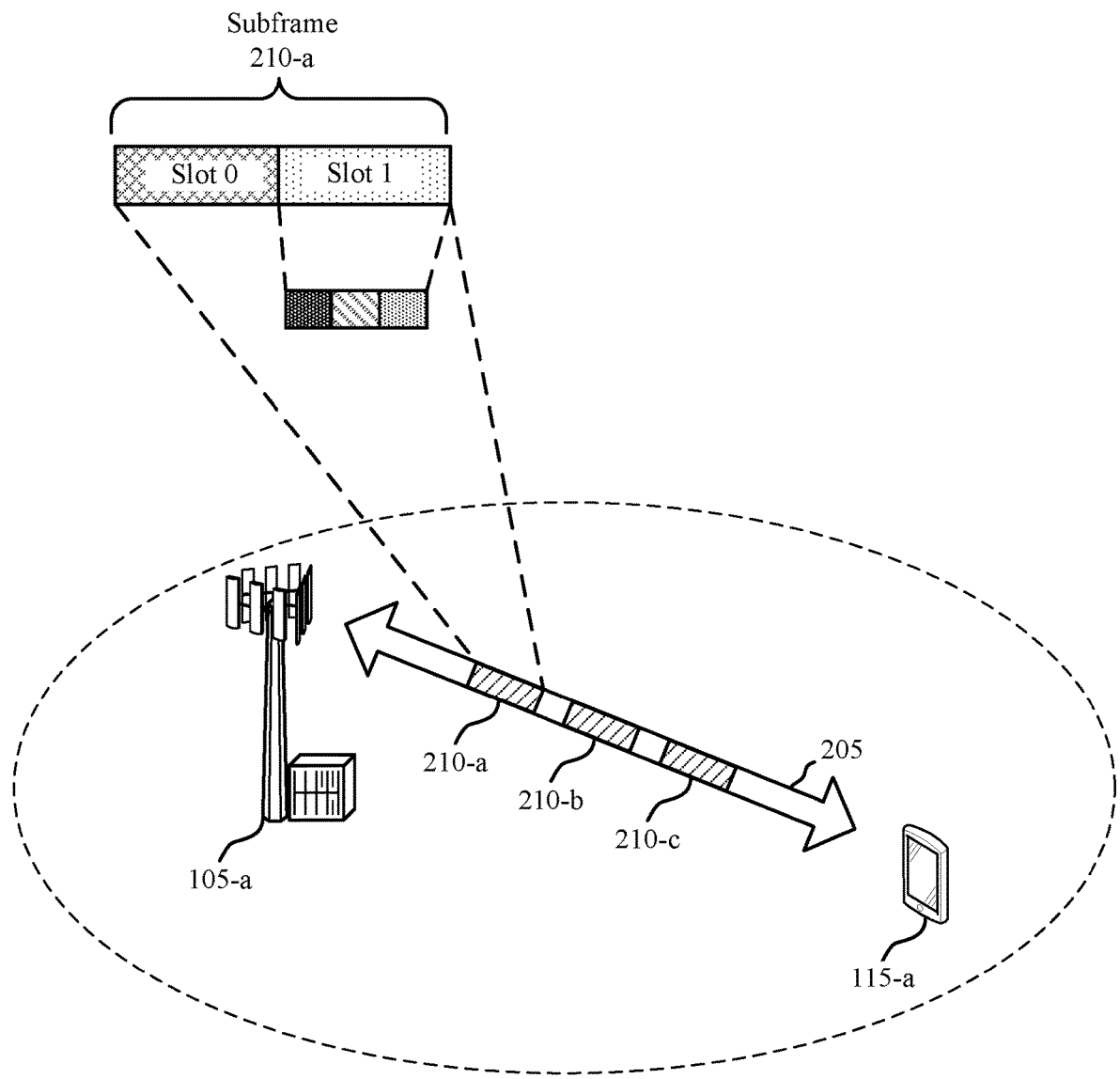
FIG. 2 illustrates an example of a wireless communication system that supports SRS transmission in low latency wireless transmissions in accordance with aspects of the present disclosure.

FIG. 2 illustrates an example of a wireless communications system 200 for sounding reference signal transmission in low latency wireless transmissions. Wireless communications system 200 includes base station 105-a and UE 115-a, which may be examples of aspects of a UE 115 as described above with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs.

Base station 105-a may communicate with UE 115-a over carrier 205. In some examples, base station 105-a may allocate resources for communication with UEs over carrier 205. For example, base station 105-*a* may allocate subframes 210 for communication with UE 115-*a*, and one or more subframes 210 may correspond to a legacy LTE TTI having a TTI length of one ms. In this example, subframes 210 may include a first subframe 210-*a*, a second subframe 210-*b*, and a third subframe 210-*c*. Each of the subframes 210 may include two slots, in which each slot may have seven symbols for a normal cyclic prefix. In this example, a first slot (slot 0) 220 and a second slot (slot 1) 225 may be included in the first subframe 210-*a*.

As indicated above, in the uplink of a low latency system, different sTTI lengths may be used for transmissions over carrier 205. For example, two-symbol sTTI, three-symbol sTTI, and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 220 or second slot 225, there may be multiple sTTIs, such as a first sTTI (TTI-0) 230, a second sTTI (TTI-1) 235, and a third sTTI (TTI-2) 240, that may each have a two or three OFDM symbol duration.

When two-symbol or three-symbol sTTI is used, in some cases it may be desirable to have a fixed sTTI structure in which sTTI boundaries lie within slot boundaries or are aligned with slot boundaries, such as the boundaries of the first slot 220 or second slot 225, which may be referred to as slot-aligned sTTIs. As discussed above, when using a normal CP, seven symbols are included in each slot 220-225, and thus each slot may include three sTTIs for slot-aligned sTTIs. As the TTI length gets shorter, it may not always possible to reuse the legacy SRS resources for SRS transmissions of sTTI transmissions, as a particular sTTI may not include a legacy SRS resource. More specifically, in legacy LTE, a SRS may be transmitted over the last OFDM symbol within a valid SRS subframe, and may be used for uplink frequency selective scheduling and/or uplink timing estimation (especially when there are no physical uplink shared channel (PUSCH) or physical uplink control channel (PUCCH) transmissions for some time).

SRS transmissions may be on the same, overlapping, or different frequency resources as those of PUSCH transmissions from UE 115-*a*. Additionally, different types of SRS are supported. More specifically, type 0 SRS may be triggered by radio resource control (RRC) signaling, which may include a single SRS or periodic SRS with periodicity ranges from 2 ms to 320 ms. Legacy SRS types also include type 1 SRS, which are configured by RRC, but triggered by DL/UL DCI, and different SRS configuration sets are defined by the higher layer and may include, for example, SRS bandwidth, frequency domain position, transmission comb index, cyclic shift (CS), and the like. From a frequency-domain resource selection perspective, SRS transmissions can be categorized as wideband SRS that occupy an entire bandwidth of interest (not necessarily the entire available bandwidth), or narrowband SRS that may be more suitable for users in poor coverage and allows UEs 115 to do frequency hopping between SRS transmissions. SRS resources may be configured by base station 105-*a* by providing a cell-specific SRS configuration that defines the subframes that can contain SRS transmission as well as the set of SRS bandwidth available in the cell. The base station 105-*a* may also provide a UE-specific SRS configuration that defines time-domain and frequency domain resources. UE 115-*a* in such deployments may send an SRS if its UE-specific SRS subframe coincides with the cell-specific SRS subframe. The UE 115-*a* may also refrain from transmissions in SRS resources of the cell-specific SRS subframe so as to avoid interference with SRS transmissions of other UEs.

When operating using sTTIs, legacy SRS configurations may not provide sufficient SRS opportunities for UE 115-*a*, as for each 1 ms subframe, there is at most one SRS transmission opportunity. Under the sTTI operation, given the finer time allocation (smaller sTTI length), various aspects of the present disclosure provide multiple SRS transmission opportunities within one subframe. Such SRS transmissions may be beneficial, for example, because it provides uplink link adaptation that can better track the channel variations over time in both FDD and TDD based systems, which may be suitable for high-speed scenarios that may rely on a URLLC service. Multiple SRS transmissions per subframe may also be beneficial in cases where the UE 115-*a* may be in poor coverage, and may be configured to transmit SRS over a relatively narrow frequency bandwidth with frequency hopping across multiple SRS opportunities, by allowing faster channel estimation (e.g., a specific band may be covered more quickly with the additional SRS transmission opportunities per subframe). Additionally, faster channel estimation that may be provided in part by the additional SRS transmissions may help to increase both network capacity as well as UE 115-*a* perceived throughput.

Figure 3:
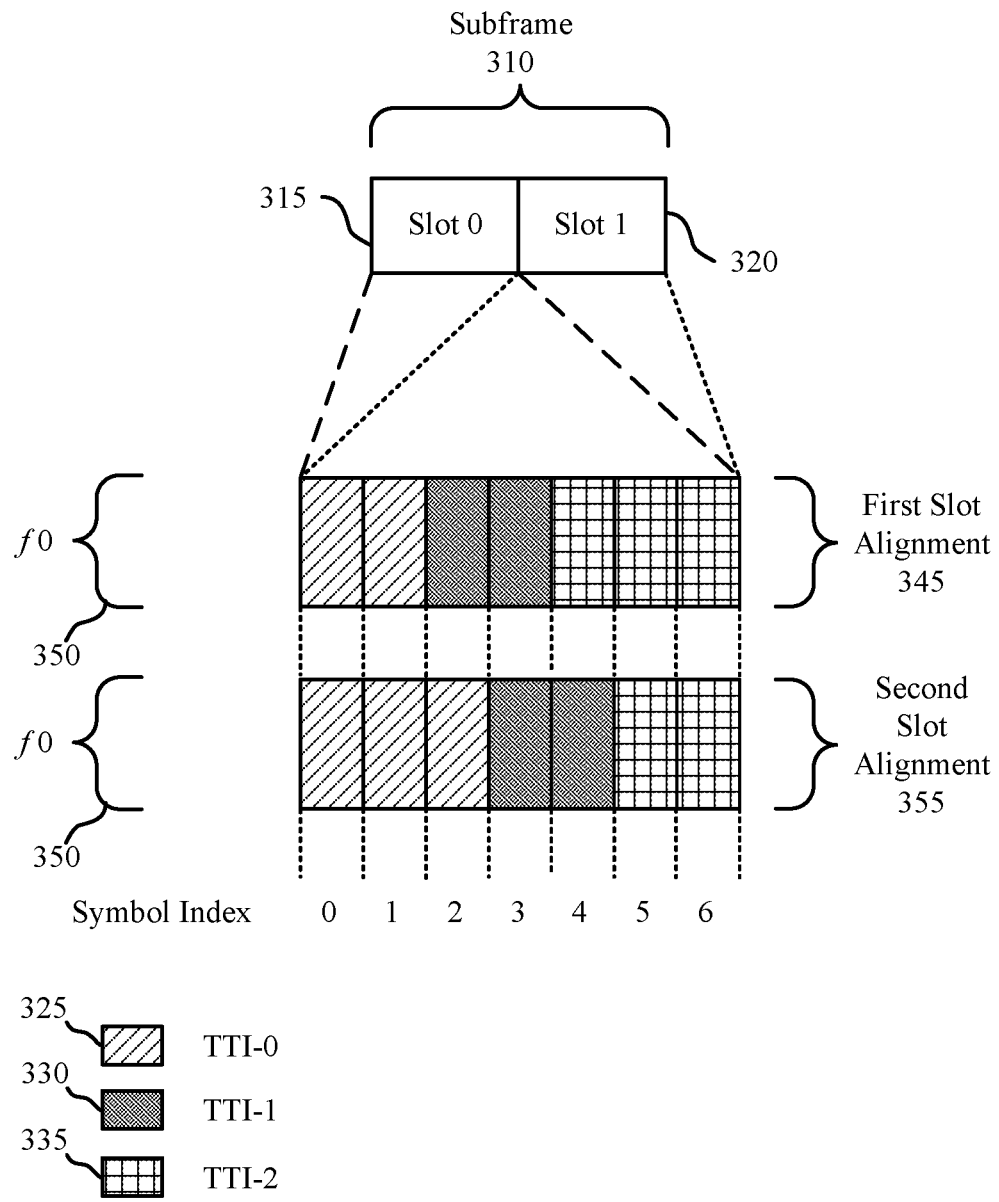
FIG. 3 illustrates an example of slot-aligned sTTI resources that support SRS transmission in low latency wireless transmissions in accordance with aspects of the present disclosure.

FIG. 3 illustrates an example of slot-aligned sTTI resources 300 that support SRS transmission in low latency wireless transmissions. The sTTI resources 300 may be used, for example, in slot-aligned sTTI patterns for low latency communications between a UE and a base station such as discussed above with respect to FIGS. 1 and 2. A subframe 310 may have resources allocated for uplink communication. Subframe 310 may include two slots: first slot (slot 0) 315 and second slot (slot 1) 320 that may correspond to 1 ms or legacy LTE TTI slots. Each slot 315 and 320 may include slot-aligned sTTIs allocated for low latency communication, for example, according to a first slot alignment 345 or a second slot alignment 355. Each slot 315 and 320 may include three sTTIs, including a first TTI (TTI-0) 325, a second TTI (TTI-1) 330, and a third TTI (TTI-2) 335, and may have frequency resources corresponding to frequency bandwidth f0 350.

Figure 4:
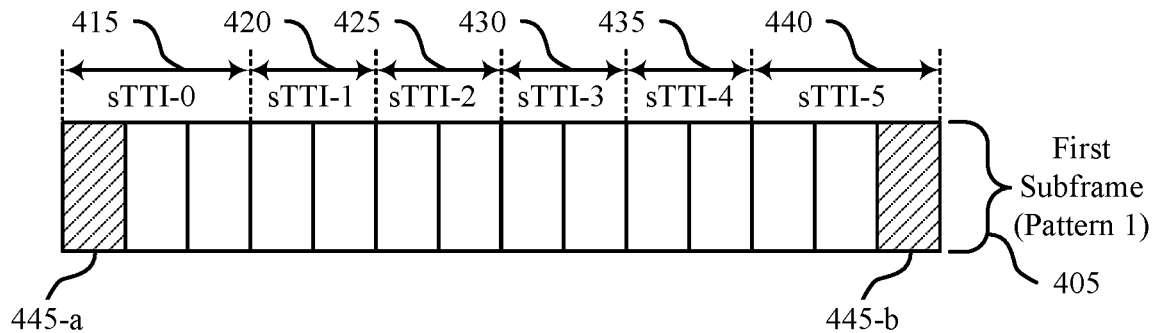
FIG. 4 illustrates an example of uplink resources within subframes that may support SRS transmission in low latency wireless transmissions in accordance with aspects of the present disclosure.
Figure 4:
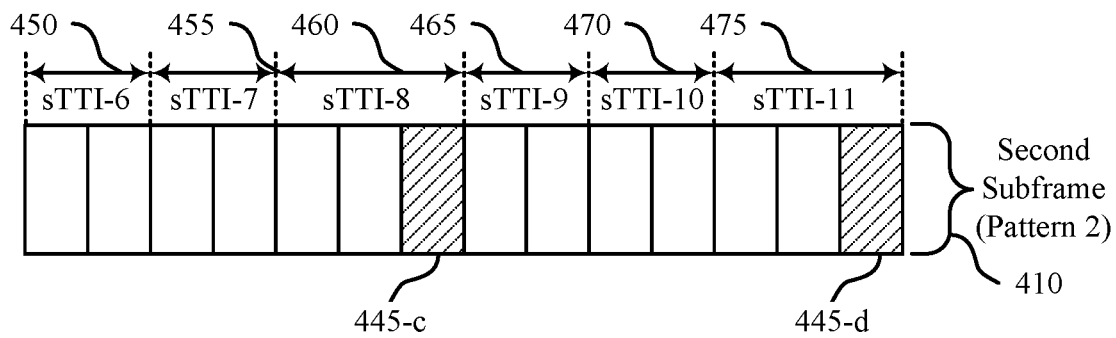

As can be seen from above, in order to make sure that the sTTIs do not cross the slot boundary within the 1 ms subframe 310, both 2-symbol and 3-symbol sTTIs may be used within slot 315 or slot 320. In the first slot alignment 345, the first sTTI 325 and the second sTTI 330 may each have two OFDM symbols, and the third sTTI 335 may have three OFDM symbols. In the second slot alignment 355, the first sTTI 325 may have three symbols, with the second sTTI 330 and the third sTTI 335 each having two OFDM symbols. In some examples, a particular subframe 310 may be configured with a pattern based on slot 0 315 having the second slot alignment 355 and slot 1 320 having the first slot alignment 345 (i.e., a [3,2,2,2,2,3] pattern, which may be referred to herein as pattern 1). In other examples, the subframe 310 may be configured with a pattern based on both slot 0 315 and slot 1 320 having the first slot alignment 345 (i.e., a [2,2,3,2,2,3] pattern, which may be referred to herein as pattern 2). Of course, other patterns of 2-symbol and 3-symbol sTTIs within slots, and different patterns of slots within subframes, may be used, and the examples provided herein are provided for purposes of illustration and discussion with the understanding that the similar techniques may be used for other patterns. FIG. 4 illustrates resources within subframes having different sTTI patterns that may be used for SRS transmissions.

FIG. 4 illustrates an example of uplink resources 400 within subframes that may support SRS transmission in low latency wireless transmissions. The uplink resources 400 may be used, for example, in slot-aligned sTTI patterns for low latency communications between a UE and a base station such as discussed above with respect to FIGS. 1 through 3. In this example, a first subframe 405 may be configured with pattern 1, and may have a first sTTI (sTTI-0) 415 having three OFDM symbols, second through fifth sTTIs (sTTI-1 through sTTI-4) 420-435 that may each have two OFDM symbols, and a sixth sTTI (sTTI-5) 440 that may have three OFDM symbols. Also in this example, a second subframe 410 may be configured with pattern 2, and may have a first sTTI (sTTI-6) 450 and second sTTI (sTTI-7) 455 that have two OFDM symbols, a third sTTI (sTTI-8) 460 that has three OFDM symbols, followed by fourth sTTI (sTTI-9) 465 and fifth sTTI (sTTI-10) 470 that have two OFDM symbols, and sixth sTTI (sTTI-11) 475 having three OFDM symbols.

In some examples, 3-symbol sTTIs may be configured with resources for SRS 445 transmissions. In such examples, the first subframe 405 may have SRS resources 445-a present in sTTI-0 415, and SRS resources 445-b present in sTTI-5 440. Second subframe 410 in such examples may have SRS resources 445-c present in sTTI-8 460, and SRS resources 445-d present in sTTI-11 475. In the case of uplink transmissions that use pattern 1 of the first subframe 405, consecutive subframes will have adjacent 3-symbol sTTIs, and thus time diversity gain from multiple SRS 445 transmissions within subframes may be small. In some examples, as will be discussed in more detail below, SRS 445 transmissions from adjacent sTTIs may be transmitted over different frequency bands for frequency diversity that may allow an entire available bandwidth to be covered relatively quickly. SRS 445 transmissions in such adjacent sTTIs, in other examples, may be transmitted over the same frequency band, which may allow for some time diversity and may be used, for example, in situations where a UE is traveling at a high speed relative to a base station.

In the case of uplink transmissions that use pattern 2 of the second subframe 410, the two 3-symbol sTTIs, namely sTTI-8 460 and sTTI-11 475, are evenly distributed within the second subframe 410. Hence, in some examples SRS 445-c and SRS 445-d may be transmitted using different frequency resources, and additionally, there is a possibility to obtain some channel time diversity when estimating the channel of a specific band.

Within each 3-symbol sTTI, resources can be reserved for SRS transmission in one symbol, such as the first symbol or the last symbol of a 3-symbol sTTI, thus providing patterns of [X,X,SRS] or [SRS, X, X], where X is Data/DMRS/Null. In these cases, the remaining two symbols of each 3-symbol sTTI may be used for uplink data and/or DMRS transmissions (or no transmission may be transmitted in cases where a null symbol may be present). As discussed above, subframe pattern 1 ([3,2,2,2,2,3]) may be used in some cases, and in these cases the SRS pattern within the 3-symbol sTTI may be [X,X,SRS] over the last 3-symbol sTTI of a subframe, which is consistent with the legacy SRS symbol. For the initial 3-symbol sTTI of a subframe, a pattern of [SRS, X,X] or [X,X,SRS] may be used, for example. In some cases, the initial 3-symbol sTTI is configured to have the pattern [SRS,X,X], which may provide a lower demodulation loss due to power transient times, as will be discussed in more detail below. If a subframe is configured with pattern 2 ([2,2,3,2,2,3]), then the configuration of the last 3-symbol sTTI may be the same as discussed above so as to provide consistency with the legacy SRS symbol, and the first 3-symbol sTTI of the subframe may be configured to have [SRS,X,X] or [X, X, SRS], for example.

In some examples, UEs may be configured to transmit aperiodic SRS. In such cases, the SRS transmission/location can be indicated in downlink control information (DCI) which may include an UL grant, when there is data or DMRS to transmit. In some examples, the SRS transmission/location may also be indicated in a DL grant that may indicate that the UE is to transmit a sPUCCH transmission. For example, a [DMRS,Data,SRS] pattern may be used over the 3-symbol sTTIs where [DMRS,Data] is configured in a sPUCCH transmission, and the SRS transmission is implicitly indicated without a specific grant. In some cases, the SRS can also be used as a filler, with 3-symbol sTTI or 2-symbol sTTI patterns being [Null,Null,SRS], [SRS, Null, Null], [Null,SRS], or [SRS,Null].

In some examples, UEs may be configured to transmit periodic SRS. Periodic SRS may be more suitable for scenarios where different bands are allocated to 1 ms TTI and sTTI operations, in which cases SRS transmissions outside of the last symbol of a subframe will be less likely to cause interference with data transmissions of other UEs due to being transmitted over a different frequency. Thus, one symbol within each 3-symbol sTTI in such examples can be configured as an SRS symbol, similar to legacy LTE or 1 ms TTI operation where the last symbol of a subframe is an SRS symbol, and used by UEs for periodic SRS transmission. To enable periodic SRS, a base station, in some examples, may configure certain cell-specific SRS sTTIs that are common to all UEs being served by the base station. The base station, for each served UE, may configure UE-specific SRS sTTIs. The cell-specific and UE-specific sTTIs can be defined either during the cell-specific and UE-specific SRS subframes (associated with legacy LTE service or with a 1 ms TTI service) only, or can be defined over a different set of subframes. A UE may transmit an SRS with a configured pattern when its UE-specific SRS sTTI coincides with the cell-specific SRS sTTI. Further, UEs do not send sPUSCH over the defined SRS symbol during the cell-specific SRS sTTIs, in order to avoid interference with SRS transmissions.

Figure 5:
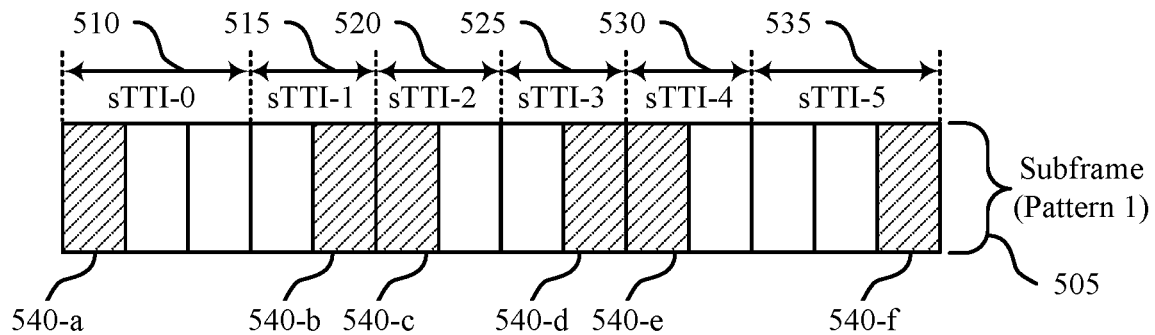
FIG. 5 illustrates another example of uplink resources within subframes that may support SRS transmission in low latency wireless transmissions in accordance with aspects of the present disclosure.

FIG. 5 illustrates another example of uplink resources 500 within subframes that may support SRS transmission in low latency wireless transmissions. The uplink resources 500 may be used, for example, in slot-aligned sTTI patterns for low latency communications between a UE and a base station such as discussed above with respect to FIGS. 1 through 3. In this example, a subframe 505 may be configured with pattern 1, and may have a first sTTI (sTTI-0) 510 having three OFDM symbols, second through fifth sTTIs (sTTI-1 through sTTI-4) 515-530 that may each have two OFDM symbols, and a sixth sTTI (sTTI-5) 535 that may have three OFDM symbols.

In some examples, both 3-symbol sTTIs and 2-symbol sTTIs may be configured with resources for SRS 540 transmissions. In such examples, 2-symbol sTTIs may provide additional SRS opportunities, and frequency resources for the SRS 540 transmissions may be selected to provide frequency hopping that may cover a transmission bandwidth of interest in a relatively short period, and SRS 540 resources for some SRS 540 transmissions may be selected to have the same frequency resources with a large enough time spacing to provide good time diversity. The frequency diversity and time diversity may be used to estimate uplink channel quality over the desired transmission bandwidth. In the example of FIG. 5, the symbols within each sTTI 510-535 to use for SRS transmission may be selected so as to provide adjacent symbols with SRS transmissions, which may provide reduced transient times and enhance demodulation performance for any data transmissions that may be present in the non-SRS symbols, as will be discussed in more detail below. Over the 2-symbol sTTIs, different symbols may be configured as [SRS,SRS], [Null,SRS], [SRS,Null], [DMRS,SRS], [SRS,DMRS], [data,SRS] or [SRS,data]. The data, SRS, DMRS, null patterns for the 3-symbol sTTIs may include any available combination, such as the patterns discussed above. In some cases, since each sTTI in such examples includes at least one SRS transmission, SRS transmissions may be configured according to an aperiodic configuration, which may help to reduce potential impact on concurrent 1 ms transmissions.

Figure 6:
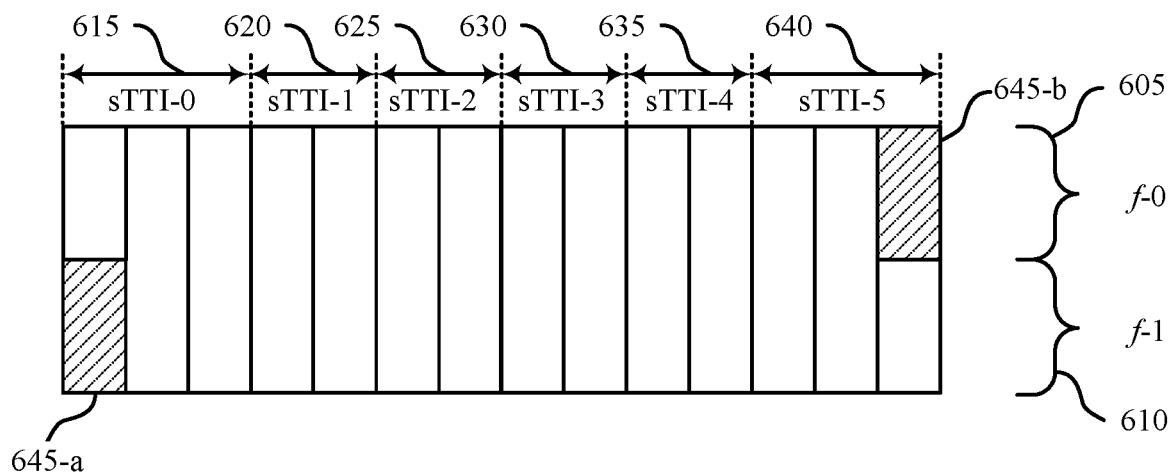
FIG. 6 illustrates an example of frequency bands in a subframe that may be selected for SRS transmissions in low latency wireless transmissions in accordance with aspects of the present disclosure.
Figure 6:

FIG. 6 illustrates an example of frequency bands in a subframe 600 that may be selected for SRS transmissions in low latency wireless transmissions. The subframe 600 may be used, for example, in low latency communications between a UE and a base station such as discussed above with respect to FIGS. 1 and 2. In this example, subframe 600 may be configured with pattern 1, and may have a first frequency band f-0 605 and a second frequency band f-1 610 that may be used for uplink transmissions. The subframe 600 configured with pattern 1 may have a first sTTI (sTTI-0) 615 having three OFDM symbols, second through fifth sTTIs (sTTI-1 through sTTI-4) 620-635 that may each have two OFDM symbols, and a sixth sTTI (sTTI-5) 640 that may have three OFDM symbols.

As discussed above, in some cases data transmissions, such as PUSCH or sPUSCH transmissions outside of configured SRS symbols may be transmitted using a bandwidth that is less than an available system bandwidth, and SRS transmissions 645 may be transmitted on a different bandwidth than other data transmissions. In some cases, SRS transmissions 645 from a UE may be transmitted according to a frequency hopping pattern that may be configured at the UE, in which SRS transmissions 645 are transmitted on different frequencies in order to obtain channel quality information over an entire bandwidth of interest at a base station. In the example of FIG. 6, a first SRS transmission 645-a may be transmitted in an initial symbol of an initial sTTI 615 of subframe 600, using frequency resources of frequency band f-1 610. A second SRS transmission 645-b may be transmitted in a last symbol of the last sTTI 640 of subframe 600, using frequency resources of the frequency band f-0 605. While only two frequency bands are illustrated in FIG. 6, additional frequency bands may be present in some cases, with frequency resources for SRS transmissions selected based on a frequency hopping pattern for SRS, for example.

Figure 7:
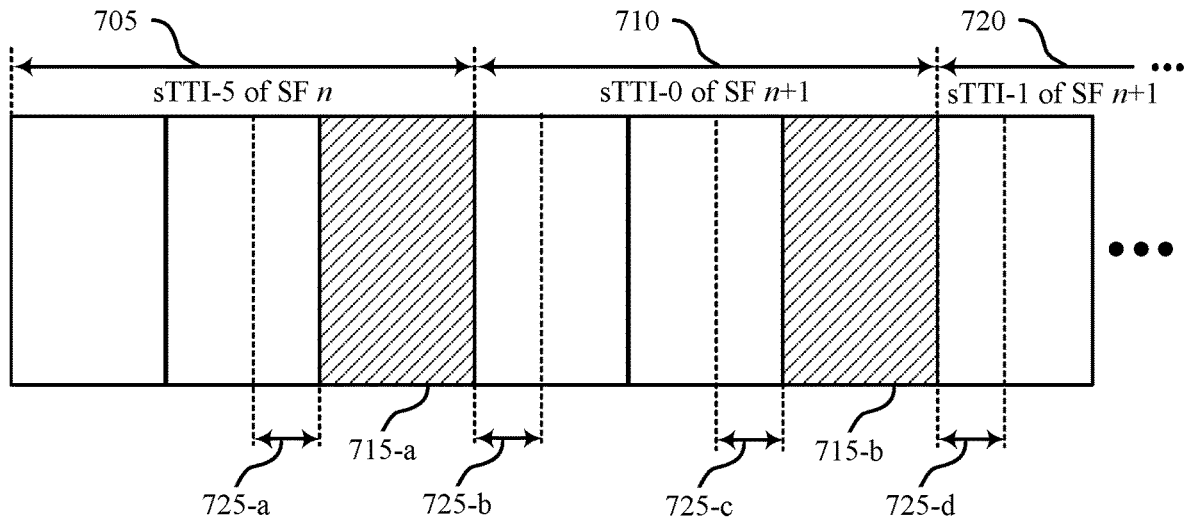
FIG. 7 illustrates an example of wireless resources and transient times for SRS transmissions in low latency wireless transmissions in accordance with aspects of the present disclosure.
Figure 7:

FIG. 7 illustrates an example of wireless resources 700 and transient times for SRS transmissions in low latency wireless transmissions. The wireless resources 700 may be used, for example, in low latency communications between a UE and a base station such as discussed above with respect to FIGS. 1 and 2. In this example, a last sTTI 705 of subframe n may be a 3-symbol sTTI and include SRS resources 715-a in a last symbol of the sTTI. A first sTTI 710 of subframe n+1 may be a 3-symbol sTTI and also include SRS resources 715-b in a last symbol of the sTTI. A second sTTI 720 of subframe n+1 may then follow. In this example, the SRS resources 715 are in a last symbol of a 3-symbol sTTI regardless of the location of the particular sTTI within a subframe. In such cases, transient times associated with SRS transmissions using SRS resources 715 may be present before and after the SRS transmissions, because the SRS transmissions themselves may be configured to provide SRS at a steady power over configured resource blocks (RBs), and thus the transmitting UE uses time before and after the SRS to perform power and/or RB allocation change between the SRS transmissions and adjacent data or DMRS transmissions.

Thus, in cases where the SRS 715 symbols are not consecutive, such as in the example of FIG. 7, transient times 725 are present adjacent to each SRS resource 715, with a first transient time 725-a before the first SRS resource 715-a, which is followed by a second transient time 725-b. Similarly, non-adjacent SRS resource 715-b is preceded by transient time 725-c and followed by transient time 725-d. In some examples, a 40 µs transient time is allowed for adjusting transmit power and/or RB allocation, although other transient times may be used in other examples. In this case, the last sTTI 705 of subframe n has X µs of transient time, corresponding to transient time 725-a. However, the first sTTI 710 of subframe n+1 has two transient times, corresponding to transient time 725-b and transient time 725-c, thus resulting in the first sTTI 710 of subframe n+1 having 2× µs of transient time. Further, the second sTTI 720 of subframe n+1 is impacted as well, with X µs of transient time, corresponding to transient time 725-d. Thus, a considerable portion of the first sTTI 710 in subframe n+1, or within any first sTTI of a subframe, is subject to transient times which may have a negative impact on demodulation performance. The impact of transient times is reduced, in some examples, by configuring SRS symbols to be adjacent in cases where adjacent sTTIs have SRS transmissions, which is discussed below with respect to FIG. 8.

Figure 8:
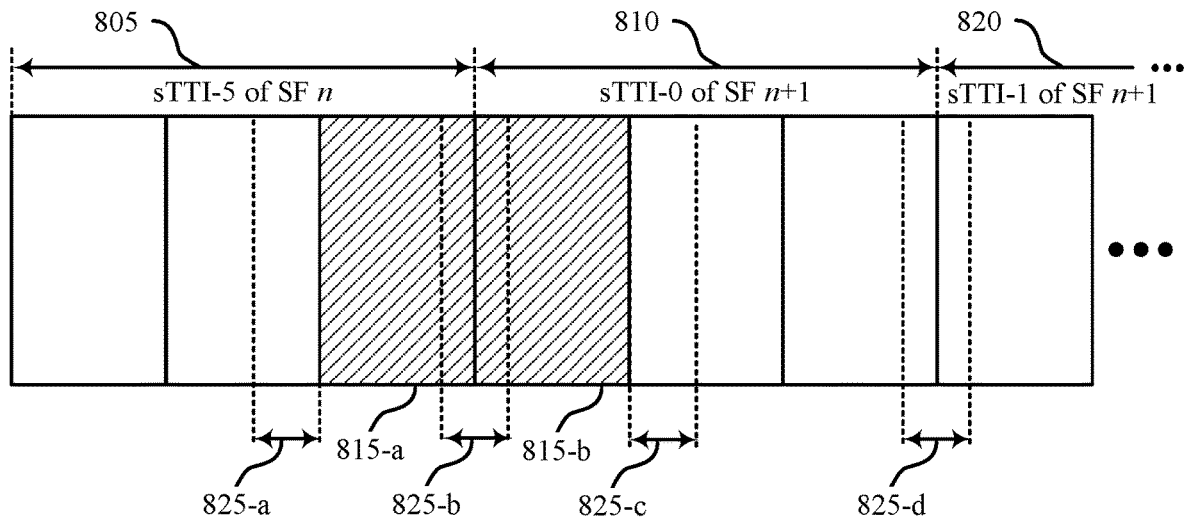
FIG. 8 illustrates another example of wireless resources and transient times for SRS transmissions in low latency wireless transmissions in accordance with aspects of the present disclosure.

FIG. 8 illustrates another example of wireless resources 800 and transient times for SRS transmissions in low latency wireless transmissions. The wireless resources 800 may be used, for example, in low latency communications between a UE and a base station such as discussed above with respect to FIGS. 1 and 2.

In this example, a last sTTI 805 of subframe n may be a 3-symbol sTTI and include SRS resources 815-a in a last symbol of the sTTI 805. A first sTTI 810 of subframe n+1 may be a 3-symbol sTTI and include SRS resources 815-b in an initial symbol of the sTTI 810, thus providing adjacent SRS resources 815 in subframes n and n+1. A second sTTI 820 of subframe n+1 may then follow sTTI 810. In this example, transient times associated with SRS transmissions using SRS resources 815 again may be present before and after the SRS transmissions, but because the SRS resources 815 are in consecutive symbols the impact on demodulation performance is reduced.

In the example of FIG. 8, X µs of the last sTTI 805 of subframe n, corresponding to transient time 825-a, and 1.5× µs of the first sTTI 810 of subframe n+1, corresponding to transient time 825-c and ½ of the transient time 825-d. Transient time 825-d is shared between sTTI 810 and sTTI 820, which may be due to RB allocation and/or uplink power adjustment between sTTIs. A transient time 825-b may be present between the adjacent SRS resources 815, and may be due to a resource block (RB) allocation change, for example, and may be divided between the two SRS symbols. An improved demodulation quality may result, as compared to the example of FIG. 7. Thus, in some examples, locations of SRS symbols may be selected to provide reduced transient time for a change in one or more of an uplink transmit power or a resource block allocation. Such techniques may be used for SRS transmissions in 3-symbol sTTIs and/or for SRS transmissions in 2-symbol sTTIs.

Figure 9:
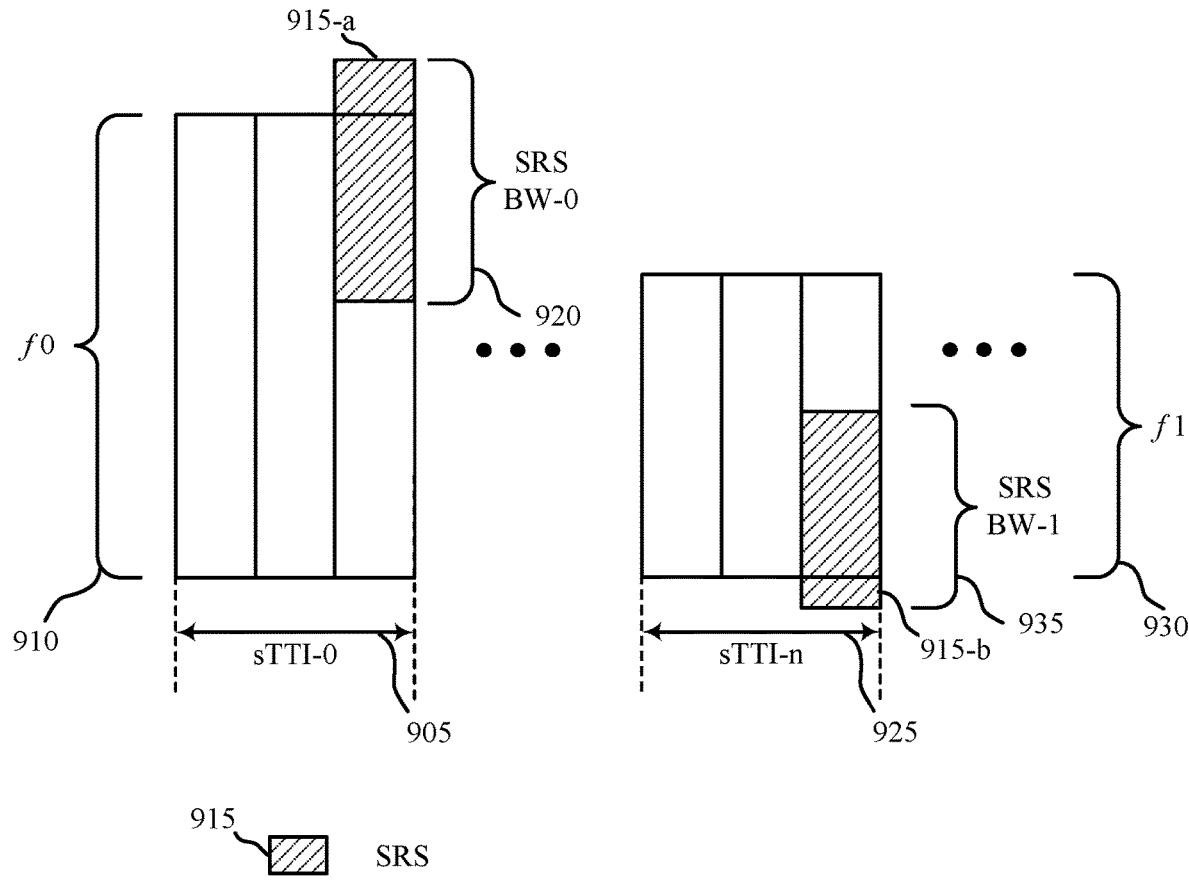
FIG. 9 illustrates an example of frequency resources that may support SRS transmission in low latency wireless transmissions in accordance with aspects of the present disclosure.

FIG. 9 illustrates an example of frequency resources 900 that may support SRS transmission in low latency wireless transmissions. The frequency resources 900 may be used, for example, in low latency communications between a UE and a base station such as discussed above with respect to FIGS. 1 and 2. In this example, a first sTTI (sTTI-0) 905 may include resources that occupy a first channel bandwidth 0) 910 and SRS resources 915-a that may occupy a first SRS bandwidth 920. The example of FIG. 9 also includes a second sTTI (sTTI-n) 925, which may include resources that occupy a second channel bandwidth (f1) 930 and SRS resources 915-b that may occupy a second SRS bandwidth 935. As discussed above, the bandwidth for SRS transmissions 915 may be different than a bandwidth used for data transmissions (e.g., sPUSCH transmissions) of a UE.

In some cases, the bandwidth of the SRS transmissions 915 may be dependent upon an sTTI length and/or a system bandwidth that is used for sTTI transmissions. In legacy LTE, and in some 1 ms TTI services, a minimum SRS bandwidth may be defined as 4 RBs. In some cases, the minimum SRS bandwidth may be increased for sTTI operation. Such an increase may be supported because a granularity of resource allocations for sTTIs may be greater than a granularity for 1 ms TTI resource allocation (e.g., due to sTTI resource allocation being based on a block-based scheme), and also because sTTI transmissions may be supported for UEs with good channel conditions (e.g., UEs that are closer to base stations). Thus, in some examples, the minimum SRS bandwidth can be sTTI length and also system bandwidth dependent. For example, 16 or 20 RB SRS resources may be provided for a 2-symbol sTTI over 10 or 20 MHz channel bandwidth, while 4 or 8 RB SRS resources may be provided for 2-symbol sTTI transmissions over smaller bandwidths. For example, 4 or 8 RB SRS resources may be provided for a slot sTTI over 10 or 20 MHz. In such a manner, frequency hopping across multiple SRS opportunities can be completed more quickly.

Figure 10:
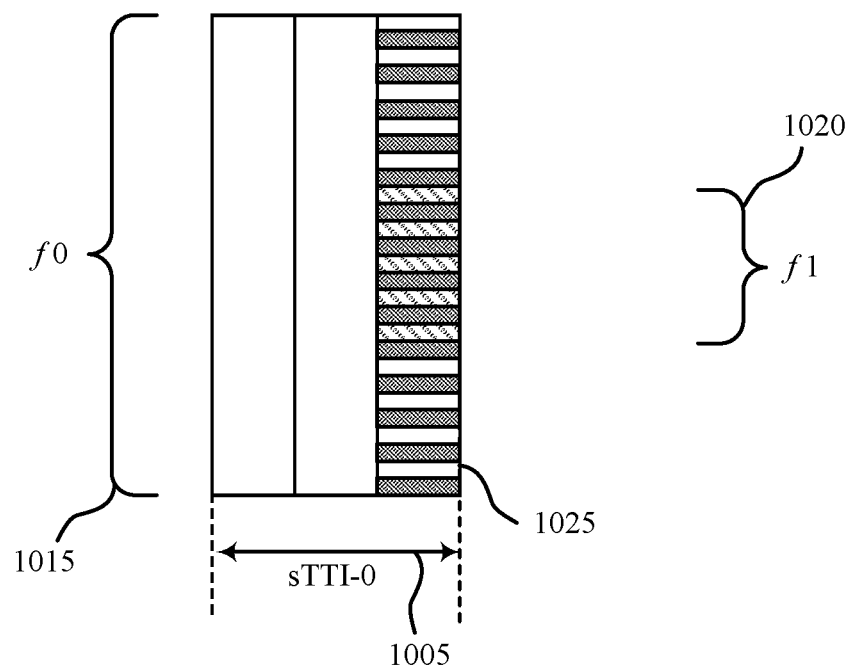
FIG. 10 illustrates an example of reference signal multiplexing that supports SRS transmission in low latency wireless transmissions in accordance with aspects of the present disclosure.
Figure 10:

FIG. 10 illustrates an example of reference signal multiplexing 1000 that supports SRS transmission in low latency wireless transmissions. Reference signal multiplexing 1000 may be used, for example, in low latency communications between a UE and a base station such as discussed above with respect to FIGS. 1 and 2. In this example, a first sTTI (sTTI-0) 1005 may include three symbols, with a last symbol 1025 of the sTTI 1005 configured with both SRS resources and DMRS resources. In the example of FIG. 10, DMRS and SRS may be multiplexed by providing a DMRS interlace 1030 and an SRS interlace 1035 within the last symbol 1025 of the first sTTI 1005. The DMRS interlace 1030 and the SRS interlace 1035 may thus provide a comb-like structure, and DMRS and SRS sent from different users can be made orthogonal.

In the example of FIG. 10, the SRS interlace 1035 may cover a system bandwidth f0 1015 that is larger than a second bandwidth f1 that is used for the DMRS interlace 1030. In other examples, the two frequenciesft and f1 may be completely overlapping. In such examples with completely overlapping reference signal resources, DMRS and SRS may be transmitted over different combs, or over the same comb with different cyclic shifts (CSs). In other examples, both DMRS and SRS may both be sent using cyclically shifted sequences of a base sequence (i.e., SRS is made similar to DMRS). In still further examples, both DMRS and SRS may be sent without using any interlaces, using different CSs.

In examples where the DMRS and SRS allocated bands, f1 and f0, are not completely overlapping, such as where one is the superset of the other one as illustrated in FIG. 10, DMRS and SRS from different users can be sent via different combs. In other examples, SRS may be transmitted using a comb-1 structure from LTE, similar to legacy DMRS transmissions. It may also be possible to share a symbol between SRS and DMRS transmitted from the same UE, in some cases. For example, when DMRS is not precoded, SRS and DMRS can be sent via different antenna ports from the UE.

Figure 11:
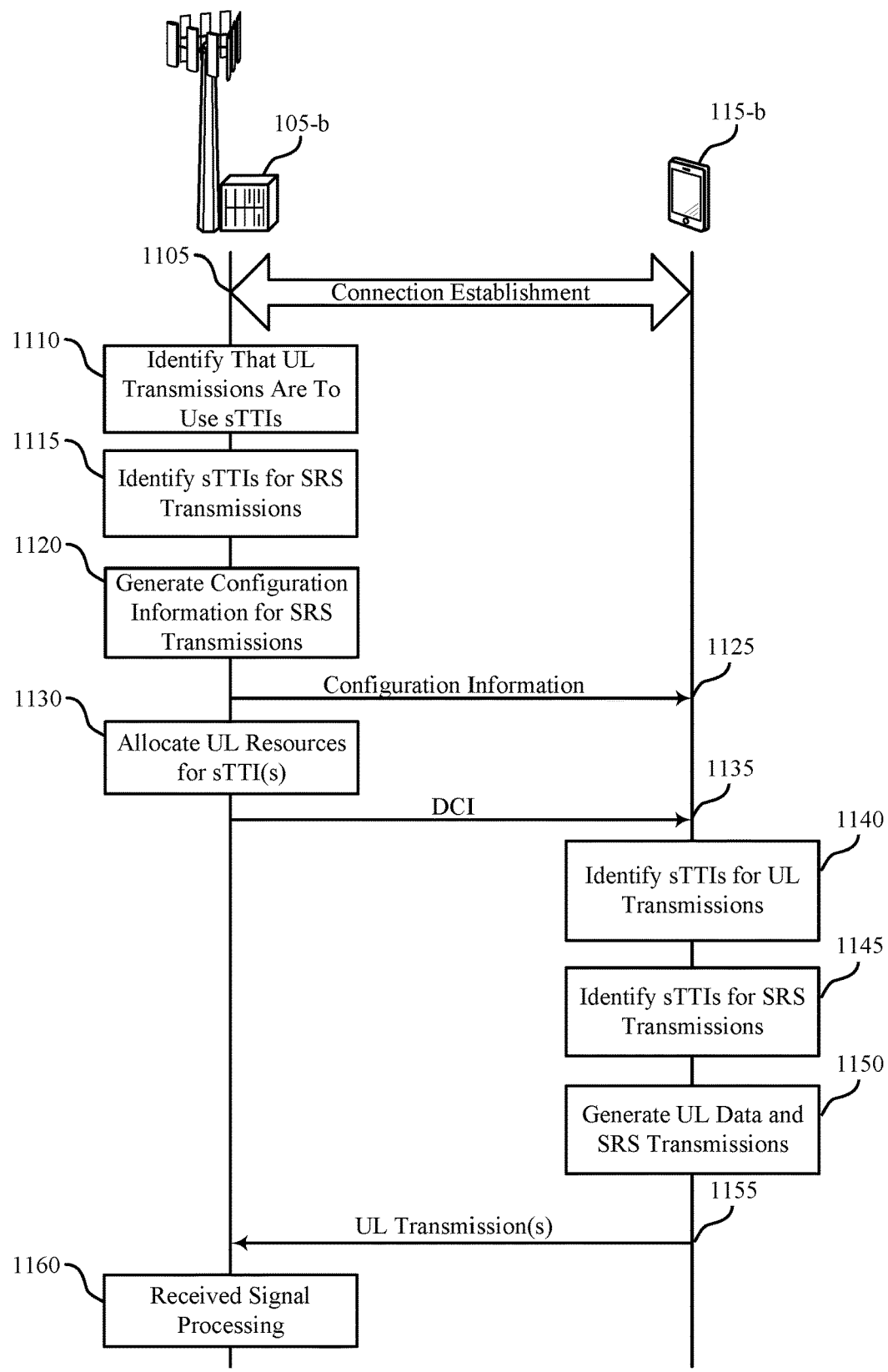
FIG. 11 illustrates an example of a process flow that supports SRS transmission in low latency wireless transmissions in accordance with aspects of the present disclosure.

FIG. 11 illustrates an example of a process flow 1100 for sounding reference signal transmission in low latency wireless transmissions. Process flow 1100 may include a base station 105-b, and a UE 115-b, which may be examples of the corresponding devices described with reference to FIGS. 1 and 2. The base station 105-b and the UE 115-b may establish a connection 1105 according to established connection establishment techniques for the wireless communications system.

At block 1110, base station 105-b may identify that UL transmissions are to use sTTIs. Such an identification may be made, for example, based on a wireless service that the UE 115-b is capable of supporting and that is to be served to the UE 115-b through the base station 105-b. For example, UE 115-b may request a URLLC service be established, which may use sTTIs, such as slot sTTIs or 2-symbol sTTIs. The UE 115-b may also support other services (e.g., eMMB services) or legacy LTE users that may operate using a 1 ms TTI, and the base station 105-b may establish communications with the UE 115-b, and other UEs (not shown) based on the 1 ms TTI length and may establish slot-aligned sTTIs for low latency communications based on subframe time boundaries of the 1 ms TTIs. For example, base station 105-b may establish an sTTI configuration in which sTTIs do not span the subframe time boundaries or slot boundaries of the 1 ms TTI services.

At block 1115, the base station 105-b may identify sTTIs for SRS transmissions. The sTTIs for SRS transmissions may be, in some examples, 3-symbol sTTIs, in which one 3-symbol sTTI is located within each slot boundary of a subframe that may be configured as an SRS subframe. In some examples, the base station 105-b may configure SRS sTTIs as cell-specific SRS sTTIs, and may configure the UE 115-b with UE-specific sTTIs, that are to be used for SRS transmissions. In some cases, the cell-specific sTTIs may be in subframes that are configured as cell-specific SRS subframes for the 1 ms TTI services, although cell-specific sTTIs may be in other subframes as well.

At block 1120, the base station 105-b may generate configuration information for SRS transmissions. The configuration information may include information on the cell-specific sTTIs and UE-specific sTTIs, for example. In some cases, the configuration information may include sTTI patterns and symbol patterns within sTTIs, along with symbols and uplink resources that are to be used for SRS transmissions. In some cases, the configuration information may include multiplexing information that the UE 115-b may use to multiplex SRS transmissions with other transmissions, such as DMRS transmissions, within a symbol that is configured with SRS resources. The base station 105-b may transmit the configuration information 1125 to the UE 115-b.

At block 1130, the base station 105-b may allocate uplink resources for sTTI(s) for uplink transmissions from the UE 115-b. The base station 105-b may allocate sTTI resources based on, for example, buffer information for low latency services for the UE 115-b. The allocated resources may include, for example, two or more sTTIs that may be configured for SRS transmissions, and the base station 105-b may expect to receive SRS transmissions in the allocated two or more sTTIs. An indication of the allocated resources may be provided in DCI 1135 that is transmitted to the UE 115-*b*.

In some examples, the base station 105-*b* may configure the UE 115-*b* to transmit aperiodic SRS, and the SRS transmission/location can be indicated in the DCI 1135. In some examples, the SRS transmission/location may also be indicated in a DL grant that may indicate that the UE is to transmit a sPUCCH transmission. For example, a [DMRS, Data,SRS] pattern may be used over the 3-symbol sTTIs where [DMRS,Data] is configured in a sPUCCH transmission, and the SRS transmission is implicitly indicated without a specific grant. In other cases, such an SRS transmission may be explicitly signaled by the base station 105-*b*.

At block 1140, the UE 115-*b* may identify sTTIs for uplink transmissions. The uplink sTTIs may be identified based on an uplink grant from the base station 105-*b*, for example. Additionally, an sTTI pattern for uplink transmissions may be identified in cases where 2-symbol and 3-symbol sTTIs are allocated to the UE 115-*b*.

At block 1145, the UE 115-*b* may identify sTTIs for SRS transmissions. The SRS sTTIs may be identified, for example, based on the configuration information 1125, the DCI 1135, or combinations thereof. The UE 115-*b* may also identify a symbol and uplink resources for SRS transmissions within sTTIs. In examples where the UE 115-*b* is configured to transmit periodic SRS, the SRS sTTIs and symbols may be identified based on cell-specific SRS sTTIs and UE-specific SRS sTTIs, and the UE 115-*b* may identify sTTIs for SRS transmissions when its UE-specific SRS sTTI coincides with the cell-specific SRS sTTI.

At block 1150, the UE 115-*b* may generate uplink data and SRS transmissions. The uplink data may include low latency data that is to be transmitted to the base station 105-*b*, and the SRS transmissions may be located in SRS symbols within an sTTI. The UE 115-*b* may transmit uplink transmission(s) 1155 to the base station 105-*b* using the allocated sTTIs. As mentioned, the uplink transmission(s) 1155 may include uplink data, DMRS transmissions, SRS transmissions, or any combinations thereof.

At block 1160, the base station 105-*b* may perform received signal processing for the uplink transmissions. The received signal processing may include, for example, processing of the SRS transmissions to determine uplink channel quality over a frequency band associated with the SRS transmission, uplink timing information based on the SRS transmissions, or the like. Received signal processing may also include demodulation and decoding of uplink data and the generation of feedback (e.g., HARQ ACK/NACK feedback) to indicate successful or unsuccessful reception of the uplink data.

Figure 12:
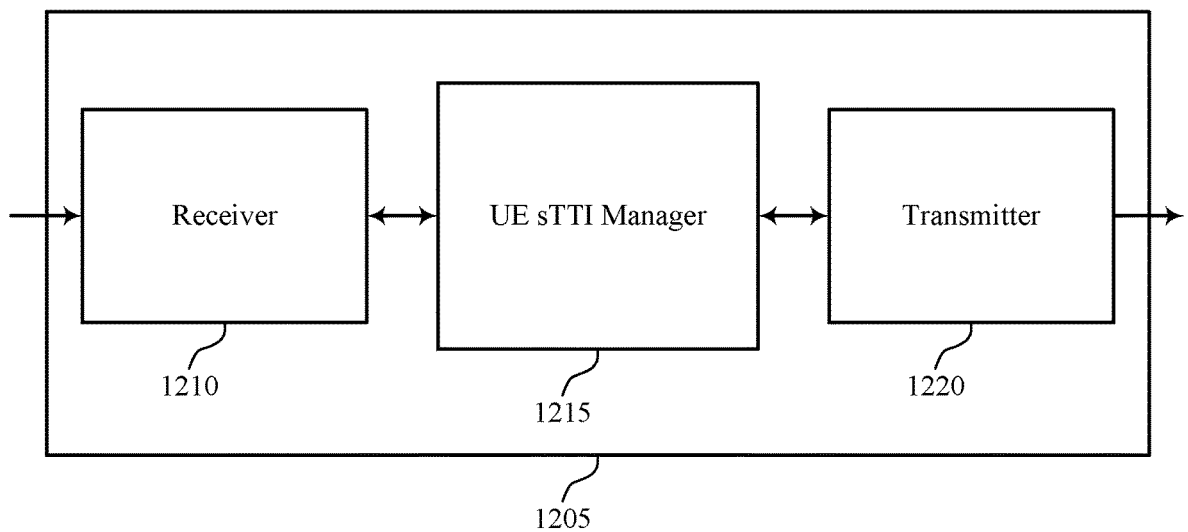
FIGS. 12 through 14 show block diagrams of a device that supports SRS transmission in low latency wireless transmissions in accordance with aspects of the present disclosure.

FIG. 12 shows a block diagram 1200 of a wireless device 1205 that supports sounding reference signal transmission in low latency wireless transmissions in accordance with various aspects of the present disclosure. Wireless device 1205 may be an example of aspects of a user equipment (UE) 115 as described with reference to FIG. 1. Wireless device 1205 may include receiver 1210, UE sTTI manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to sounding reference signal transmission in low latency wireless transmissions, etc.). Information may be passed on to other components of the device. The receiver 1210 may be an example of aspects of the transceiver 1535 described with reference to FIG. 15.

UE sTTI manager 1215 may be an example of aspects of the UE sTTI manager 1515 described with reference to FIG. 15.

UE sTTI manager 1215 and/or at least some of its various sub-components may be implemented in hardware, software executed by a processor, firmware, or any combination thereof. If implemented in software executed by a processor, the functions of the UE sTTI manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE sTTI manager 1215 and/or at least some of its various sub-components may be physically located at various positions, including being distributed such that portions of functions are implemented at different physical locations by one or more physical devices. In some examples, UE sTTI manager 1215 and/or at least some of its various sub-components may be a separate and distinct component in accordance with various aspects of the present disclosure. In other examples, UE sTTI manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE sTTI manager 1215 may identify a set of sTTIs for uplink transmissions of a first wireless service, the set of sTTIs located within subframe time boundaries of a subframe of a second wireless service, identify two or more sTTIs within the set of sTTIs for transmission of sounding reference signal (SRS) transmissions within the subframe time boundaries, and transmit one or more SRS transmissions in at least one of the two or more sTTIs.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
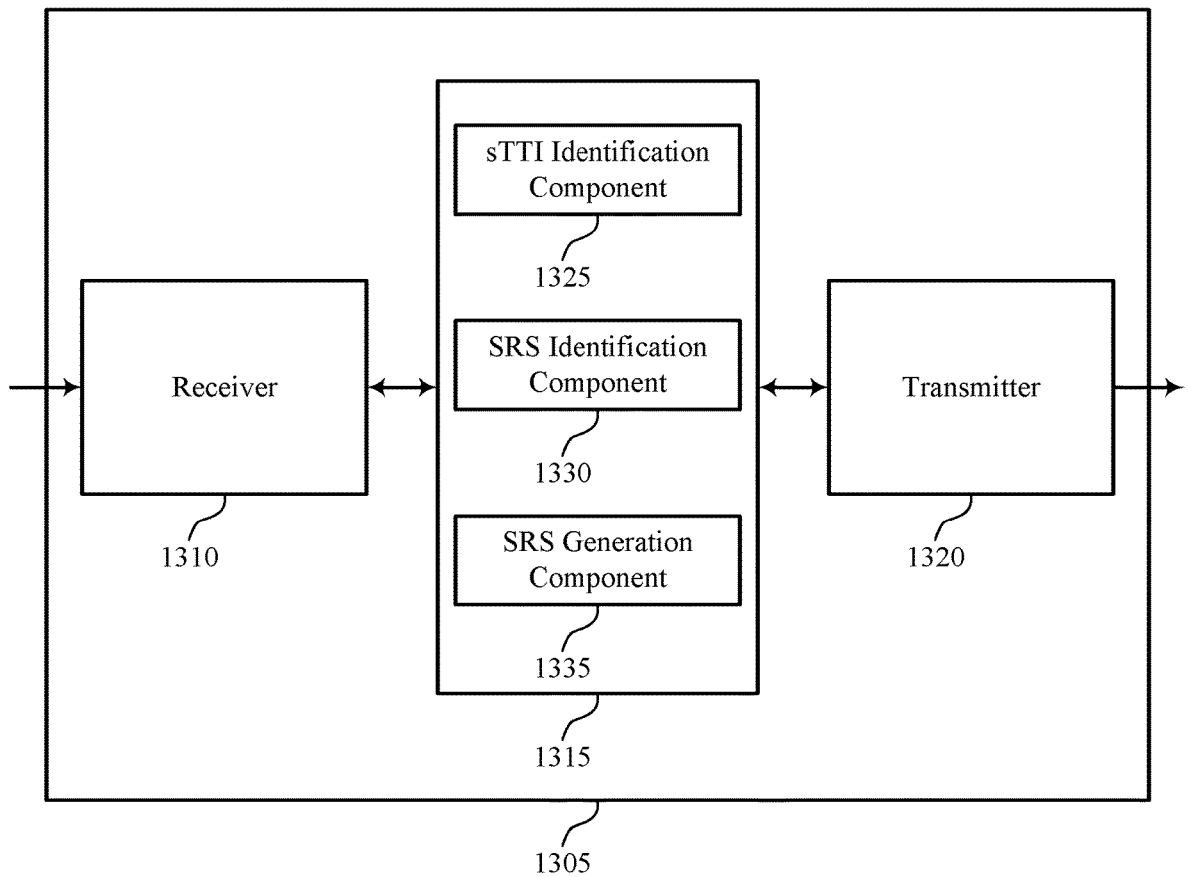

FIG. 13 shows a block diagram 1300 of a wireless device 1305 that supports sounding reference signal transmission in low latency wireless transmissions in accordance with various aspects of the present disclosure. Wireless device 1305 may be an example of aspects of a wireless device 1205 or a UE 115 as described with reference to FIGS. 1 and 12. Wireless device 1305 may include receiver 1310, UE sTTI manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to sounding reference signal transmission in low latency wireless transmissions, etc.). Information may be passed on to other components of the device. The receiver 1310 may be an example of aspects of the transceiver 1535 described with reference to FIG. 15.

UE sTTI manager 1315 may be an example of aspects of the UE sTTI manager 1515 described with reference to FIG. 15. UE sTTI manager 1315 may also include sTTI identification component 1325, SRS identification component 1330, and SRS generation component 1335.

STTI identification component 1325 may identify a set of sTTIs for uplink transmissions of a first wireless service, the set of sTTIs located within subframe time boundaries of a subframe of a second wireless service. In some cases, a first subset of the set of sTTIs may be identified that each span two OFDM symbols and a second subset of the set of sTTIs may be identified that each span three OFDM symbols.

SRS identification component 1330 may identify two or more sTTIs within the set of sTTIs for transmission of one or more SRS transmissions within the subframe time boundaries, and configure the two or more sTTIs of the second subset for the one or more SRS transmissions. In some cases, a number of SRS transmissions within the subframe time boundaries is configurable by a base station. SRS generation component 1335 may generate SRS patterns and transmit, via transmitter 1320, the one or more SRS transmissions.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
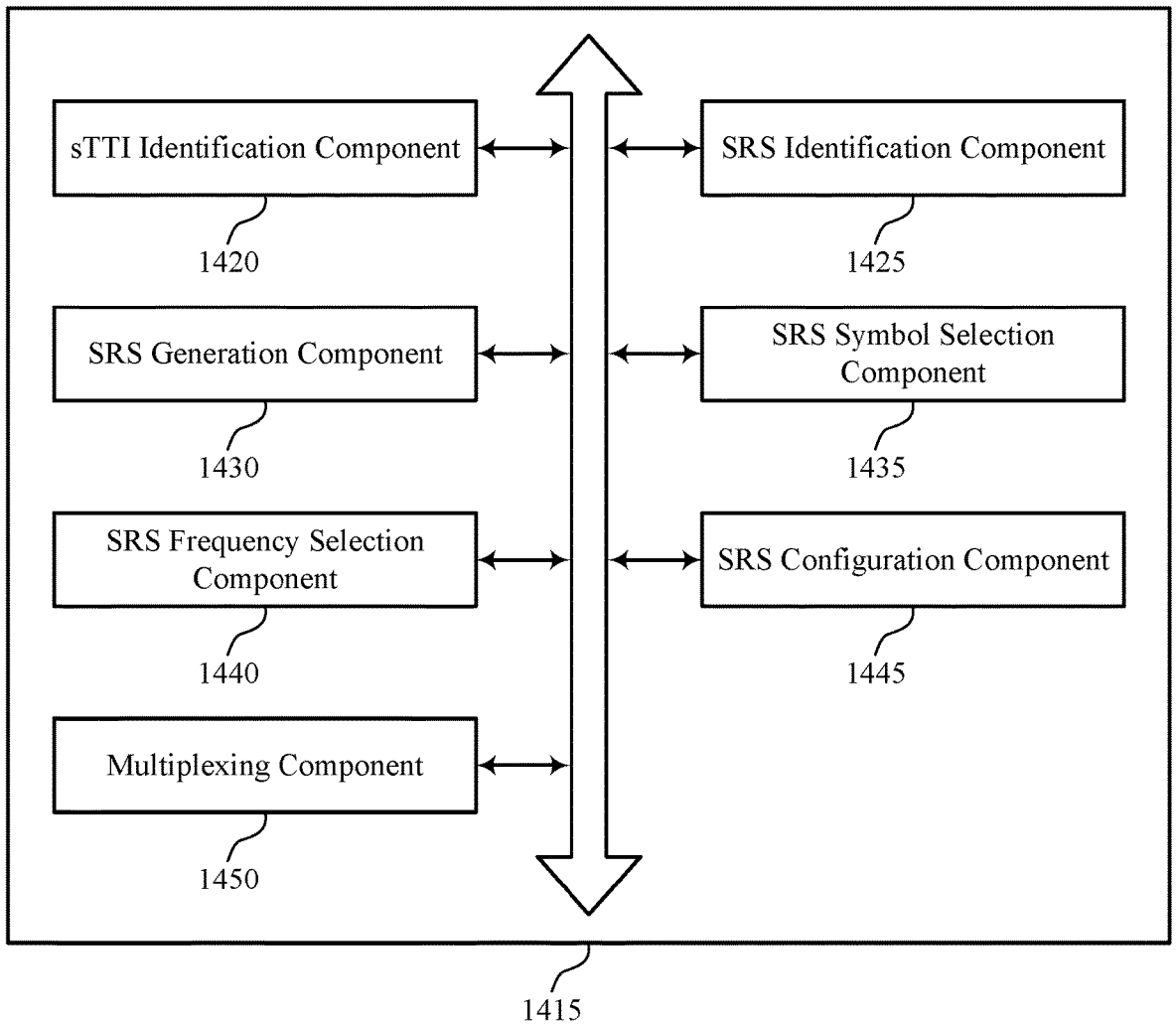

FIG. 14 shows a block diagram 1400 of a UE sTTI manager 1415 that supports sounding reference signal transmission in low latency wireless transmissions in accordance with various aspects of the present disclosure. The UE sTTI manager 1415 may be an example of aspects of a UE sTTI manager 1215, a UE sTTI manager 1315, or a UE sTTI manager 1515 described with reference to FIGS. 12, 13, and 15. The UE sTTI manager 1415 may include sTTI identification component 1420, SRS identification component 1425, SRS generation component 1430, SRS symbol selection component 1435, SRS frequency selection component 1440, SRS configuration component 1445, and multiplexing component 1450. Each of these modules may communicate, directly or indirectly, with one another (e.g., via one or more buses).

The sTTI identification component 1420 may identify a set of sTTIs for uplink transmissions of a first wireless service, the set of sTTIs located within subframe time boundaries of a subframe of a second wireless service, identify a first subset of the set of sTTIs that each span two OFDM symbols, and identify a second subset of the set of sTTIs that each span three OFDM symbols.

SRS identification component 1425 may identify two or more sTTIs within the set of sTTIs for transmission of one or more SRS transmissions within the subframe time boundaries, and configure the two or more sTTIs of the second subset for the one or more SRS transmissions. In some cases, a number of SRS transmissions within the subframe time boundaries is configurable by a base station. SRS generation component 1430 may generate SRS patterns and transmit the one or more SRS transmissions.

SRS symbol selection component 1435 may select the SRS symbol location within an sTTI. In some examples, SRS symbol locations within the first slot may be selected to be either an initial symbol or a last symbol of an associated three-symbol sTTI. In some cases, the SRS symbol location within the second slot is selected to be a last symbol of the associated three-symbol sTTI. In some cases, the identifying the second subset includes identifying a first three-symbol sTTI as an initial sTTI of a first slot within the subframe time boundaries, identifying a second three-symbol sTTI as a final sTTI of a second slot within the subframe time boundaries, and identifying a first or initial SRS symbol within the first three-symbol sTTI for a first SRS transmission and a second SRS symbol within the second three-symbol sTTI for a second SRS transmission, where the second SRS symbol of a first subframe is adjacent to the first SRS symbol of a subsequent subframe. In some cases, the locations of the first SRS symbol and the second SRS symbol are selected to provide reduced transient time for a change in one or more of an uplink transmit power or a resource block allocation associated with the first SRS transmission and the second SRS transmission. In some cases, the identifying the second subset includes identifying a final sTTI within each of a first slot and a second slot within the subframe time boundaries as three-symbol sTTIs. In some cases, an SRS symbol location within each sTTI of the second subset is selected to provide time diversity between subsequent SRS transmissions and where frequency bands for the subsequent SRS transmissions are selected to provide frequency diversity between the subsequent SRS transmissions.

In some cases, two or more two-symbol sTTIs within each of a first slot and a second slot within the subframe time boundaries are configured for SRS transmissions. In some cases, one or both of the OFDM symbols within the two or more two-symbol sTTIs are configured for SRS transmissions.

SRS frequency selection component 1440 may select a first frequency band for the first SRS transmission, select a second frequency band for the second SRS transmission that is different than the first frequency band, where the first frequency band and the second frequency band are selected to provide frequency diversity between the first SRS transmission and the second SRS transmission. In some cases, a first bandwidth for the one or more SRS transmissions may be identified based on one or more of a channel bandwidth or an sTTI length for uplink transmissions. In some cases, the first bandwidth for a first SRS transmission is increased relative to a second bandwidth for one or more other SRS transmissions associated with the second wireless service.

SRS configuration component 1445 may identify aperiodic or periodic configurations for SRS transmissions, in some examples. The SRS configuration component 1445 may, for example, receive an aperiodic configuration in an uplink grant that indicates resources for the one or more SRS transmissions, receive a downlink grant that indicates an uplink control channel transmission is to be transmitted, determine, based on the downlink grant, that the one or more SRS transmissions are to be transmitted. For periodic configurations, the SRS configuration component 1445 may receive configuration information that indicates resources for periodic SRS transmissions. In some cases, the periodic configuration information includes an indication of cell-specific sTTIs and UE-specific sTTIs that are to be used for SRS transmissions, and a first sTTI for SRS transmission may be identified when the first sTTI corresponds to both a cell-specific sTTI and a UE-specific sTTI. In some cases, an indication may be received that data and a DMRS are to be transmitted in two symbols of a three symbol sTTI, and it may be determined to transmit SRS in the third symbol of the three symbol sTTI. In some cases, the one or more SRS transmissions are used as filler in one or more sTTIs that otherwise contain no uplink transmissions.

Multiplexing component 1450 may multiplex a DMRS with a first SRS in a first symbol that is configured for both DMRS and SRS transmission. In some cases, the multiplexing includes transmitting the DMRS in a first interlace of the first symbol, and transmitting the first SRS in a second interlace of the first symbol. In some cases, the multiplexing includes transmitting the DMRS in a first interlace of the first symbol using a first cyclic shift, and transmitting the first SRS in the first interlace of the first symbol using a second cyclic shift. In some cases, the multiplexing includes transmitting the DMRS using a first set of antenna ports, and transmitting the first SRS using a second set of antenna ports that is different than the first set of antenna ports.

Figure 15:
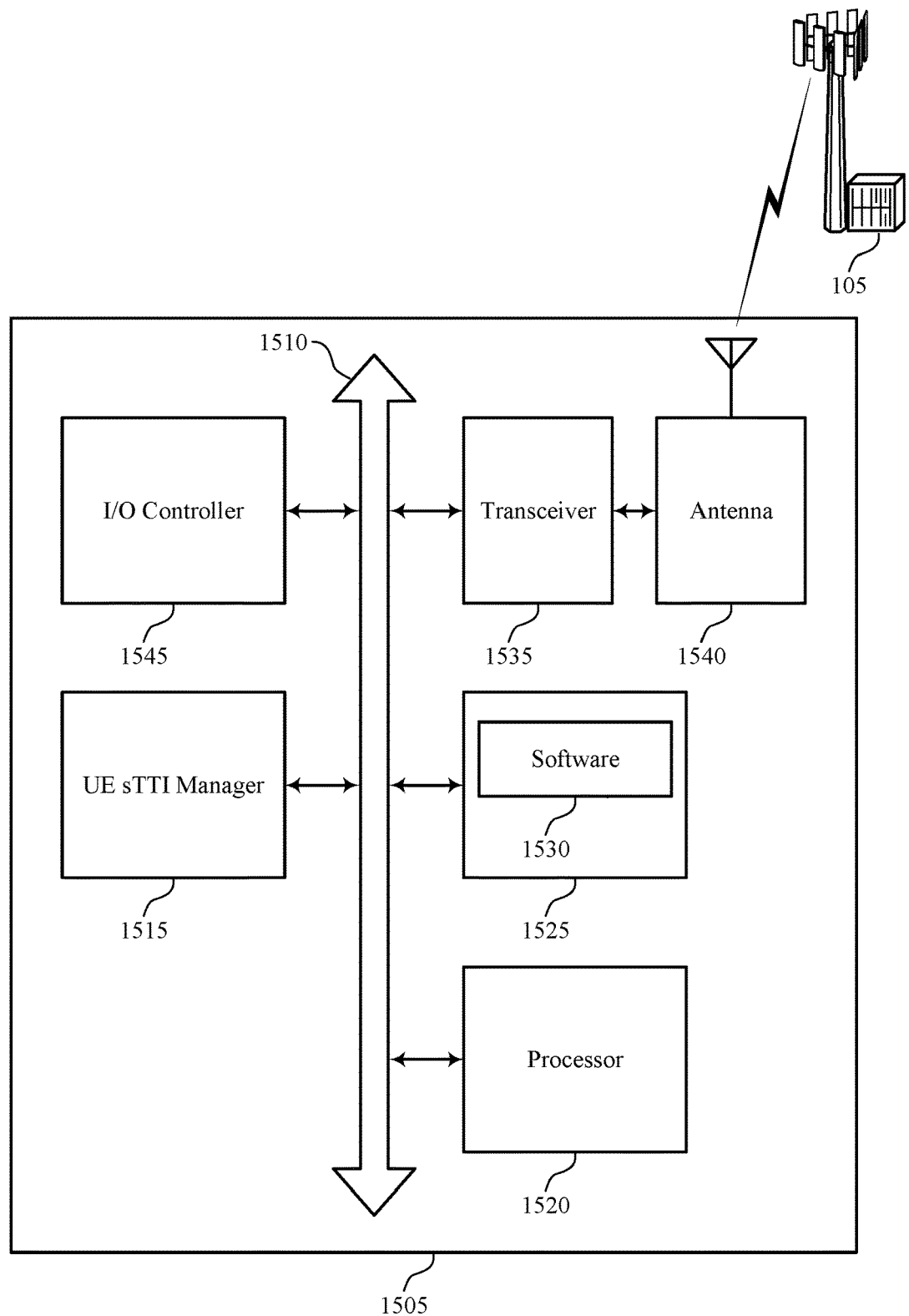
FIG. 15 illustrates a block diagram of a system including a UE that supports SRS transmission in low latency wireless transmissions in accordance with aspects of the present disclosure.

FIG. 15 shows a diagram of a system 1500 including a device 1505 that supports sounding reference signal transmission in low latency wireless transmissions in accordance with various aspects of the present disclosure. Device 1505 may be an example of or include the components of wireless device 1205, wireless device 1305, or a UE 115 as described above, e.g., with reference to FIGS. 1, 12 and 13. Device 1505 may include components for bi-directional voice and data communications including components for transmitting and receiving communications, including UE sTTI manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting sounding reference signal transmission in low latency wireless transmissions).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware and/or software operation such as the interaction with peripheral components or devices.

Software 1530 may include code to implement aspects of the present disclosure, including code to support sounding reference signal transmission in low latency wireless transmissions. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
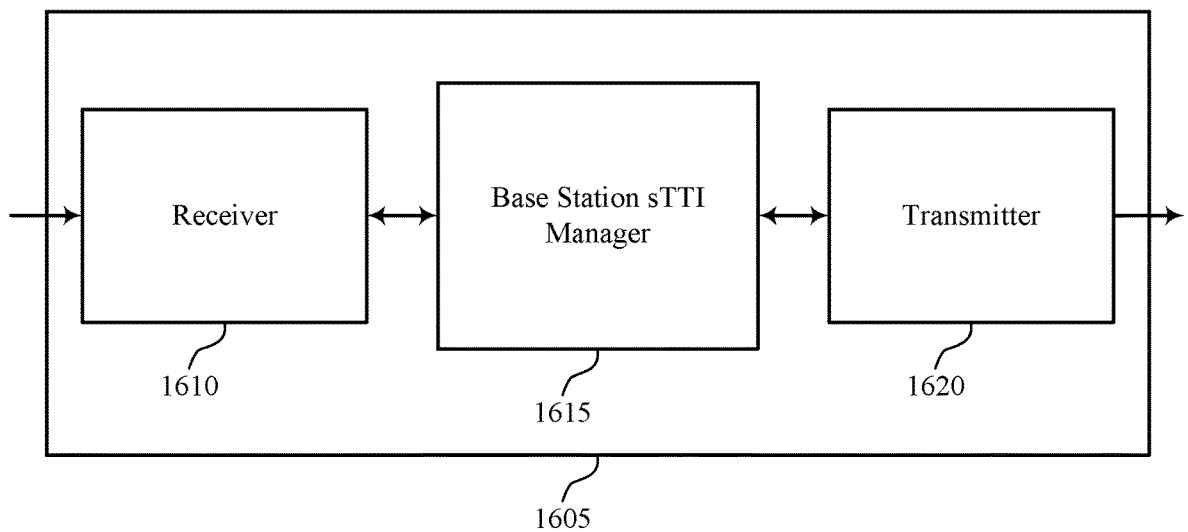
FIGS. 16 through 18 show block diagrams of a device that supports SRS transmission in low latency wireless transmissions in accordance with aspects of the present disclosure.

FIG. 16 shows a block diagram 1600 of a wireless device 1605 that supports sounding reference signal transmission in low latency wireless transmissions in accordance with various aspects of the present disclosure. Wireless device 1605 may be an example of aspects of a base station 105 as described with reference to FIG. 1. Wireless device 1605 may include receiver 1610, base station sTTI manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to sounding reference signal transmission in low latency wireless transmissions, etc.). Information may be passed on to other components of the device. The receiver 1610 may be an example of aspects of the transceiver 1935 described with reference to FIG. 19.

Base station sTTI manager 1615 may be an example of aspects of the base station sTTI manager 1915 described with reference to FIG. 19.

Base station sTTI manager 1615 and/or at least some of its various sub-components may be implemented in hardware, software executed by a processor, firmware, or any combination thereof. If implemented in software executed by a processor, the functions of the base station sTTI manager 1615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station sTTI manager 1615 and/or at least some of its various sub-components may be physically located at various positions, including being distributed such that portions of functions are implemented at different physical locations by one or more physical devices. In some examples, base station sTTI manager 1615 and/or at least some of its various sub-components may be a separate and distinct component in accordance with various aspects of the present disclosure. In other examples, base station sTTI manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station sTTI manager 1615 may identify a set of sTTIs for uplink transmissions of a first wireless service, the set of sTTIs located within subframe time boundaries of a subframe of a second wireless service, identify two or more sTTIs within the set of sTTIs for transmission of SRS transmissions within the subframe time boundaries, and configure a UE to transmit one or more SRS transmissions in at least one of the two or more sTTIs.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may include a single antenna, or it may include a set of antennas.

Figure 17:
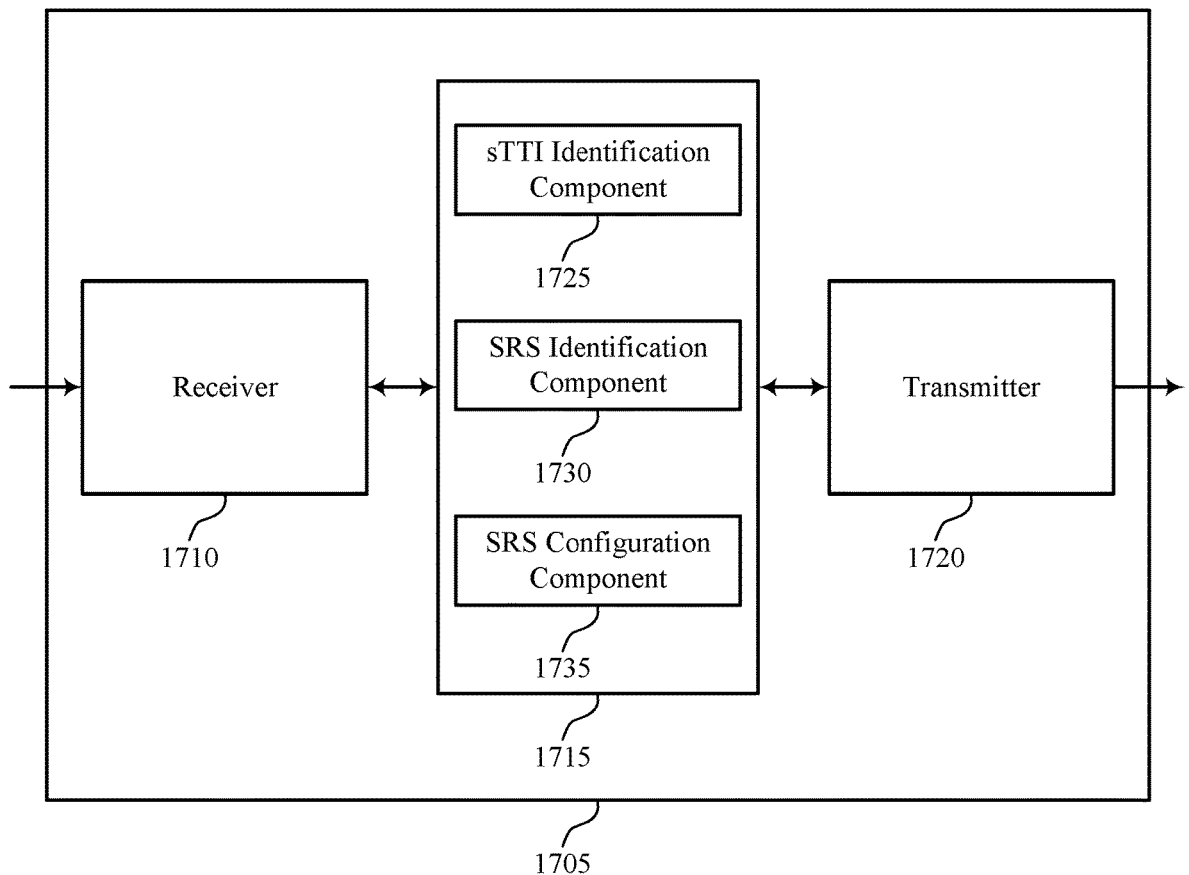

FIG. 17 shows a block diagram 1700 of a wireless device 1705 that supports sounding reference signal transmission in low latency wireless transmissions in accordance with various aspects of the present disclosure. Wireless device 1705 may be an example of aspects of a wireless device 1605 or a base station 105 as described with reference to FIGS. 1 and 16. Wireless device 1705 may include receiver 1710, base station sTTI manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to sounding reference signal transmission in low latency wireless transmissions, etc.). Information may be passed on to other components of the device. The receiver 1710 may be an example of aspects of the transceiver 1935 described with reference to FIG. 19.

Base station sTTI manager 1715 may be an example of aspects of the base station sTTI manager 1915 described with reference to FIG. 19. Base station sTTI manager 1715 may also include sTTI identification component 1725, SRS identification component 1730, and SRS configuration component 1735.

The sTTI identification component 1725 may identify a set of sTTIs for uplink transmissions of a first wireless service, the set of sTTIs located within subframe time boundaries of a subframe of a second wireless service, configure a first subset of the set of sTTIs that each span two OFDM symbols and a second subset of the set of sTTIs that each span three OFDM symbols. In some cases, the configuring the second subset includes configuring a final sTTI within each of a first slot and a second slot within the subframe time boundaries as three-symbol sTTIs.

SRS identification component 1730 may identify two or more sTTIs within the set of sTTIs for transmission of one or more SRS transmissions within the subframe time boundaries.

SRS configuration component 1735 may configure a UE to transmit the one or more SRS transmissions. In some cases, SRS configuration component 1735 may configure two or more sTTIs of the second subset for the one or more SRS transmissions. In some cases, SRS configuration component 1735 may transmit an aperiodic configuration in an uplink grant to the UE that indicates resources for the one or more SRS transmissions, or transmit a downlink grant to the UE that indicates an uplink control channel transmission is to be transmitted and that the one or more SRS transmissions are to be transmitted. In some examples, SRS configuration component 1735 may transmit configuration information that indicates resources for periodic SRS transmissions, such as an indication of cell-specific sTTIs and UE-specific sTTIs that are to be used for SRS transmissions, where a first sTTI for SRS transmission may be identified when the first sTTI corresponds to both a cell-specific sTTI and a UE-specific sTTI. In some cases, a determination that the one or more SRS transmissions are to be transmitted is based on an indication in the downlink grant that data and a DMRS are to be transmitted in two symbols of a three symbol sTTI.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may include a single antenna, or it may include a set of antennas.

Figure 18:
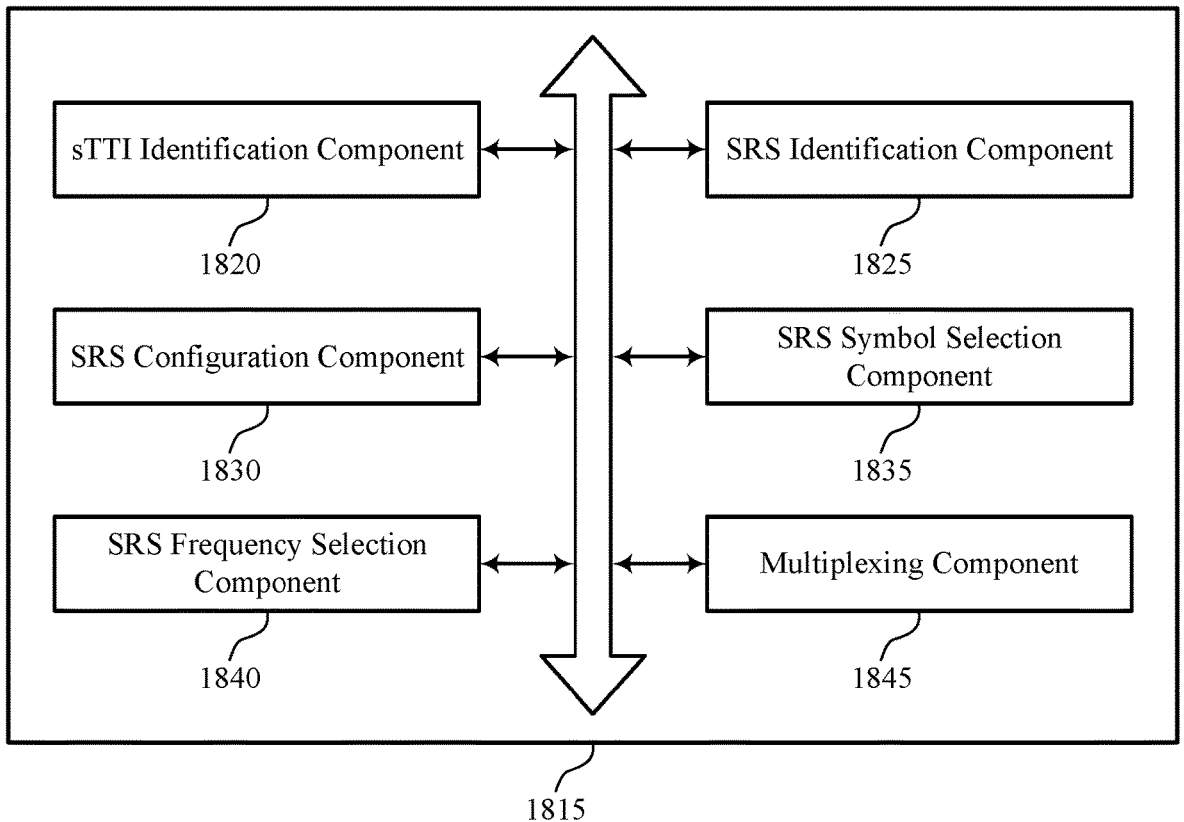

FIG. 18 shows a block diagram 1800 of a base station sTTI manager 1815 that supports sounding reference signal transmission in low latency wireless transmissions in accordance with various aspects of the present disclosure. The base station sTTI manager 1815 may be an example of aspects of a base station sTTI manager 1915 described with reference to FIGS. 16, 17, and 19. The base station sTTI manager 1815 may include sTTI identification component 1820, SRS identification component 1825, SRS configuration component 1830, SRS symbol selection component 1835, SRS frequency selection component 1840, and multiplexing component 1845. Each of these modules may communicate, directly or indirectly, with one another (e.g., via one or more buses).

The sTTI identification component 1820 may identify a set of sTTIs for uplink transmissions of a first wireless service, the set of sTTIs located within subframe time boundaries of a subframe of a second wireless service, and configure a first subset of the set of sTTIs that each span two OFDM symbols and a second subset of the set of sTTIs that each span three OFDM symbols. In some cases, the configuring the second subset includes configuring a final sTTI within each of a first slot and a second slot within the subframe time boundaries as three-symbol sTTIs.

SRS identification component 1825 may identify two or more sTTIs within the set of sTTIs for transmission of one or more SRS transmissions within the subframe time boundaries.

SRS configuration component 1830 may configure a UE to transmit the one or more SRS transmissions. In some cases, SRS configuration component 1830 may configure two or more sTTIs of the second subset for the one or more SRS transmissions. In some cases, SRS configuration component 1830 may transmit an aperiodic configuration in an uplink grant to the UE that indicates resources for the one or more SRS transmissions, or transmit a downlink grant to the UE that indicates an uplink control channel transmission is to be transmitted and that the one or more SRS transmissions are to be transmitted. In some examples, SRS configuration component 1830 may transmit configuration information that indicates resources for periodic SRS transmissions, such as an indication of cell-specific sTTIs and UE-specific sTTIs that are to be used for SRS transmissions, where a first sTTI for SRS transmission may be identified when the first sTTI corresponds to both a cell-specific sTTI and a UE-specific sTTI. In some cases, a determination that the one or more SRS transmissions are to be transmitted is based on an indication in the downlink grant that data and a DMRS are to be transmitted in two symbols of a three symbol sTTI.

SRS symbol selection component 1835 may, in some cases, configure a first three-symbol sTTI as an initial sTTI of a first slot within the subframe time boundaries, configure a second three-symbol sTTI as a final sTTI of a second slot within the subframe time boundaries, and configure a first SRS symbol within the first three-symbol sTTI for a first SRS transmission and a second SRS symbol within the second three-symbol sTTI for a second SRS transmission, where the second symbol of a first subframe is adjacent to the first symbol of a subsequent subframe. In some cases, the locations of the first SRS symbol and the second SRS symbol are selected to provide reduced transient time for a change in one or more of an uplink transmit power or a resource block allocation associated with the first SRS transmission and the second SRS transmission. In some cases, one or both of the OFDM symbols within the two or more two-symbol sTTIs may be configured for SRS transmissions.

SRS frequency selection component 1840 may identify a first bandwidth for a first SRS transmission of the one or more SRS transmissions based on one or more of a channel bandwidth or an sTTI length for uplink transmissions.

Multiplexing component 1845 may configure the UE to multiplex a DMRS with a first SRS transmission in a first symbol, receive the DMRS in a first interlace of the first symbol, receive the first SRS transmission in a second interlace of the first symbol, receive the DMRS in a first interlace of the first symbol using a first cyclic shift, receive the first SRS transmission in the first interlace of the first symbol using a second cyclic shift, receive the DMRS using a first set of antenna ports, and receive the first SRS transmission using a second set of antenna ports that is different than the first set of antenna ports.

Figure 19:
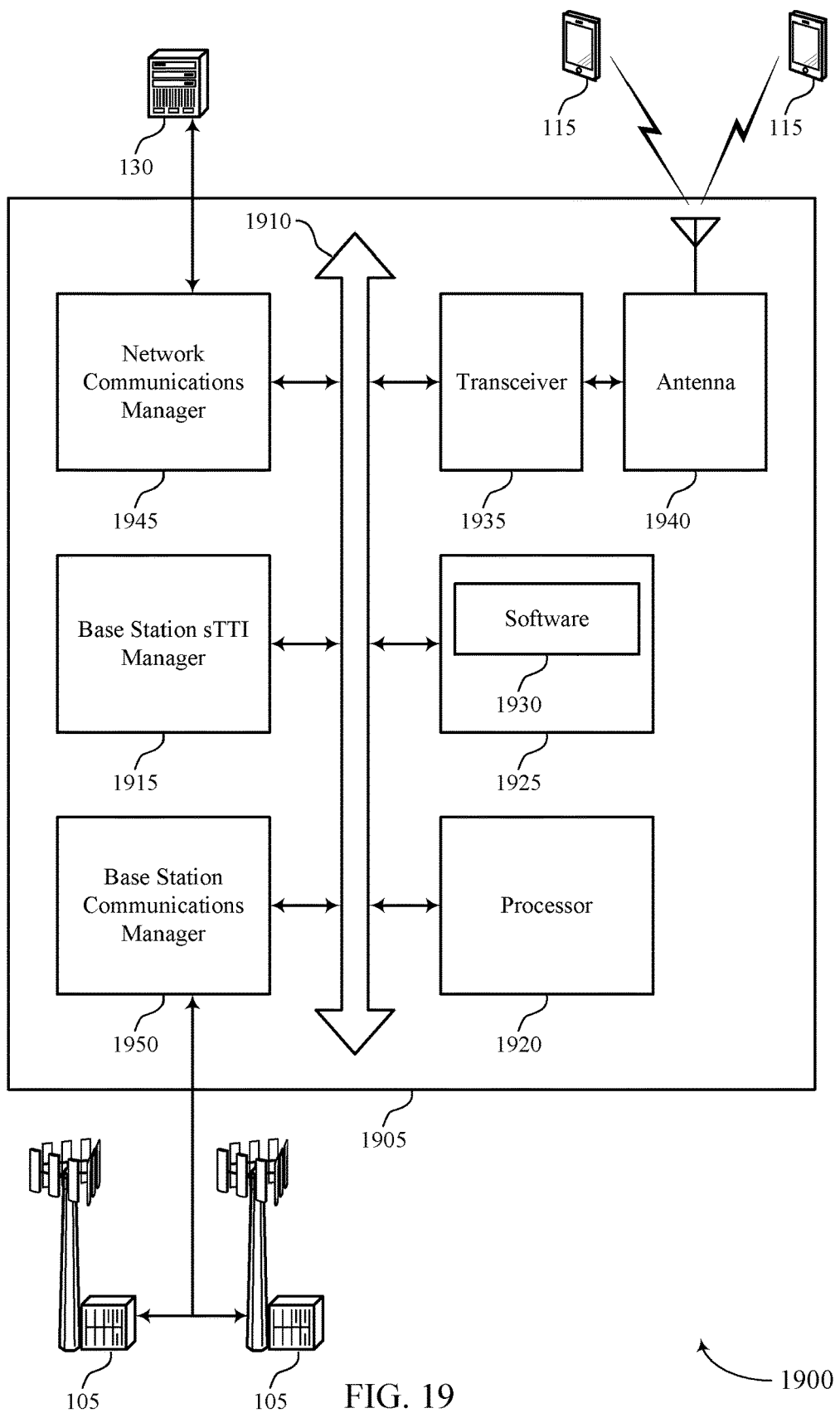
FIG. 19 illustrates a block diagram of a system including a base station that supports SRS transmission in low latency wireless transmissions in accordance with aspects of the present disclosure.

FIG. 19 shows a diagram of a system 1900 including a device 1905 that supports sounding reference signal transmission in low latency wireless transmissions in accordance with various aspects of the present disclosure. Device 1905 may be an example of or include the components of base station 105 as described above, e.g., with reference to FIG. 1. Device 1905 may include components for bi-directional voice and data communications including components for transmitting and receiving communications, including base station sTTI manager 1915, processor 1920, memory 1925, software 1930, transceiver 1935, antenna 1940, network communications manager 1945, and base station communications manager 1950. These components may be in electronic communication via one or more busses (e.g., bus 1910). Device 1905 may communicate wirelessly with one or more UEs 115.

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting sounding reference signal transmission in low latency wireless transmissions).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware and/or software operation such as the interaction with peripheral components or devices.

Software 1930 may include code to implement aspects of the present disclosure, including code to support sounding reference signal transmission in low latency wireless transmissions. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

Network communications manager 1945 may manage communications with the core network (e.g., via one or more wired backhaul links). For example, the network communications manager 1945 may manage the transfer of data communications for client devices, such as one or more UEs 115.

Base station communications manager 1950 may manage communications with other base station 105, and may include a controller or scheduler for controlling communications with UEs 115 in cooperation with other base stations 105. For example, the base station communications manager 1950 may coordinate scheduling for transmissions to UEs 115 for various interference mitigation techniques such as beamforming or joint transmission. In some examples, base station communications manager 1950 may provide an X2 interface within an Long Term Evolution (LTE)/LTE-A wireless communication network technology to provide communication between base stations 105.

Figure 20:
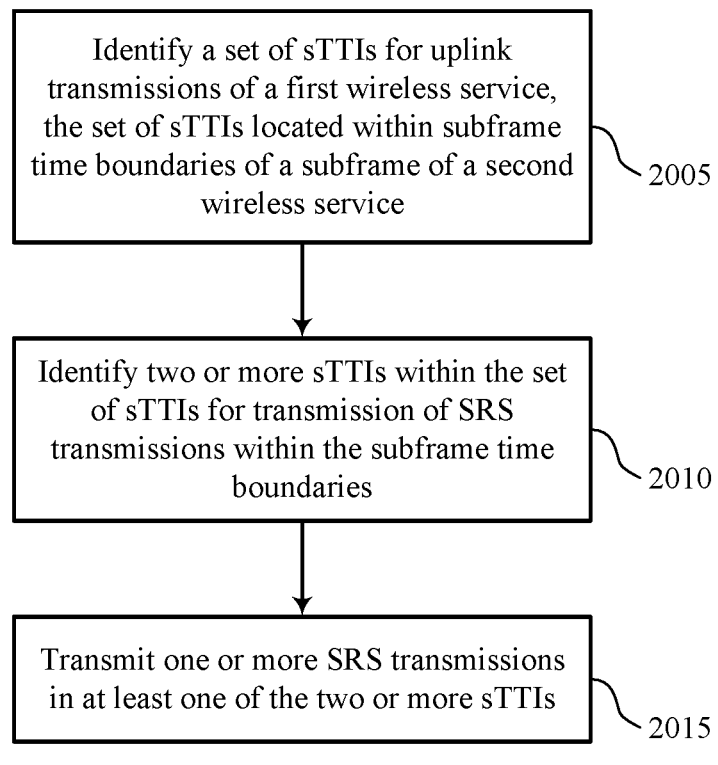
FIGS. 20 through 36 illustrate methods for SRS transmission in low latency wireless transmissions in accordance with aspects of the present disclosure.

FIG. 20 shows a flowchart illustrating a method 2000 for sounding reference signal transmission in low latency wireless transmissions in accordance with various aspects of the present disclosure. The operations of method 2000 may be implemented by a UE 115 or its components as described herein. For example, the operations of method 2000 may be performed by a UE sTTI manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may identify a set of sTTIs for uplink transmissions of a first wireless service, the set of sTTIs located within subframe time boundaries of a subframe of a second wireless service. The operations of block 2005 may be performed according to the methods described with reference to FIGS. 1 through 11. In certain examples, aspects of the operations of block 2005 may be performed by an sTTI identification component as described with reference to FIGS. 12 through 15.

At block 2010 the UE 115 may identify two or more sTTIs within the set of sTTIs for transmission of SRS transmissions within the subframe time boundaries. The operations of block 2010 may be performed according to the methods described with reference to FIGS. 1 through 11. In certain examples, aspects of the operations of block 2010 may be performed by a SRS identification component as described with reference to FIGS. 12 through 15.

At block 2015 the UE 115 may transmit one or more SRS transmissions in at least one of the two or more sTTIs. The operations of block 2015 may be performed according to the methods described with reference to FIGS. 1 through 11. In certain examples, aspects of the operations of block 2015 may be performed by a SRS generation component as described with reference to FIGS. 12 through 15, which may operate in cooperation with a transmitter 1220 or 1320 as described with reference to FIG. 12 or 13, or antenna(s) 1540 and transceiver(s) 1535 as described with reference to FIG. 15.

Figure 21:
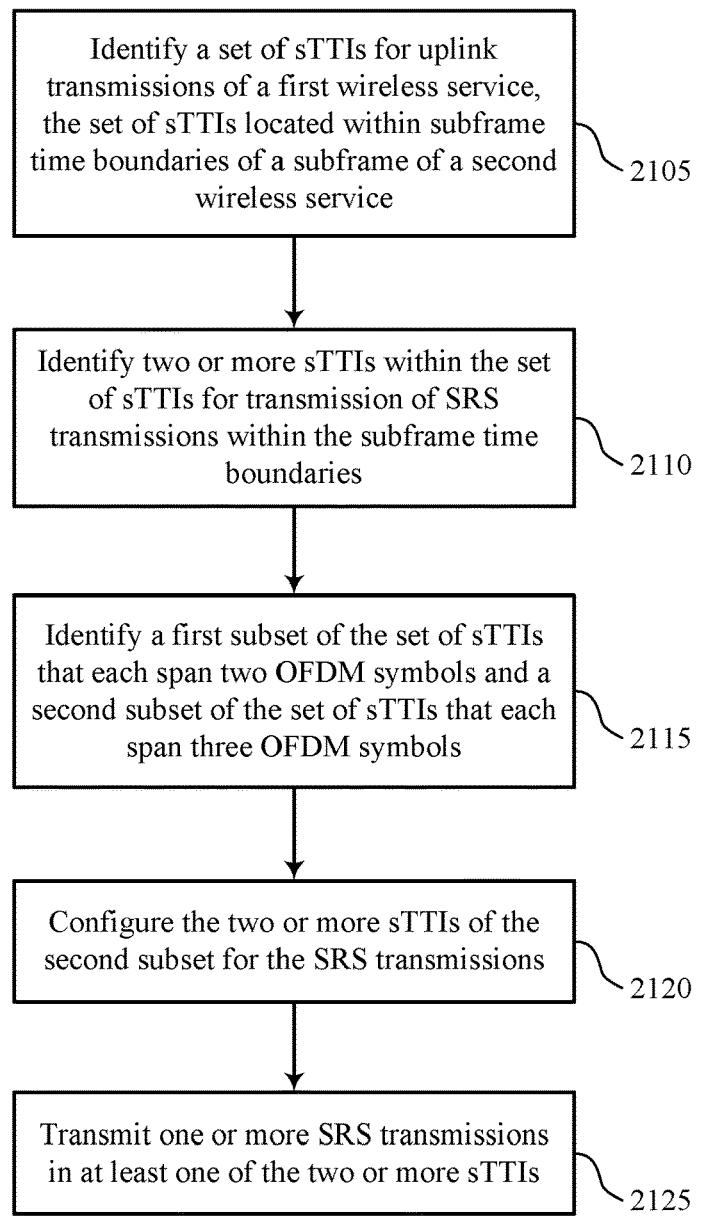

FIG. 21 shows a flowchart illustrating a method 2100 for sounding reference signal transmission in low latency wireless transmissions in accordance with various aspects of the present disclosure. The operations of method 2100 may be implemented by a UE 115 or its components as described herein. For example, the operations of method 2100 may be performed by a UE sTTI manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may identify a set of sTTIs for uplink transmissions of a first wireless service, the set of sTTIs located within subframe time boundaries of a subframe of a second wireless service. The operations of block 2105 may be performed according to the methods described with reference to FIGS. 1 through 11. In certain examples, aspects of the operations of block 2105 may be performed by an sTTI identification component as described with reference to FIGS. 12 through 15.

At block 2110 the UE 115 may identify two or more sTTIs within the set of sTTIs for transmission of SRS transmissions within the subframe time boundaries. The operations of block 2110 may be performed according to the methods described with reference to FIGS. 1 through 11. In certain examples, aspects of the operations of block 2110 may be performed by a SRS identification component as described with reference to FIGS. 12 through 15.

At block 2115 the UE 115 may identify a first subset of the set of sTTIs that each span two OFDM symbols and a second subset of the set of sTTIs that each span three OFDM symbols. The operations of block 2115 may be performed according to the methods described with reference to FIGS. 1 through 11. In certain examples, aspects of the operations of block 2115 may be performed by an sTTI identification component as described with reference to FIGS. 12 through 15.

At block 2120 the UE 115 may configure the two or more sTTIs of the second subset for the SRS transmissions. The operations of block 2120 may be performed according to the methods described with reference to FIGS. 1 through 11. In certain examples, aspects of the operations of block 2120 may be performed by a SRS identification component as described with reference to FIGS. 12 through 15.

At block 2125 the UE 115 may transmit one or more SRS transmissions in at least one of the two or more sTTIs. The operations of block 2125 may be performed according to the methods described with reference to FIGS. 1 through 11. In certain examples, aspects of the operations of block 2125 may be performed by a SRS generation component as described with reference to FIGS. 12 through 15, which may operate in cooperation with a transmitter 1220 or 1320 as described with reference to FIG. 12 or 13, or antenna(s) 1540 and transceiver(s) 1535 as described with reference to FIG. 15.

Figure 22:
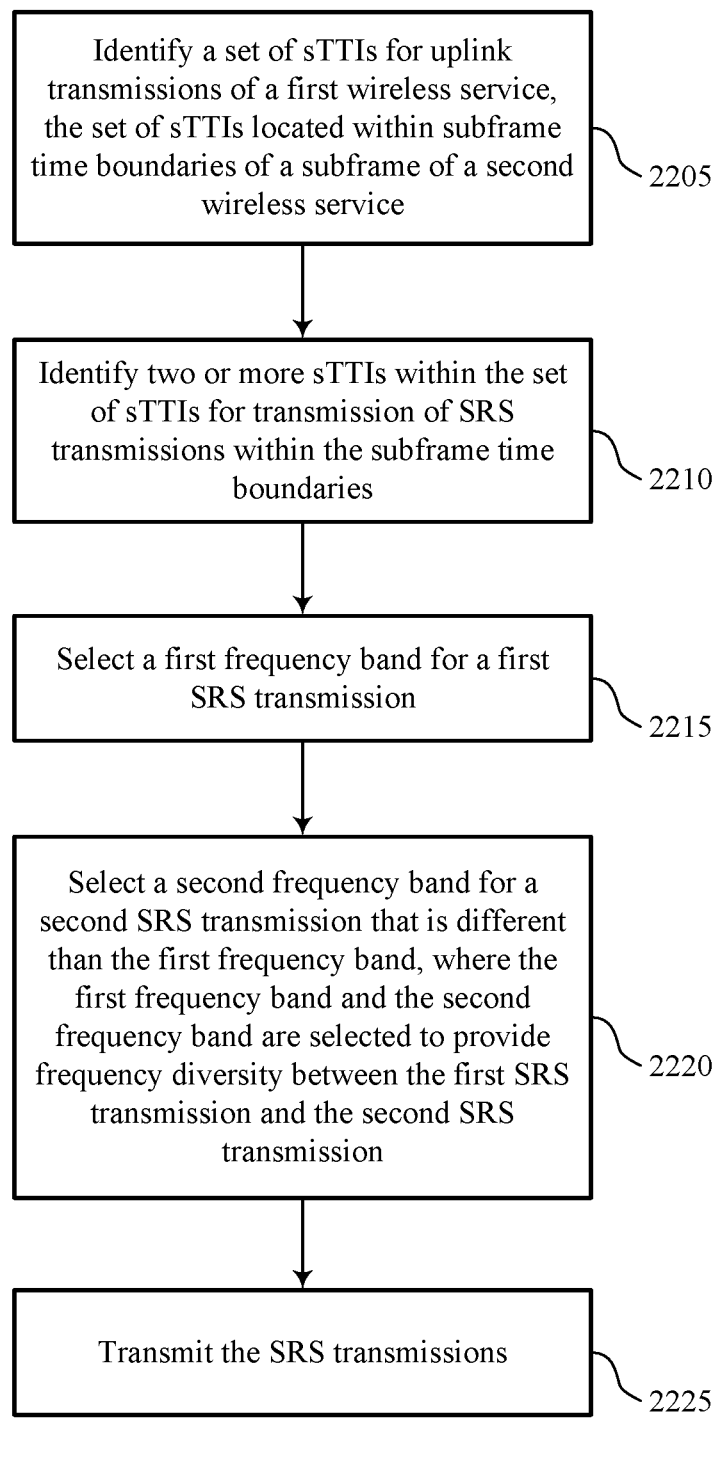

FIG. 22 shows a flowchart illustrating a method 2200 for sounding reference signal transmission in low latency wireless transmissions in accordance with various aspects of the present disclosure. The operations of method 2200 may be implemented by a UE 115 or its components as described herein. For example, the operations of method 2200 may be performed by a UE sTTI manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may identify a set of sTTIs for uplink transmissions of a first wireless service, the set of sTTIs located within subframe time boundaries of a subframe of a second wireless service. The operations of block 2205 may be performed according to the methods described with reference to FIGS. 1 through 11. In certain examples, aspects of the operations of block 2205 may be performed by an sTTI identification component as described with reference to FIGS. 12 through 15.

At block 2210 the UE 115 may identify two or more sTTIs within the set of sTTIs for transmission of SRS transmissions within the subframe time boundaries. The operations of block 2210 may be performed according to the methods described with reference to FIGS. 1 through 11. In certain examples, aspects of the operations of block 2210 may be performed by a SRS identification component as described with reference to FIGS. 12 through 15.

At block 2215 the UE 115 may select a first frequency band for the first SRS transmission. The operations of block 2215 may be performed according to the methods described with reference to FIGS. 1 through 11. In certain examples, aspects of the operations of block 2215 may be performed by a SRS frequency selection component as described with reference to FIGS. 12 through 15.

At block 2220 the UE 115 may select a second frequency band for the second SRS transmission that is different than the first frequency band, wherein the first frequency band and the second frequency band are selected to provide frequency diversity between the first SRS transmission and the second SRS transmission. The operations of block 2220 may be performed according to the methods described with reference to FIGS. 1 through 11. In certain examples, aspects of the operations of block 2220 may be performed by a SRS frequency selection component as described with reference to FIGS. 12 through 15.

At block 2225 the UE 115 may transmit the SRS transmissions. The operations of block 2225 may be performed according to the methods described with reference to FIGS. 1 through 11. In certain examples, aspects of the operations of block 2225 may be performed by a SRS generation component as described with reference to FIGS. 12 through 15, which may operate in cooperation with a transmitter 1220 or 1320 as described with reference to FIG. 12 or 13, or antenna(s) 1540 and transceiver(s) 1535 as described with reference to FIG. 15.

Figure 23:
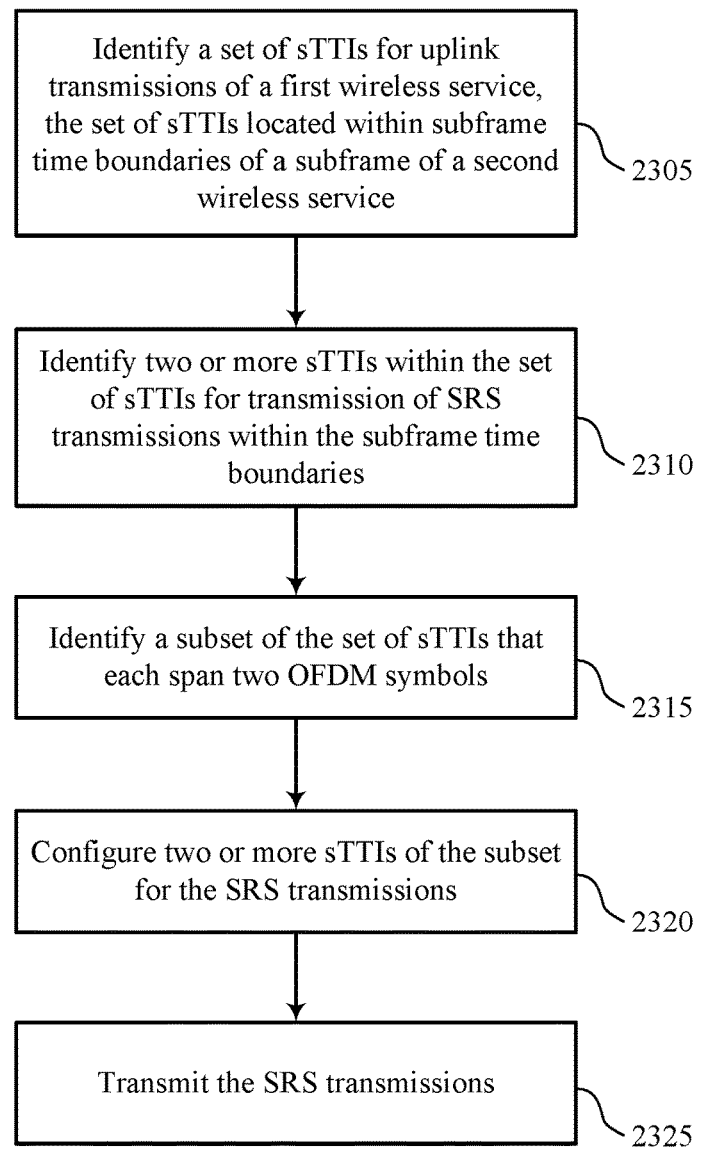

FIG. 23 shows a flowchart illustrating a method 2300 for sounding reference signal transmission in low latency wireless transmissions in accordance with various aspects of the present disclosure. The operations of method 2300 may be implemented by a UE 115 or its components as described herein. For example, the operations of method 2300 may be performed by a UE sTTI manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may identify a set of sTTIs for uplink transmissions of a first wireless service, the set of sTTIs located within subframe time boundaries of a subframe of a second wireless service. The operations of block 2305 may be performed according to the methods described with reference to FIGS. 1 through 11. In certain examples, aspects of the operations of block 2305 may be performed by an sTTI identification component as described with reference to FIGS. 12 through 15.

At block 2310 the UE 115 may identify two or more sTTIs within the set of sTTIs for transmission of SRS transmissions within the subframe time boundaries. The operations of block 2310 may be performed according to the methods described with reference to FIGS. 1 through 11. In certain examples, aspects of the operations of block 2310 may be performed by a SRS identification component as described with reference to FIGS. 12 through 15.

At block 2315 the UE 115 may identify a subset of the set of sTTIs that each span two OFDM symbols. The operations of block 2315 may be performed according to the methods described with reference to FIGS. 1 through 11. In certain examples, aspects of the operations of block 2315 may be performed by an sTTI identification component as described with reference to FIGS. 12 through 15.

At block 2320 the UE 115 may configure two or more sTTIs of the subset for the SRS transmissions. The operations of block 2320 may be performed according to the methods described with reference to FIGS. 1 through 11. In certain examples, aspects of the operations of block 2320 may be performed by a SRS identification component as described with reference to FIGS. 12 through 15.

At block 2325 the UE 115 may transmit the SRS transmissions. The operations of block 2325 may be performed according to the methods described with reference to FIGS. 1 through 11. In certain examples, aspects of the operations of block 2325 may be performed by a SRS generation component as described with reference to FIGS. 12 through 15, which may operate in cooperation with a transmitter 1220 or 1320 as described with reference to FIG. 12 or 13, or antenna(s) 1540 and transceiver(s) 1535 as described with reference to FIG. 15.

Figure 24:
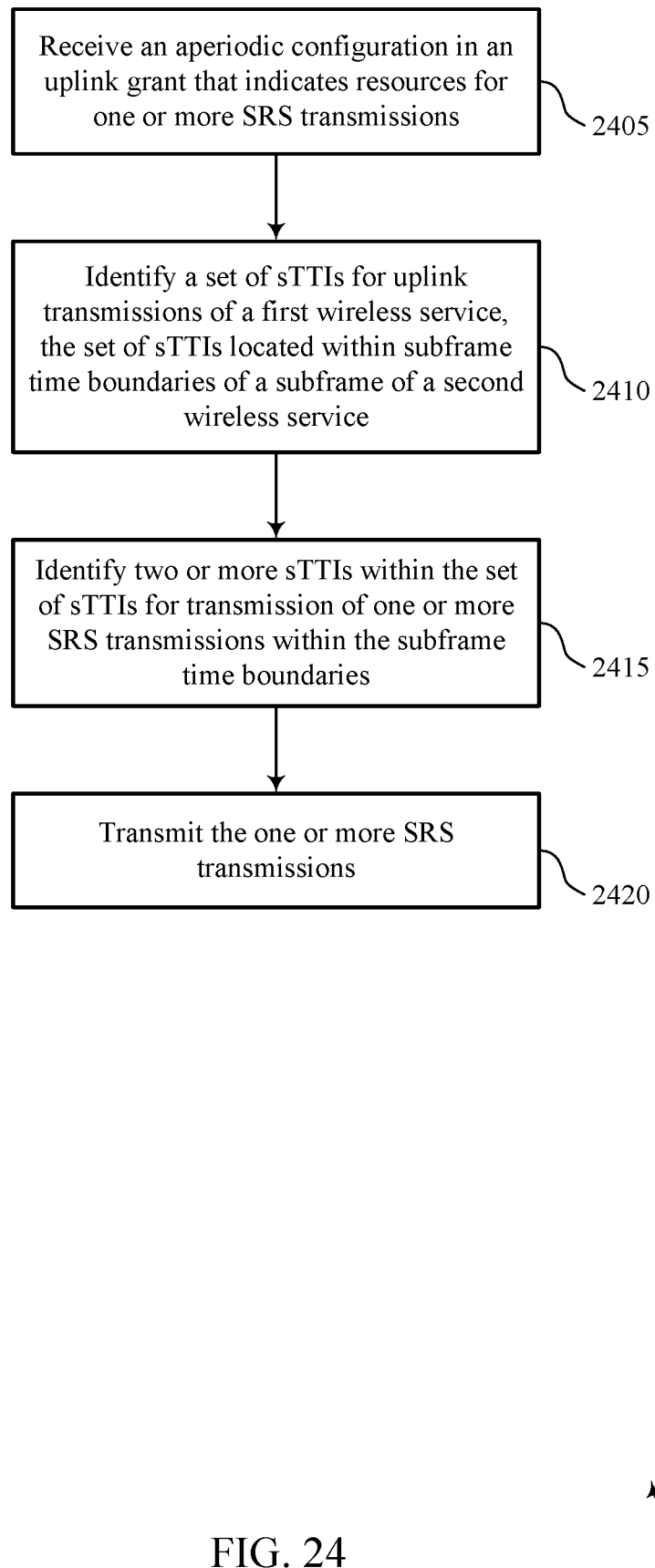

FIG. 24 shows a flowchart illustrating a method 2400 for sounding reference signal transmission in low latency wireless transmissions in accordance with various aspects of the present disclosure. The operations of method 2400 may be implemented by a UE 115 or its components as described herein. For example, the operations of method 2400 may be performed by a UE sTTI manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2405 the UE 115 may receive an aperiodic configuration in an uplink grant that indicates resources for one or more SRS transmissions. The operations of block 2405 may be performed according to the methods described with reference to FIGS. 1 through 11. In certain examples, aspects of the operations of block 2405 may be performed by a SRS configuration component as described with reference to FIGS. 12 through 15, which may operate in cooperation with a receiver 1210 or 1310 as described with reference to FIG. 12 or 13, or antenna(s) 1540 and transceiver(s) 1535 as described with reference to FIG. 15.

At block 2410 the UE 115 may identify a set of sTTIs for uplink transmissions of a first wireless service, the set of sTTIs located within subframe time boundaries of a subframe of a second wireless service. The operations of block 2410 may be performed according to the methods described with reference to FIGS. 1 through 11. In certain examples, aspects of the operations of block 2410 may be performed by an sTTI identification component as described with reference to FIGS. 12 through 15.

At block 2415 the UE 115 may identify two or more sTTIs within the set of sTTIs for transmission of one or more SRS transmissions within the subframe time boundaries. The operations of block 2415 may be performed according to the methods described with reference to FIGS. 1 through 11. In certain examples, aspects of the operations of block 2415 may be performed by a SRS identification component as described with reference to FIGS. 12 through 15.

At block 2420 the UE 115 may transmit the one or more SRS transmissions. The operations of block 2420 may be performed according to the methods described with reference to FIGS. 1 through 11. In certain examples, aspects of the operations of block 2420 may be performed by a SRS generation component as described with reference to FIGS. 12 through 15, which may operate in cooperation with a transmitter 1220 or 1320 as described with reference to FIG. 12 or 13, or antenna(s) 1540 and transceiver(s) 1535 as described with reference to FIG. 15.

Figure 25:
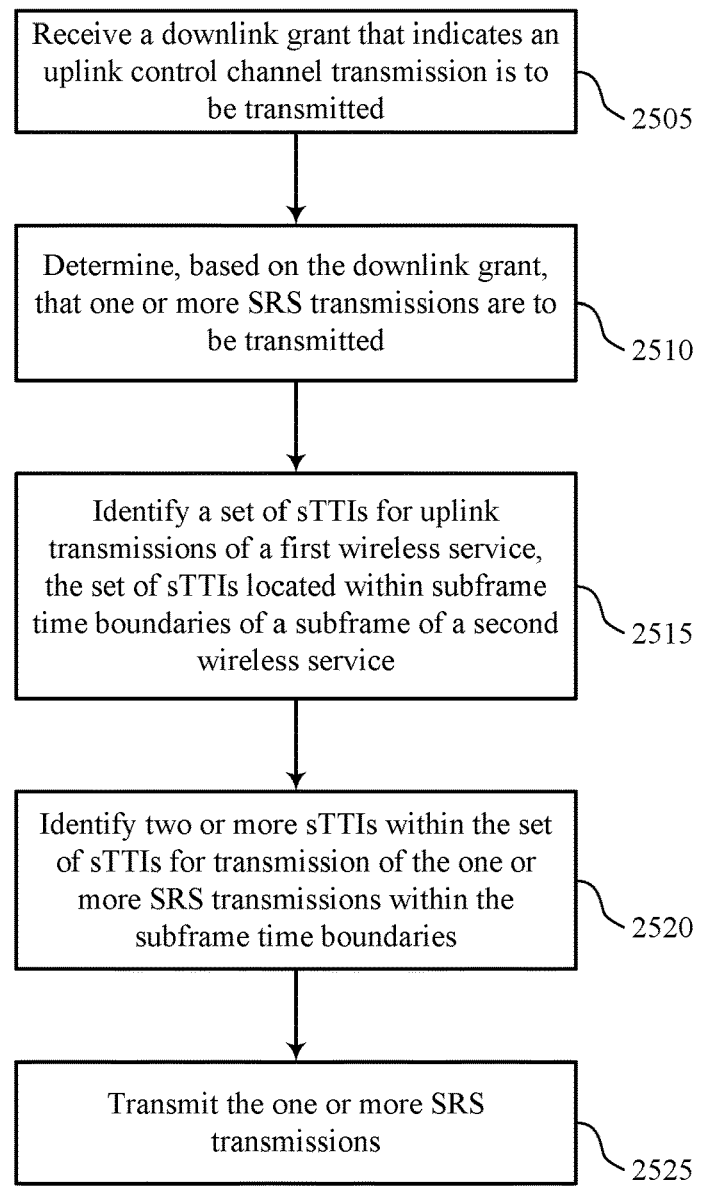

FIG. 25 shows a flowchart illustrating a method 2500 for sounding reference signal transmission in low latency wireless transmissions in accordance with various aspects of the present disclosure. The operations of method 2500 may be implemented by a UE 115 or its components as described herein. For example, the operations of method 2500 may be performed by a UE sTTI manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2505 the UE 115 may receive a downlink grant that indicates an uplink control channel transmission is to be transmitted. The operations of block 2505 may be performed according to the methods described with reference to FIGS. 1 through 11. In certain examples, aspects of the operations of block 2505 may be performed by a SRS configuration component as described with reference to FIGS. 12 through 15, which may operate in cooperation with a receiver 1210 or 1310 as described with reference to FIG. 12 or 13, or antenna(s) 1540 and transceiver(s) 1535 as described with reference to FIG. 15.

At block 2510 the UE 115 may determine, based at least in part on the downlink grant, that one or more SRS transmissions are to be transmitted. The operations of block 2510 may be performed according to the methods described with reference to FIGS. 1 through 11. In certain examples, aspects of the operations of block 2510 may be performed by a SRS configuration component as described with reference to FIGS. 12 through 15.

At block 2515 the UE 115 may identify a set of sTTIs for uplink transmissions of a first wireless service, the set of sTTIs located within subframe time boundaries of a subframe of a second wireless service. The operations of block 2515 may be performed according to the methods described with reference to FIGS. 1 through 11. In certain examples, aspects of the operations of block 2515 may be performed by an sTTI identification component as described with reference to FIGS. 12 through 15.

At block 2520 the UE 115 may identify two or more sTTIs within the set of sTTIs for transmission of one or more SRS transmissions within the subframe time boundaries. The operations of block 2520 may be performed according to the methods described with reference to FIGS. 1 through 11. In certain examples, aspects of the operations of block 2520 may be performed by a SRS identification component as described with reference to FIGS. 12 through 15.

At block 2525 the UE 115 may transmit the one or more SRS transmissions. The operations of block 2525 may be performed according to the methods described with reference to FIGS. 1 through 11. In certain examples, aspects of the operations of block 2525 may be performed by a SRS generation component as described with reference to FIGS. 12 through 15, which may operate in cooperation with a transmitter 1220 or 1320 as described with reference to FIG. 12 or 13, or antenna(s) 1540 and transceiver(s) 1535 as described with reference to FIG. 15.

Figure 26:
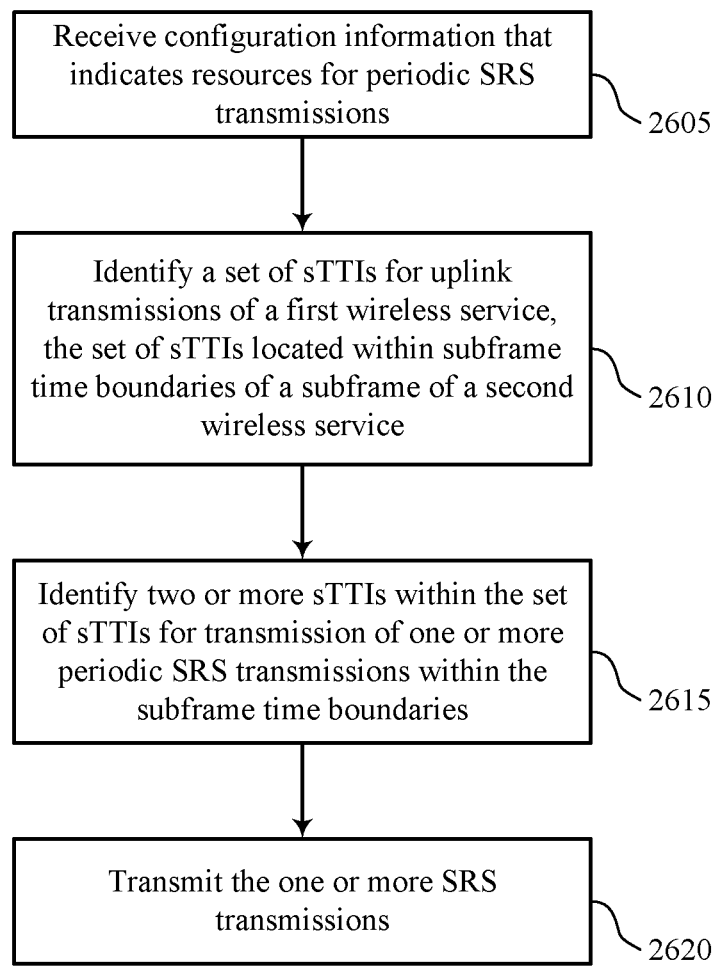

FIG. 26 shows a flowchart illustrating a method 2600 for sounding reference signal transmission in low latency wireless transmissions in accordance with various aspects of the present disclosure. The operations of method 2600 may be implemented by a UE 115 or its components as described herein. For example, the operations of method 2600 may be performed by a UE sTTI manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2605 the UE 115 may receive configuration information that indicates resources for periodic SRS transmissions. The operations of block 2605 may be performed according to the methods described with reference to FIGS. 1 through 11. In certain examples, aspects of the operations of block 2605 may be performed by a SRS configuration component as described with reference to FIGS. 12 through 15, which may operate in cooperation with a receiver 1210 or 1310 as described with reference to FIG. 12 or 13, or antenna(s) 1540 and transceiver(s) 1535 as described with reference to FIG. 15.

At block 2610 the UE 115 may identify a set of sTTIs for uplink transmissions of a first wireless service, the set of sTTIs located within subframe time boundaries of a subframe of a second wireless service. The operations of block 2610 may be performed according to the methods described with reference to FIGS. 1 through 11. In certain examples, aspects of the operations of block 2610 may be performed by an sTTI identification component as described with reference to FIGS. 12 through 15.

At block 2615 the UE 115 may identify two or more sTTIs within the set of sTTIs for transmission of one or more SRS transmissions within the subframe time boundaries. The operations of block 2615 may be performed according to the methods described with reference to FIGS. 1 through 11. In certain examples, aspects of the operations of block 2615 may be performed by a SRS identification component as described with reference to FIGS. 12 through 15.

At block 2620 the UE 115 may transmit the one or more SRS transmissions. The operations of block 2620 may be performed according to the methods described with reference to FIGS. 1 through 11. In certain examples, aspects of the operations of block 2620 may be performed by a SRS generation component as described with reference to FIGS. 12 through 15, which may operate in cooperation with a transmitter 1220 or 1320 as described with reference to FIG. 12 or 13, or antenna(s) 1540 and transceiver(s) 1535 as described with reference to FIG. 15.

Figure 27:
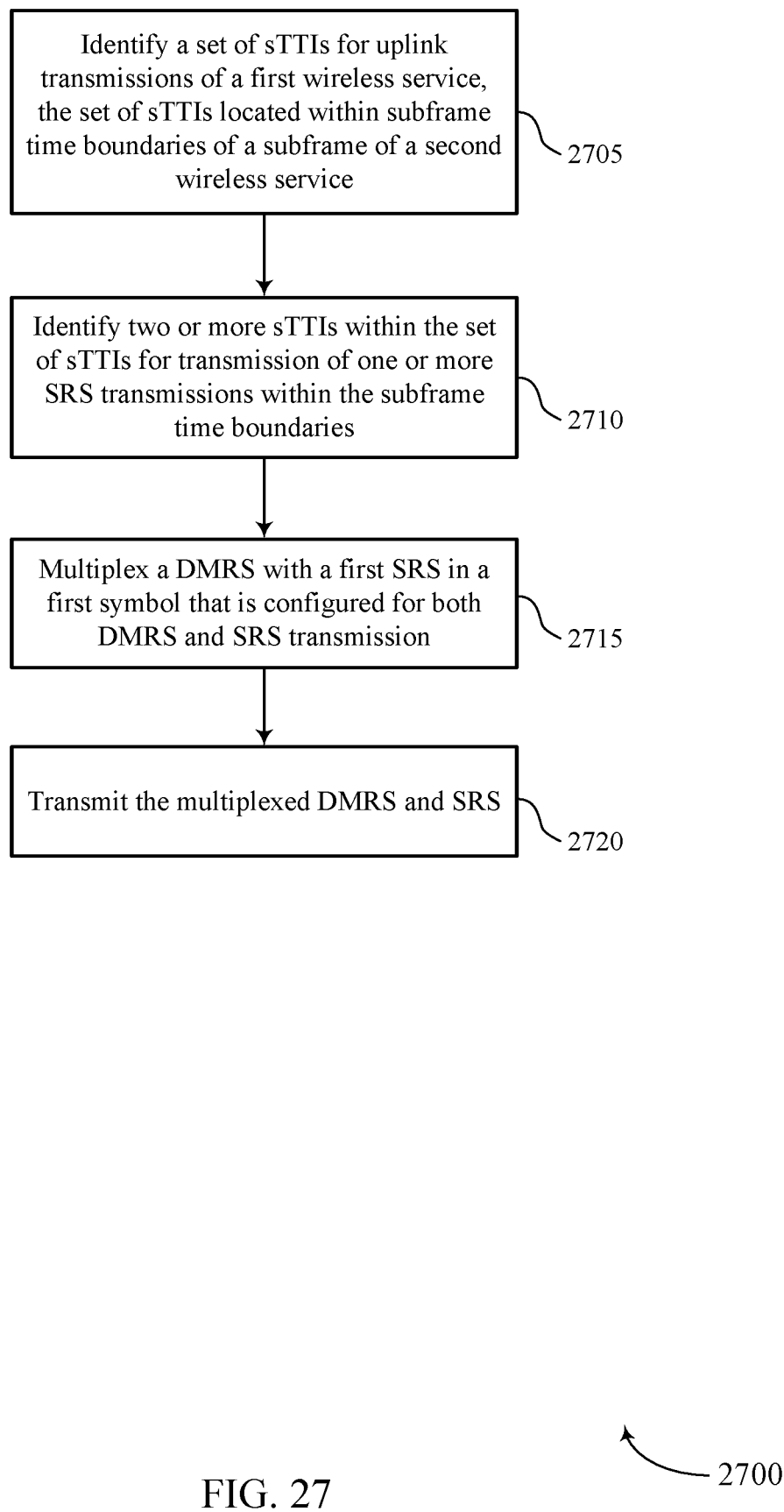

FIG. 27 shows a flowchart illustrating a method 2700 for sounding reference signal transmission in low latency wireless transmissions in accordance with various aspects of the present disclosure. The operations of method 2700 may be implemented by a UE 115 or its components as described herein. For example, the operations of method 2700 may be performed by a UE sTTI manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2705 the UE 115 may identify a set of sTTIs for uplink transmissions of a first wireless service, the set of sTTIs located within subframe time boundaries of a subframe of a second wireless service. The operations of block 2705 may be performed according to the methods described with reference to FIGS. 1 through 11. In certain examples, aspects of the operations of block 2705 may be performed by an sTTI identification component as described with reference to FIGS. 12 through 15.

At block 2710 the UE 115 may identify two or more sTTIs within the set of sTTIs for transmission of one or more SRS transmissions within the subframe time boundaries. The operations of block 2710 may be performed according to the methods described with reference to FIGS. 1 through 11. In certain examples, aspects of the operations of block 2710 may be performed by a SRS identification component as described with reference to FIGS. 12 through 15.

At block 2715 the UE 115 may multiplex a DMRS with a first SRS in a first symbol that is configured for both DMRS and SRS transmission. The operations of block 2715 may be performed according to the methods described with reference to FIGS. 1 through 11. In certain examples, aspects of the operations of block 2715 may be performed by a multiplexing component as described with reference to FIGS. 12 through 15.

At block 2720 the UE 115 may transmit the one or more SRS transmissions. The operations of block 2720 may be performed according to the methods described with reference to FIGS. 1 through 11. In certain examples, aspects of the operations of block 2720 may be performed by a SRS generation component as described with reference to FIGS. 12 through 15, which may operate in cooperation with a transmitter 1220 or 1320 as described with reference to FIG. 12 or 13, or antenna(s) 1540 and transceiver(s) 1535 as described with reference to FIG. 15.

Figure 28:
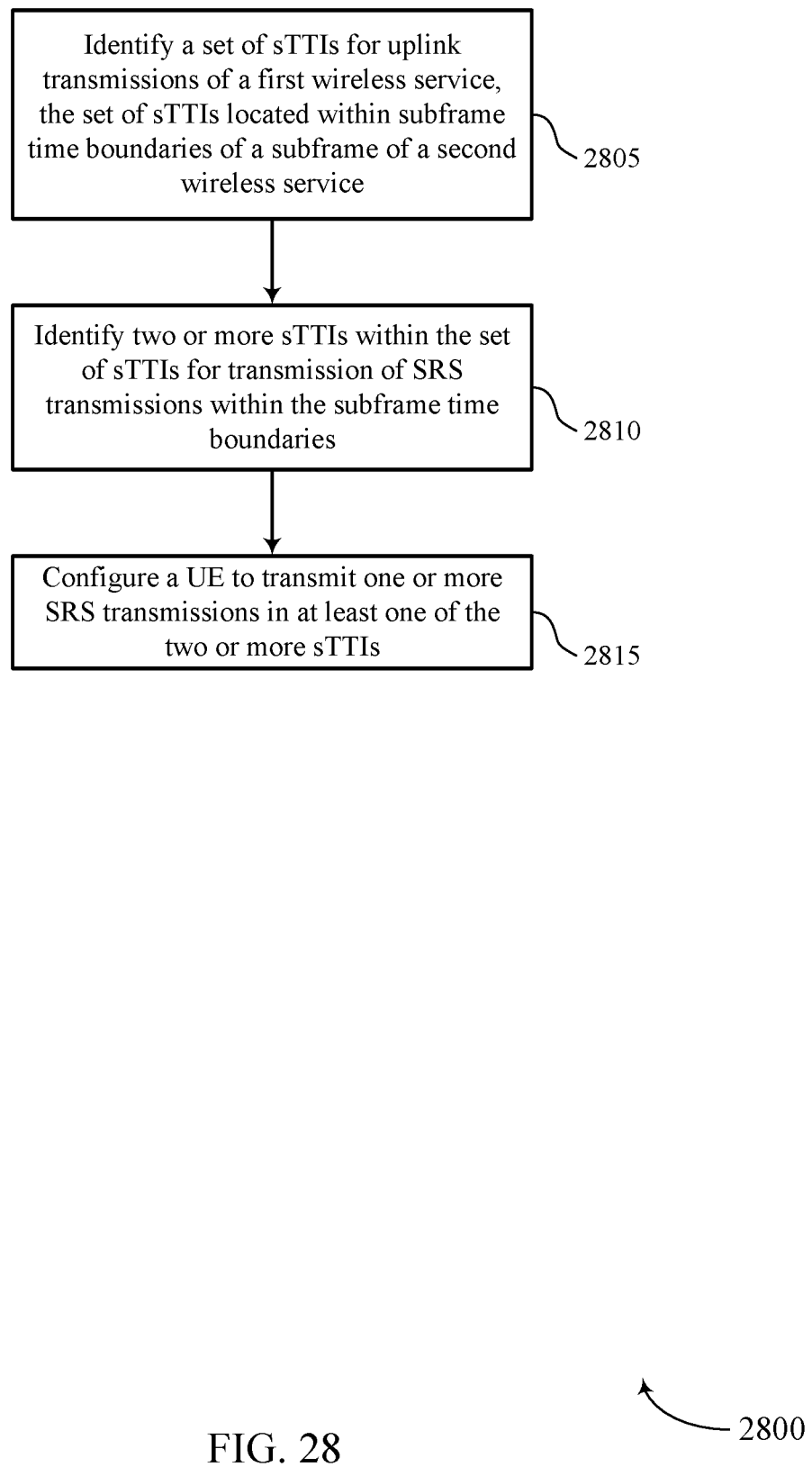

FIG. 28 shows a flowchart illustrating a method 2800 for sounding reference signal transmission in low latency wireless transmissions in accordance with various aspects of the present disclosure. The operations of method 2800 may be implemented by a base station 105 or its components as described herein. For example, the operations of method 2800 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2805 the base station 105 may identify a set of sTTIs for uplink transmissions of a first wireless service, the set of sTTIs located within subframe time boundaries of a subframe of a second wireless service. The operations of block 2805 may be performed according to the methods described with reference to FIGS. 1 through 11. In certain examples, aspects of the operations of block 2805 may be performed by an sTTI identification component as described with reference to FIGS. 16 through 19.

At block 2810 the base station 105 may identify two or more sTTIs within the set of sTTIs for transmission of SRS transmissions within the subframe time boundaries. The operations of block 2810 may be performed according to the methods described with reference to FIGS. 1 through 11. In certain examples, aspects of the operations of block 2810 may be performed by a SRS identification component as described with reference to FIGS. 16 through 19.

At block 2815 the base station 105 may configure a UE to transmit one or more SRS transmissions in at least one or the two or more sTTIs. The operations of block 2815 may be performed according to the methods described with reference to FIGS. 1 through 11. In certain examples, aspects of the operations of block 2815 may be performed by a SRS configuration component as described with reference to FIGS. 16 through 19.

Figure 29:
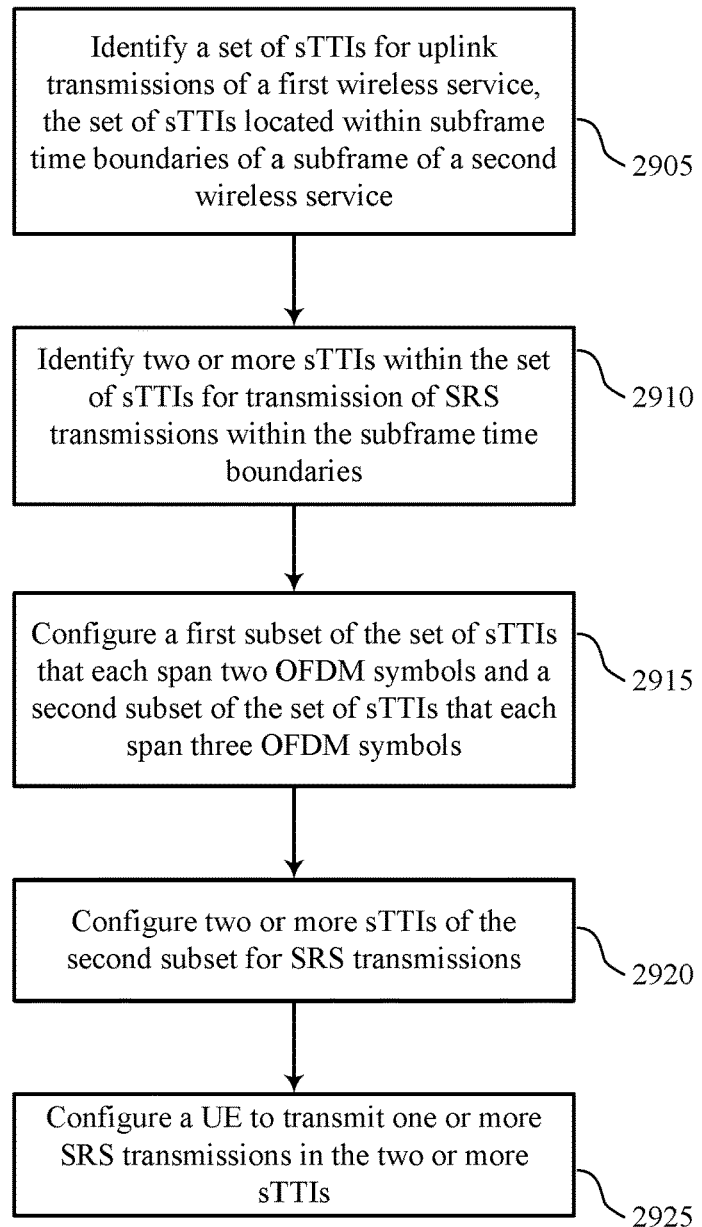

FIG. 29 shows a flowchart illustrating a method 2900 for sounding reference signal transmission in low latency wireless transmissions in accordance with various aspects of the present disclosure. The operations of method 2900 may be implemented by a base station 105 or its components as described herein. For example, the operations of method 2900 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2905 the base station 105 may identify a set of sTTIs for uplink transmissions of a first wireless service, the set of sTTIs located within subframe time boundaries of a subframe of a second wireless service. The operations of block 2905 may be performed according to the methods described with reference to FIGS. 1 through 11. In certain examples, aspects of the operations of block 2905 may be performed by an sTTI identification component as described with reference to FIGS. 16 through 19.

At block 2910 the base station 105 may identify two or more sTTIs within the set of sTTIs for transmission of SRS transmissions within the subframe time boundaries. The operations of block 2910 may be performed according to the methods described with reference to FIGS. 1 through 11. In certain examples, aspects of the operations of block 2910 may be performed by a SRS identification component as described with reference to FIGS. 16 through 19.

At block 2915 the base station 105 may configure a first subset of the set of sTTIs that each span two OFDM symbols and a second subset of the set of sTTIs that each span three OFDM symbols. The operations of block 2915 may be performed according to the methods described with reference to FIGS. 1 through 11. In certain examples, aspects of the operations of block 2915 may be performed by an sTTI identification component as described with reference to FIGS. 16 through 19.

At block 2920 the base station 105 may configure two or more sTTIs of the second subset for SRS transmissions. The operations of block 2920 may be performed according to the methods described with reference to FIGS. 1 through 11. In certain examples, aspects of the operations of block 2920 may be performed by a SRS configuration component as described with reference to FIGS. 16 through 19.

At block 2925 the base station 105 may configure a UE to transmit one or more SRS transmissions in the two or more sTTIs. The operations of block 2925 may be performed according to the methods described with reference to FIGS. 1 through 11. In certain examples, aspects of the operations of block 2925 may be performed by a SRS configuration component as described with reference to FIGS. 16 through 19.

Figure 30:
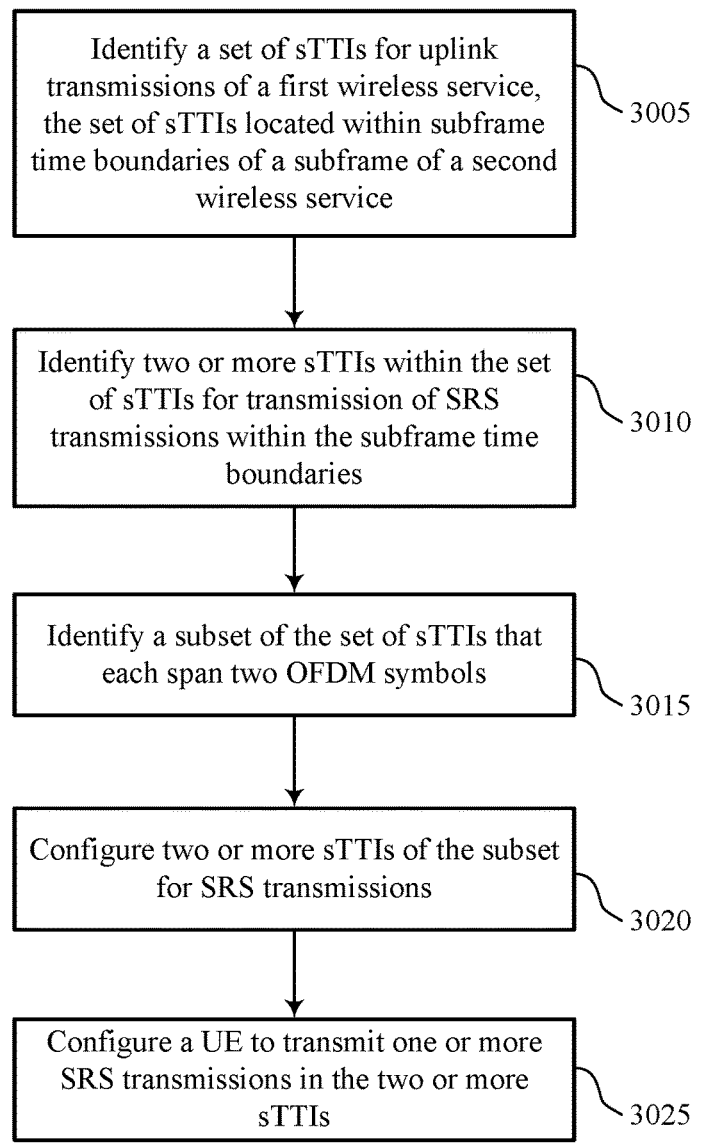

FIG. 30 shows a flowchart illustrating a method 3000 for sounding reference signal transmission in low latency wireless transmissions in accordance with various aspects of the present disclosure. The operations of method 3000 may be implemented by a base station 105 or its components as described herein. For example, the operations of method 3000 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3005 the base station 105 may identify a set of sTTIs for uplink transmissions of a first wireless service, the set of sTTIs located within subframe time boundaries of a subframe of a second wireless service. The operations of block 3005 may be performed according to the methods described with reference to FIGS. 1 through 11. In certain examples, aspects of the operations of block 3005 may be performed by an sTTI identification component as described with reference to FIGS. 16 through 19.

At block 3010 the base station 105 may identify two or more sTTIs within the set of sTTIs for transmission of SRS transmissions within the subframe time boundaries. The operations of block 3010 may be performed according to the methods described with reference to FIGS. 1 through 11. In certain examples, aspects of the operations of block 3010 may be performed by a SRS identification component as described with reference to FIGS. 16 through 19.

At block 3015 the base station 105 may identify a subset of the set of sTTIs that each span two OFDM symbols. The operations of block 3015 may be performed according to the methods described with reference to FIGS. 1 through 11. In certain examples, aspects of the operations of block 3015 may be performed by an sTTI identification component as described with reference to FIGS. 16 through 19.

At block 3020 the base station 105 may configure two or more sTTIs of the subset for SRS transmissions. The operations of block 3020 may be performed according to the methods described with reference to FIGS. 1 through 11. In certain examples, aspects of the operations of block 3020 may be performed by a SRS configuration component as described with reference to FIGS. 16 through 19.

At block 3025 the base station 105 may configure a UE to transmit one or more SRS transmissions in the two or more sTTIs. The operations of block 3025 may be performed according to the methods described with reference to FIGS. 1 through 11. In certain examples, aspects of the operations of block 3025 may be performed by a SRS configuration component as described with reference to FIGS. 16 through 19.

Figure 31:
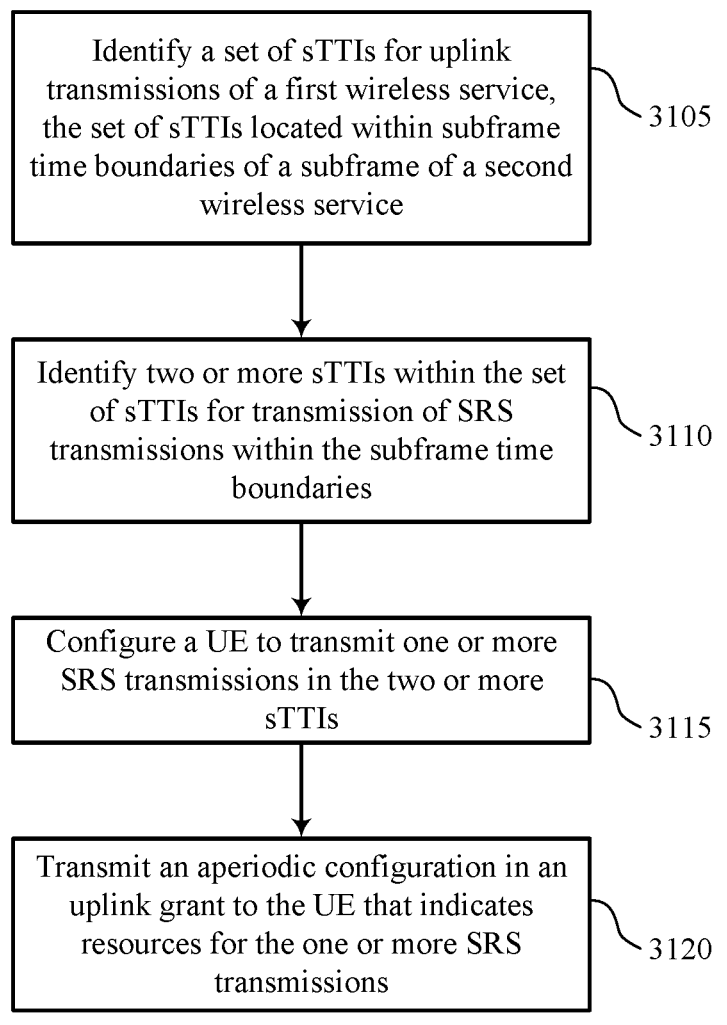

FIG. 31 shows a flowchart illustrating a method 3100 for sounding reference signal transmission in low latency wireless transmissions in accordance with various aspects of the present disclosure. The operations of method 3100 may be implemented by a base station 105 or its components as described herein. For example, the operations of method 3100 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3105 the base station 105 may identify a set of sTTIs for uplink transmissions of a first wireless service, the set of sTTIs located within subframe time boundaries of a subframe of a second wireless service. The operations of block 3105 may be performed according to the methods described with reference to FIGS. 1 through 11. In certain examples, aspects of the operations of block 3105 may be performed by an sTTI identification component as described with reference to FIGS. 16 through 19.

At block 3110 the base station 105 may identify two or more sTTIs within the set of sTTIs for transmission of SRS transmissions within the subframe time boundaries. The operations of block 3110 may be performed according to the methods described with reference to FIGS. 1 through 11. In certain examples, aspects of the operations of block 3110 may be performed by a SRS identification component as described with reference to FIGS. 16 through 19.

At block 3115 the base station 105 may configure a UE to transmit one or more SRS transmissions in the two or more sTTIs. The operations of block 3115 may be performed according to the methods described with reference to FIGS. 1 through 11. In certain examples, aspects of the operations of block 3115 may be performed by a SRS configuration component as described with reference to FIGS. 16 through 19.

At block 3120 the base station 105 may transmit an aperiodic configuration in an uplink grant to the UE that indicates resources for the one or more SRS transmissions. The operations of block 3120 may be performed according to the methods described with reference to FIGS. 1 through 11. In certain examples, aspects of the operations of block 3120 may be performed by a SRS configuration component as described with reference to FIGS. 16 through 19, which may operate in cooperation with a transmitter 1620 or 1720 as described with reference to FIG. 16 or 17, or antenna(s) 1940 and transceiver(s) 1935 as described with reference to FIG. 19.

Figure 32:
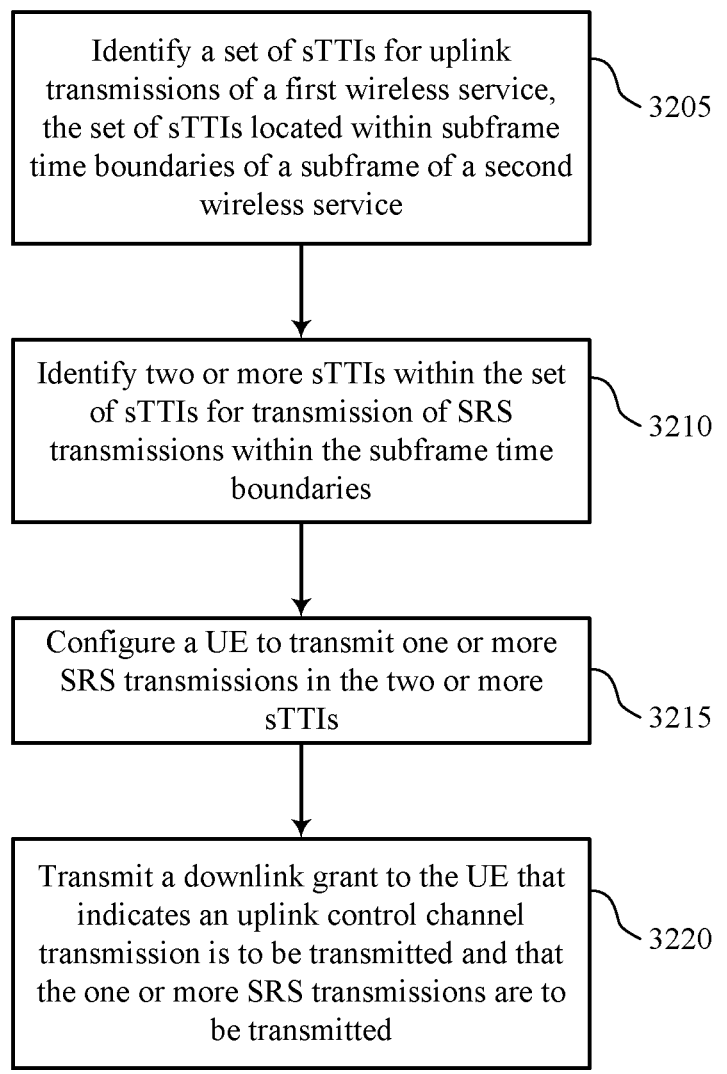

FIG. 32 shows a flowchart illustrating a method 3200 for sounding reference signal transmission in low latency wireless transmissions in accordance with various aspects of the present disclosure. The operations of method 3200 may be implemented by a base station 105 or its components as described herein. For example, the operations of method 3200 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3205 the base station 105 may identify a set of sTTIs for uplink transmissions of a first wireless service, the set of sTTIs located within subframe time boundaries of a subframe of a second wireless service. The operations of block 3205 may be performed according to the methods described with reference to FIGS. 1 through 11. In certain examples, aspects of the operations of block 3205 may be performed by an sTTI identification component as described with reference to FIGS. 16 through 19.

At block 3210 the base station 105 may identify two or more sTTIs within the set of sTTIs for transmission of SRS transmissions within the subframe time boundaries. The operations of block 3210 may be performed according to the methods described with reference to FIGS. 1 through 11. In certain examples, aspects of the operations of block 3210 may be performed by a SRS identification component as described with reference to FIGS. 16 through 19.

At block 3215 the base station 105 may configure a UE to transmit one or more SRS transmissions in the two or more sTTIs. The operations of block 3215 may be performed according to the methods described with reference to FIGS. 1 through 11. In certain examples, aspects of the operations of block 3215 may be performed by a SRS configuration component as described with reference to FIGS. 16 through 19.

At block 3220 the base station 105 may transmit a downlink grant to the UE that indicates an uplink control channel transmission is to be transmitted and that the one or more SRS transmissions are to be transmitted. The operations of block 3220 may be performed according to the methods described with reference to FIGS. 1 through 11. In certain examples, aspects of the operations of block 3220 may be performed by a SRS configuration component as described with reference to FIGS. 16 through 19, which may operate in cooperation with a transmitter 1620 or 1720 as described with reference to FIG. 16 or 17, or antenna(s) 1940 and transceiver(s) 1935 as described with reference to FIG. 19.

Figure 33:
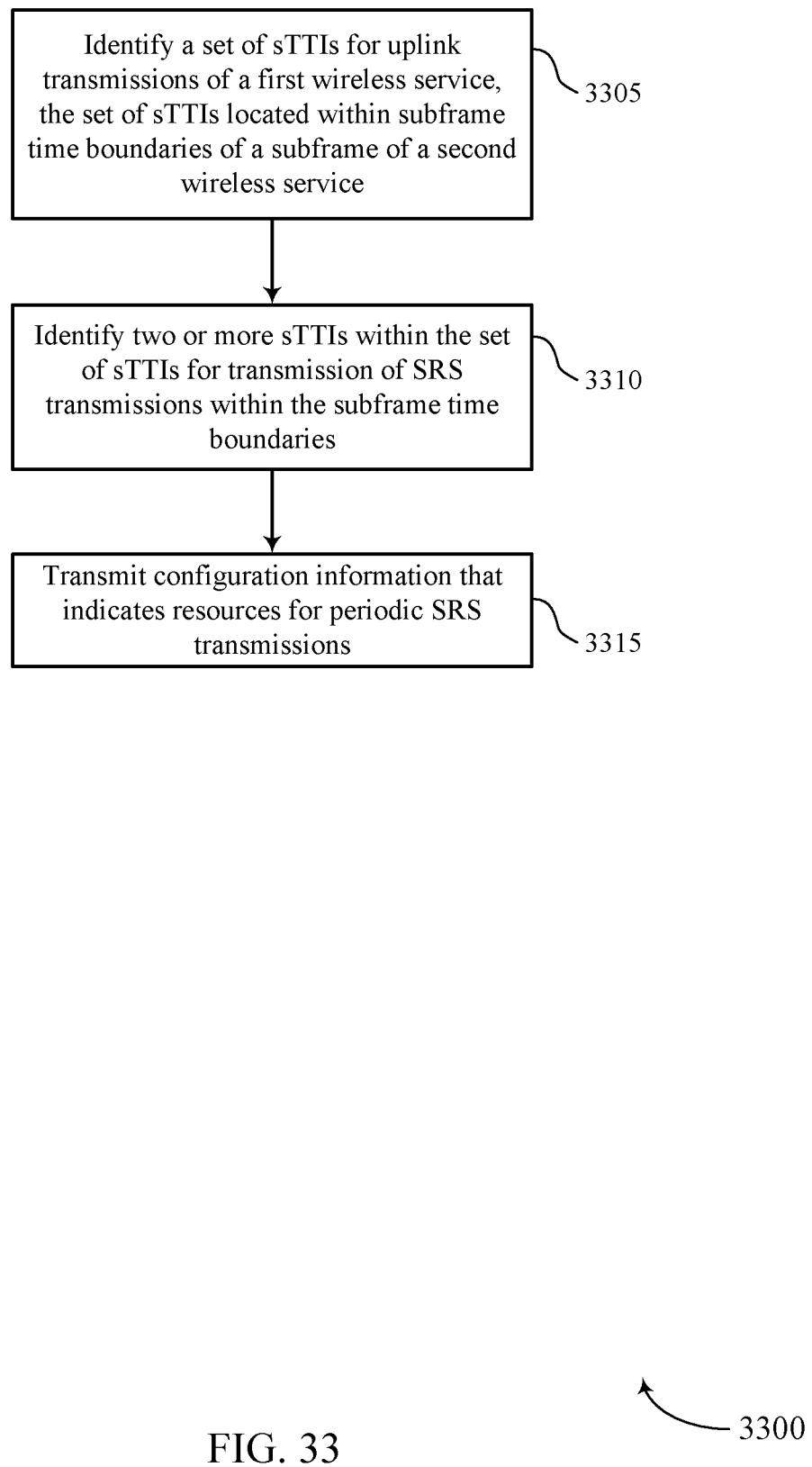

FIG. 33 shows a flowchart illustrating a method 3300 for sounding reference signal transmission in low latency wireless transmissions in accordance with various aspects of the present disclosure. The operations of method 3300 may be implemented by a base station 105 or its components as described herein. For example, the operations of method 3300 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3305 the base station 105 may identify a set of sTTIs for uplink transmissions of a first wireless service, the set of sTTIs located within subframe time boundaries of a subframe of a second wireless service. The operations of block 3305 may be performed according to the methods described with reference to FIGS. 1 through 11. In certain examples, aspects of the operations of block 3305 may be performed by an sTTI identification component as described with reference to FIGS. 16 through 19.

At block 3310 the base station 105 may identify two or more sTTIs within the set of sTTIs for transmission of SRS transmissions within the subframe time boundaries. The operations of block 3310 may be performed according to the methods described with reference to FIGS. 1 through 11. In certain examples, aspects of the operations of block 3310 may be performed by a SRS identification component as described with reference to FIGS. 16 through 19.

At block 3315 the base station 105 may transmit configuration information that indicates resources for periodic SRS transmissions. The operations of block 3315 may be performed according to the methods described with reference to FIGS. 1 through 11. In certain examples, aspects of the operations of block 3315 may be performed by a SRS configuration component as described with reference to FIGS. 16 through 19, which may operate in cooperation with a transmitter 1620 or 1720 as described with reference to FIG. 16 or 17, or antenna(s) 1940 and transceiver(s) 1935 as described with reference to FIG. 19.

Figure 34:
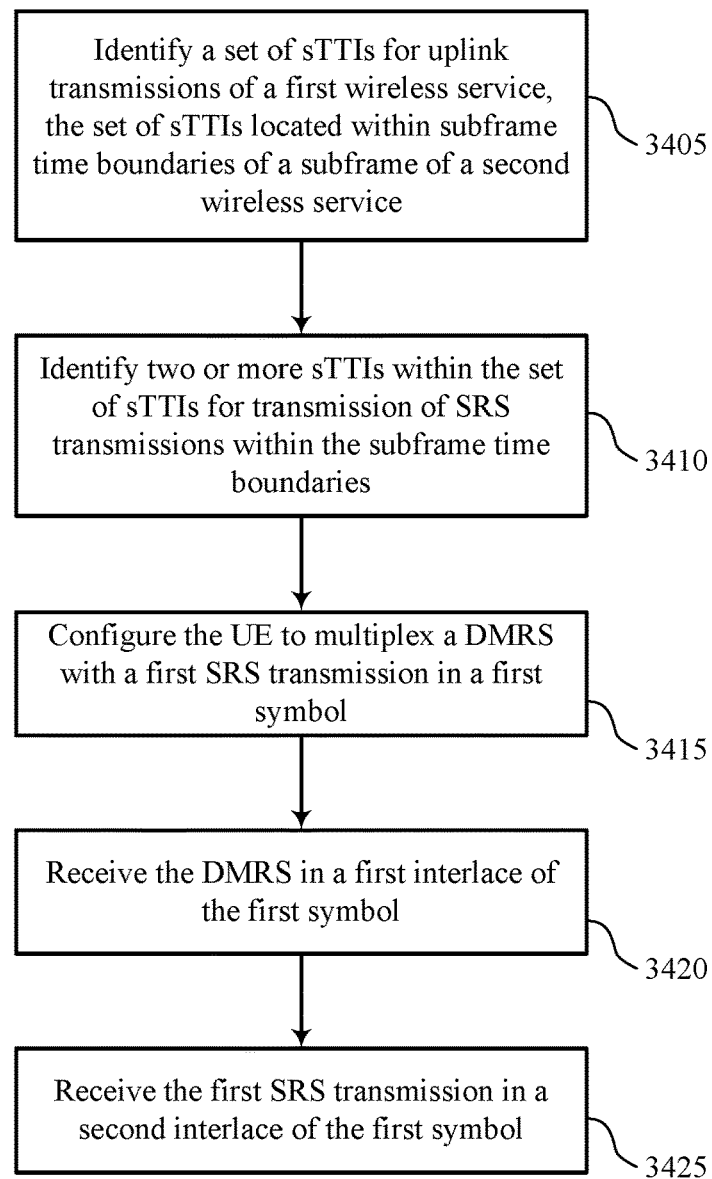

FIG. 34 shows a flowchart illustrating a method 3400 for sounding reference signal transmission in low latency wireless transmissions in accordance with various aspects of the present disclosure. The operations of method 3400 may be implemented by a base station 105 or its components as described herein. For example, the operations of method 3400 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3405 the base station 105 may identify a set of sTTIs for uplink transmissions of a first wireless service, the set of sTTIs located within subframe time boundaries of a subframe of a second wireless service. The operations of block 3405 may be performed according to the methods described with reference to FIGS. 1 through 11. In certain examples, aspects of the operations of block 3405 may be performed by an sTTI identification component as described with reference to FIGS. 16 through 19.

At block 3410 the base station 105 may identify two or more sTTIs within the set of sTTIs for transmission of SRS transmissions within the subframe time boundaries. The operations of block 3410 may be performed according to the methods described with reference to FIGS. 1 through 11. In certain examples, aspects of the operations of block 3410 may be performed by a SRS identification component as described with reference to FIGS. 16 through 19.

At block 3415 the base station 105 may configure the UE to multiplex a DMRS with a first SRS transmission in a first symbol. The operations of block 3415 may be performed according to the methods described with reference to FIGS. 1 through 11. In certain examples, aspects of the operations of block 3415 may be performed by a multiplexing component as described with reference to FIGS. 16 through 19.

At block 3420 the base station 105 may receive the DMRS in a first interlace of the first symbol. The operations of block 3420 may be performed according to the methods described with reference to FIGS. 1 through 11. In certain examples, aspects of the operations of block 3420 may be performed by a multiplexing component as described with reference to FIGS. 16 through 19, which may operate in cooperation with a receiver 1610 or 1710 as described with reference to FIG. 16 or 17, or antenna(s) 1940 and transceiver(s) 1935 as described with reference to FIG. 19.

At block 3425 the base station 105 may receive the first SRS transmission in a second interlace of the first symbol. The operations of block 3425 may be performed according to the methods described with reference to FIGS. 1 through 11. In certain examples, aspects of the operations of block 3425 may be performed by a multiplexing component as described with reference to FIGS. 16 through 19, which may operate in cooperation with a receiver 1610 or 1710 as described with reference to FIG. 16 or 17, or antenna(s) 1940 and transceiver(s) 1935 as described with reference to FIG. 19.

Figure 35:
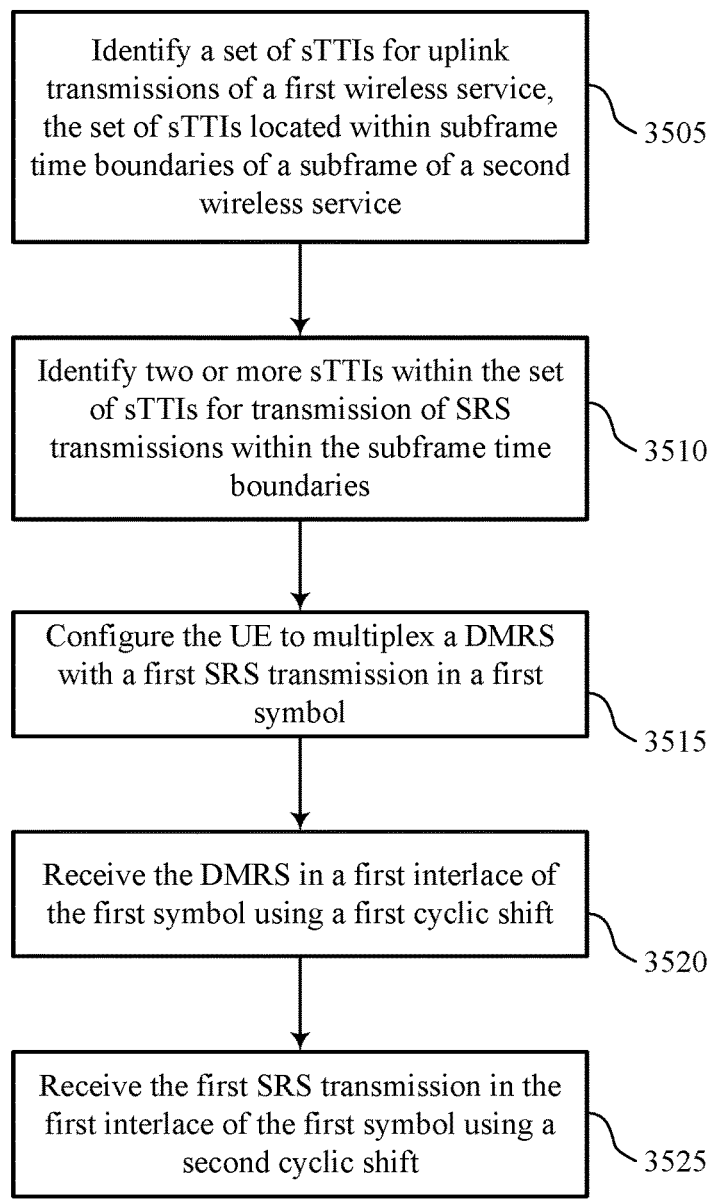

FIG. 35 shows a flowchart illustrating a method 3500 for sounding reference signal transmission in low latency wireless transmissions in accordance with various aspects of the present disclosure. The operations of method 3500 may be implemented by a base station 105 or its components as described herein. For example, the operations of method 3500 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3505 the base station 105 may identify a set of sTTIs for uplink transmissions of a first wireless service, the set of sTTIs located within subframe time boundaries of a subframe of a second wireless service. The operations of block 3505 may be performed according to the methods described with reference to FIGS. 1 through 11. In certain examples, aspects of the operations of block 3505 may be performed by an sTTI identification component as described with reference to FIGS. 16 through 19.

At block 3510 the base station 105 may identify two or more sTTIs within the set of sTTIs for transmission of SRS transmissions within the subframe time boundaries. The operations of block 3510 may be performed according to the methods described with reference to FIGS. 1 through 11. In certain examples, aspects of the operations of block 3510 may be performed by a SRS identification component as described with reference to FIGS. 16 through 19.

At block 3515 the base station 105 may configure the UE to multiplex a DMRS with a first SRS transmission in a first symbol. The operations of block 3515 may be performed according to the methods described with reference to FIGS. 1 through 11. In certain examples, aspects of the operations of block 3515 may be performed by a multiplexing component as described with reference to FIGS. 16 through 19.

At block 3520 the base station 105 may receive the DMRS in a first interlace of the first symbol using a first cyclic shift. The operations of block 3520 may be performed according to the methods described with reference to FIGS. 1 through 11. In certain examples, aspects of the operations of block 3520 may be performed by a multiplexing component as described with reference to FIGS. 16 through 19, which may operate in cooperation with a receiver 1610 or 1710 as described with reference to FIG. 16 or 17, or antenna(s) 1940 and transceiver(s) 1935 as described with reference to FIG. 19.

At block 3525 the base station 105 may receive the first SRS transmission in the first interlace of the first symbol using a second cyclic shift. The operations of block 3525 may be performed according to the methods described with reference to FIGS. 1 through 11. In certain examples, aspects of the operations of block 3525 may be performed by a multiplexing component as described with reference to FIGS. 16 through 19, which may operate in cooperation with a receiver 1610 or 1710 as described with reference to FIG. 16 or 17, or antenna(s) 1940 and transceiver(s) 1935 as described with reference to FIG. 19.

Figure 36:
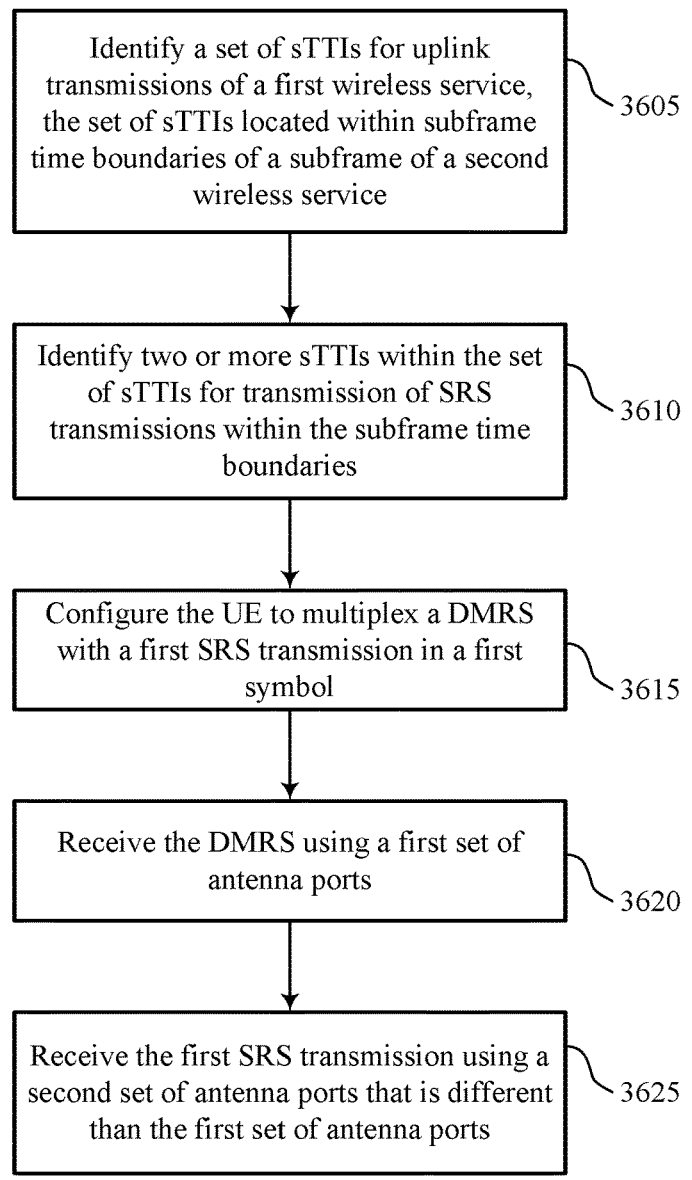

FIG. 36 shows a flowchart illustrating a method 3600 for sounding reference signal transmission in low latency wireless transmissions in accordance with various aspects of the present disclosure. The operations of method 3600 may be implemented by a base station 105 or its components as described herein. For example, the operations of method 3600 may be performed by a base station sTTI manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3605 the base station 105 may identify a set of sTTIs for uplink transmissions of a first wireless service, the set of sTTIs located within subframe time boundaries of a subframe of a second wireless service. The operations of block 3605 may be performed according to the methods described with reference to FIGS. 1 through 11. In certain examples, aspects of the operations of block 3605 may be performed by an sTTI identification component as described with reference to FIGS. 16 through 19.

At block 3610 the base station 105 may identify two or more sTTIs within the set of sTTIs for transmission of SRS transmissions within the subframe time boundaries. The operations of block 3610 may be performed according to the methods described with reference to FIGS. 1 through 11. In certain examples, aspects of the operations of block 3610 may be performed by a SRS identification component as described with reference to FIGS. 16 through 19.

At block 3615 the base station 105 may configure the UE to multiplex a DMRS with a first SRS transmission in a first symbol. The operations of block 3615 may be performed according to the methods described with reference to FIGS. 1 through 11. In certain examples, aspects of the operations of block 3615 may be performed by a multiplexing component as described with reference to FIGS. 16 through 19.

At block 3620 the base station 105 may receive the DMRS using a first set of antenna ports. The operations of block 3620 may be performed according to the methods described with reference to FIGS. 1 through 11. In certain examples, aspects of the operations of block 3620 may be performed by a multiplexing component as described with reference to FIGS. 16 through 19, which may operate in cooperation with a receiver 1610 or 1710 as described with reference to FIG. 16 or 17, or antenna(s) 1940 and transceiver(s) 1935 as described with reference to FIG. 19.

At block 3625 the base station 105 may receive the first SRS transmission using a second set of antenna ports that is different than the first set of antenna ports. The operations of block 3625 may be performed according to the methods described with reference to FIGS. 1 through 11. In certain examples, aspects of the operations of block 3625 may be performed by a multiplexing component as described with reference to FIGS. 16 through 19, which may operate in cooperation with a receiver 1610 or 1710 as described with reference to FIG. 16 or 17, or antenna(s) 1940 and transceiver(s) 1935 as described with reference to FIG. 19.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a configuration that indicates a set of short transmission time intervals (sTTIs) that are for uplink transmissions, wherein the set comprises a first subset of sTTIs being within a first slot, the first subset of sTTIs each spanning two orthogonal frequency division multiplexing (OFDM) symbols, and wherein the first subset of sTTIs comprises at least two consecutive OFDM symbols for transmission of sounding reference signal (SRS) transmissions; and
transmitting one or more SRS transmissions in at least the at least two consecutive OFDM symbols.

2. The method of claim 1, wherein the at least two consecutive OFDM symbols are configured across one sTTI of the first subset of sTTIs.

3. The method of claim 1, wherein the at least two consecutive OFDM symbols are configured across two sTTIs of the first subset of sTTIs.

4. The method of claim 3, wherein the remaining OFDM symbols of the two sTTIs not configured for SRS transmission are configured for a null pattern, a demodulation reference signal (DMRS) transmission, a data transmission, or a combination thereof.

5. The method of claim 1, wherein the set comprises a second subset of sTTIs that each span three OFDM symbols.

6. The method of claim 5, wherein a final sTTI within each of the first slot and a second slot within a subframe time boundary is a three-symbol sTTI of the second subset.

7. The method of claim 6, further comprising:
selecting an SRS symbol location within the first slot to be either an initial symbol or a last symbol of a respective three-symbol sTTI; and
selecting an SRS symbol location within the second slot to be a last symbol of a respective three-symbol sTTI.

8. An apparatus for wireless communication, in a system comprising:
one or more processors;
memory in electronic communication with the one or more processors; and
instructions stored in the memory and operable, when executed by the one or more processors to cause the apparatus to:
receive a configuration that indicates a set of short transmission time intervals (sTTIs) that are for uplink transmissions, wherein the set comprises a first subset of sTTIs being within a first slot, the first subset of sTTIs each spanning two orthogonal frequency division multiplexing (OFDM) symbols, and wherein the first subset of sTTIs comprises at least two consecutive OFDM symbols for transmission of sounding reference signal (SRS) transmissions; and
transmit one or more SRS transmissions in at least the at least two consecutive OFDM symbols.

9. The apparatus of claim 8, wherein the at least two consecutive OFDM symbols are configured across one sTTI of the first subset of sTTIs.

10. The apparatus of claim 8, wherein the at least two consecutive OFDM symbols are configured across two sTTIs of the first subset of sTTIs.

11. The apparatus of claim 10, wherein the remaining OFDM symbols of the two sTTIs not configured for SRS transmission are configured for a null pattern, a demodulation reference signal (DMRS) transmission, a data transmission, or a combination thereof.

12. The apparatus of claim 8, wherein the set comprises a second subset of sTTIs that each span three OFDM symbols.

13. The apparatus of claim 12, wherein a final sTTI within each of the first slot and a second slot within a subframe time boundary is a three-symbol sTTI of the second subset.

14. The apparatus of claim 13, wherein the instructions are operable to cause the apparatus to:
select an SRS symbol location within the first slot to be either an initial symbol or a last symbol of a respective three-symbol sTTI; and
select an SRS symbol location within the second slot to be a last symbol of a respective three-symbol sTTI.

15. An apparatus for wireless communication, in a system comprising:
one or more processors;
memory in electronic communication with the one or more processors; and
instructions stored in the memory and operable, when executed by the one or more processors, to cause the apparatus to:
receive a configuration that indicates a set of short transmission time intervals (sTTIs) that are for uplink transmissions, wherein the set comprises a first subset of one or more sTTIs being within a first slot, the first subset of sTTIs each spanning two orthogonal frequency division multiplexing (OFDM) symbols, and wherein the first subset of one or more sTTIs comprises at least two consecutive OFDM symbols for transmission of sounding reference signal (SRS) transmissions; and
transmit one or more SRS transmissions in at least the at least two consecutive OFDM symbols.

16. An apparatus for wireless communication, in a system comprising:
one or more processors;
memory in electronic communication with the one or more processors; and
instructions stored in the memory and operable, when executed by the one or more processors, to cause the apparatus to:
receive a configuration that indicates a set of short transmission time intervals (sTTIs) that are for uplink transmissions, wherein the set comprises a first subset of at least one sTTI being within a first slot, the first subset of sTTIs spanning two orthogonal frequency division multiplexing (OFDM) symbols, and wherein the first subset of at least one sTTI comprises at least two consecutive OFDM symbols for transmission of sounding reference signal (SRS) transmission; and
transmit one or more SRS transmissions in at least the at least two consecutive OFDM symbols.

17. A method for wireless communication, comprising:
identifying two or more short transmission time intervals (sTTIs) within a set of sTTIs that is for uplink transmissions, the set of sTTIs being within a slot, the two or more sTTIs spanning two or three orthogonal frequency division multiplexing (OFDM) symbols, the two or more sTTIs being for transmission of sounding reference signal (SRS) transmissions, at least one of the two or more sTTIs comprising an initial OFDM symbol configured for an SRS transmission; and transmitting one or more SRS transmissions in at least one of the two or more sTTIs.

18. An apparatus for wireless communication, in a system comprising:
one or more processors;
memory in electronic communication with the one or more processors; and
instructions stored in the memory and operable, when executed by the one or more processors, to cause the apparatus to:
identify two or more short transmission time intervals (sTTIs) within a set of sTTIs that is for uplink transmissions, the set of sTTIs being within a slot, the two or more sTTIs spanning two or three orthogonal frequency division multiplexing (OFDM) symbols, the two or more sTTIs being for transmission of sounding reference signal (SRS) transmissions, at least one of the two or more sTTIs comprising an initial OFDM symbol configured for an SRS transmission; and
transmit one or more SRS transmissions in at least one of the two or more sTTIs.

\* \* \* \* \*